(12) United States Patent
Baghdadi

(10) Patent No.: US 12,060,478 B2
(45) Date of Patent: *Aug. 13, 2024

(54) FOAM COMPOSITIONS AND USES THEREOF

(71) Applicant: NIKE, Inc., Beaverton, OR (US)

(72) Inventor: Hossein A. Baghdadi, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/457,617

(22) Filed: Aug. 29, 2023

(65) Prior Publication Data

US 2023/0399499 A1 Dec. 14, 2023

Related U.S. Application Data

(63) Continuation of application No. 18/177,949, filed on Mar. 3, 2023, now Pat. No. 11,780,997, which is a
(Continued)

(51) Int. Cl.
| | |
|---|---|
| *A43B 1/10* | (2006.01) |
| *A43B 13/04* | (2006.01) |
| *A43B 13/12* | (2006.01) |
| *A43B 13/18* | (2006.01) |
| *C08J 9/00* | (2006.01) |
| *C08J 9/06* | (2006.01) |
| *C08L 23/08* | (2006.01) |
| *C08L 23/14* | (2006.01) |
| *C08L 53/02* | (2006.01) |
| *A43B 5/06* | (2022.01) |
| *A43B 7/14* | (2022.01) |
| *A43B 7/144* | (2022.01) |
| *A43B 13/14* | (2006.01) |
| *A43B 13/16* | (2006.01) |

(Continued)

(52) U.S. Cl.
CPC ............ *C08L 23/0853* (2013.01); *A43B 1/10* (2013.01); *A43B 13/04* (2013.01); *A43B 13/125* (2013.01); *A43B 13/186* (2013.01); *A43B 13/188* (2013.01); *C08J 9/0061* (2013.01); *C08J 9/06* (2013.01); *C08L 23/0815* (2013.01); *C08L 23/14* (2013.01); *C08L 53/025* (2013.01); *A43B 5/06* (2013.01); *A43B 7/14* (2013.01); *A43B 7/144* (2013.01); *A43B 13/141* (2013.01); *A43B 13/16* (2013.01); *A43B 13/223* (2013.01); *B29D 35/122* (2013.01); *C08J 2201/026* (2013.01); *C08J 2207/00* (2013.01); *C08J 2323/08* (2013.01); *C08J 2331/04* (2013.01); *C08J 2353/00* (2013.01); *C08J 2353/02* (2013.01); *C08J 2423/02* (2013.01); *C08J 2423/08* (2013.01); *C08J 2423/10* (2013.01); *C08J 2453/00* (2013.01); *C08L 2205/03* (2013.01); *C08L 2205/035* (2013.01)

(58) Field of Classification Search
CPC .. C08L 23/0853; C08L 23/0815; C08L 23/14; C08L 53/025; C08L 53/00; A43B 1/10; A43B 13/04; A43B 13/125; A43B 13/186; A43B 13/188; A43B 5/06; A43B 7/14; A43B 7/144; A43B 13/141; A43B 13/16; A43B 13/223; A43B 5/00; A43B 13/187; C08J 9/0061; C08J 9/06; C08J 2201/026; C08J 2207/00; C08J 2323/08; C08J 2331/04; C08J 2353/00; C08J 2353/02; C08J 2423/02; C08J 2423/08; C08J 2423/10; C08J 9/04; B29D 35/122; C08K 2003/2296; B29C 35/02; B29C 44/42; B29C 44/5627

See application file for complete search history.

(56) References Cited

U.S. PATENT DOCUMENTS

| | | |
|---|---|---|
| 4,910,886 A | 3/1990 | Sullivan et al. |
| 6,207,754 B1 | 3/2001 | Yu |

(Continued)

FOREIGN PATENT DOCUMENTS

| | | |
|---|---|---|
| BR | PI0701866 A2 | 12/2008 |
| CN | 1813025 | 8/2006 |

(Continued)

OTHER PUBLICATIONS

Karsli, G.; Aytac, A. "A study on compatibility of SEBS/EVA blends prepared by different techniques" Publisher: Huthig Verlag GmbH; v 64, n 7-8, p. 15-18, Jul.-Aug. 2011.

International Preliminary Report on Patentability for PCT/US2017/022350 mailed Jun. 18, 2018.

Kemaloglu, S. et al. Thermally conductive boron nitride/SEBS/EVA ternary composites: "Processing and characterization" Publisher: John Wiley and Sons Inc.; Polymer Composites, v 31, n 8, p. 1398-1408, Aug. 2010.

Liu et al., "Structure analysis of ethylene/1-octene copolymers synthesized from living coordination polymerization," European Polymer Journal 54 (2014), pp. 160-171.

(Continued)

Primary Examiner — K. Boyle

(74) Attorney, Agent, or Firm — Shook, Hardy & Bacon L.L.P.

(57) ABSTRACT

Components for articles of footwear and athletic equipment are provided including a foam. A variety of foams and foam components and compositions for forming the foams are provided. In some aspects, the foams and components including the foams can have exceptionally high energy return while also having improved durability and softness. In particular, midsoles including the foams are provided for use in an article of footwear. Methods of making the compositions and foams are provided, as well as methods of making an article of footwear including one of the foam components. In some aspects, the foams and foam components can be made by injection molding or injection molding followed by compression molding.

18 Claims, 4 Drawing Sheets

Related U.S. Application Data continuation of application No. 17/474,874, filed on Sep. 14, 2021, now Pat. No. 11,643,535, which is a continuation of application No. 16/425,281, filed on May 29, 2019, now Pat. No. 11,149,138, which is a continuation of application No. 15/833,276, filed on Dec. 6, 2017, now Pat. No. 10,344,150, which is a continuation of application No. 15/458,332, filed on Mar. 14, 2017, now Pat. No. 9,879,133.

(60) Provisional application No. 62/429,912, filed on Dec. 5, 2016, provisional application No. 62/329,625, filed on Apr. 29, 2016, provisional application No. 62/308,694, filed on Mar. 15, 2016.

(51) Int. Cl.
*A43B 13/22* (2006.01)
*B29D 35/12* (2010.01)

(56) References Cited

U.S. PATENT DOCUMENTS

| | | |
|---|---|---|
| 6,225,366 B1 | 5/2001 | Raetzsch et al. |
| 6,303,723 B1 | 10/2001 | Sen et al. |
| 6,391,438 B1 | 5/2002 | Ramesh et al. |
| 6,555,214 B1 | 4/2003 | Yates |
| 6,599,597 B1 | 7/2003 | Bonk et al. |
| RE38,993 E | 2/2006 | Reedy |
| 7,083,849 B1 | 8/2006 | Albrecht et al. |
| 7,105,600 B2 | 9/2006 | Kitano et al. |
| 7,506,459 B2 | 3/2009 | Grisoni et al. |
| 7,784,197 B2 | 8/2010 | Crane et al. |
| 7,810,252 B2 | 10/2010 | Stone et al. |
| 7,883,769 B2 | 2/2011 | Seth et al. |
| 7,941,944 B2 | 5/2011 | Cagliari |
| 8,008,363 B2 | 8/2011 | Mori et al. |
| 8,333,903 B2 | 12/2012 | Rolland et al. |
| 8,813,392 B2 | 8/2014 | Maron et al. |
| 9,080,051 B2 | 7/2015 | Peterson et al. |
| 9,260,578 B2 | 2/2016 | Su et al. |
| 2005/0187355 A1 | 8/2005 | Tasaka et al. |
| 2005/0275127 A1 | 12/2005 | Shih |
| 2006/0154998 A1 | 7/2006 | Shiba et al. |
| 2006/0211819 A1 | 9/2006 | Hoenig et al. |
| 2006/0213600 A1 | 9/2006 | Wu et al. |
| 2006/0249417 A1 | 11/2006 | Jones |
| 2007/0129454 A1 | 6/2007 | Su et al. |
| 2007/0289162 A1 | 12/2007 | Liu et al. |
| 2008/0075914 A1 | 3/2008 | Cheng |
| 2008/0229623 A1 | 9/2008 | Ferretti |
| 2008/0271340 A1 | 11/2008 | Grisoni et al. |
| 2008/0289289 A1 | 11/2008 | Wiercinski et al. |
| 2009/0247656 A1 | 10/2009 | Jacob et al. |
| 2009/0275690 A1 | 11/2009 | Weaver et al. |
| 2010/0055358 A1 | 3/2010 | Weaver et al. |
| 2010/0099784 A1 | 4/2010 | Su et al. |
| 2010/0126042 A1 | 5/2010 | Wyon |
| 2011/0178195 A1 | 7/2011 | Cheng |
| 2011/0277351 A1 | 11/2011 | Scoledes |
| 2012/0317845 A1 | 12/2012 | Vattes |
| 2013/0055594 A1 | 3/2013 | Hochart |
| 2013/0101826 A1 | 4/2013 | Haug et al. |
| 2014/0013625 A1 | 1/2014 | Grott et al. |
| 2014/0068965 A1 | 3/2014 | Vattes et al. |
| 2014/0196306 A1 | 7/2014 | Gill |
| 2014/0331519 A1 | 11/2014 | Campbell et al. |
| 2015/0143723 A1 | 5/2015 | Tateishi et al. |
| 2015/0181975 A1 | 7/2015 | Otsuka et al. |
| 2015/0196085 A1 | 7/2015 | Westmoreland et al. |
| 2015/0225526 A1 | 8/2015 | Tu et al. |
| 2015/0257473 A1 | 9/2015 | Liu et al. |
| 2017/0119094 A1 | 5/2017 | Vontorcik, Jr. et al. |
| 2017/0215522 A1 | 8/2017 | Tateishi et al. |
| 2017/0267846 A1 | 9/2017 | Baghdadi |
| 2018/0022024 A1 | 1/2018 | Saito et al. |

FOREIGN PATENT DOCUMENTS

| | | | |
|---|---|---|---|
| CN | 101904591 | A | 12/2010 |
| CN | 102031010 | A | 4/2011 |
| CN | 102171281 | A | 8/2011 |
| CN | 102532677 | A | 7/2012 |
| CN | 103192573 | A | 7/2013 |
| CN | 103205026 | | 7/2013 |
| CN | 104403192 | A | 3/2015 |
| CN | 104448529 | A | 3/2015 |
| CN | 104910507 | A | 9/2015 |
| CN | 104927182 | A | 9/2015 |
| CN | 106117766 | A | 11/2016 |
| CN | 107108833 | | 8/2017 |
| CN | 107501713 | A | 12/2017 |
| EP | 1457540 | A1 | 9/2004 |
| EP | 1880625 | | 1/2008 |
| EP | 2508922 | | 10/2012 |
| EP | 2695537 | A2 | 2/2014 |
| EP | 2818062 | A1 | 12/2014 |
| EP | 2873339 | A1 | 5/2015 |
| EP | 3111794 | A1 | 1/2017 |
| EP | 3202276 | A1 | 8/2017 |
| EP | 3244240 | A1 | 11/2017 |
| FR | 2993757 | A1 | 1/2014 |
| GB | 2411617 | A | 9/2005 |
| JP | H11253201 | A | 9/1999 |
| JP | 2003073494 | A | 3/2003 |
| JP | 2007195944 | A | 8/2007 |
| JP | 2008109152 | A | 5/2008 |
| JP | 2012159589 | A | 8/2012 |
| JP | 2013028654 | | 2/2013 |
| JP | 5719980 | B1 | 5/2015 |
| KR | 20060016112 | A | 2/2006 |
| KR | 101472929 | B1 | 12/2014 |
| RU | 109377 | U1 | 10/2011 |
| TW | I257850 | B | 7/2006 |
| TW | 200628089 | A | 8/2006 |
| TW | M297647 | U | 9/2006 |
| WO | 2002014423 | A1 | 2/2002 |
| WO | 03095657 | A2 | 11/2003 |
| WO | 2005000958 | A1 | 1/2005 |
| WO | 2006099631 | A1 | 9/2006 |
| WO | 2006102154 | A2 | 9/2006 |
| WO | 2008083451 | A1 | 7/2008 |
| WO | 2008152414 | A1 | 12/2008 |
| WO | 2012065333 | A2 | 5/2012 |
| WO | 2012092019 | A1 | 7/2012 |
| WO | 2013090174 | A1 | 6/2013 |
| WO | 2013150231 | A1 | 10/2013 |
| WO | WO-2014035467 A1 * | 3/2014 | ............ C08J 9/0061 |
| WO | 2017115840 | A1 | 7/2017 |
| WO | 2017160870 | A1 | 9/2017 |
| WO | 2017160874 | A1 | 9/2017 |
| WO | 2017160876 | A1 | 9/2017 |
| WO | 20180005295 | A1 | 1/2018 |

OTHER PUBLICATIONS

Liu, C.; Lin, J. "Preparation of Super Light Foamed EVA" China Plastics, 2004, Issue 2, pp. 60-64.

International Search Report and Written Opinion for PCT/US2017/022350 mailed Jul. 18, 2017.

John O. Akindoyo, M. D. H. Beg, Suriati Ghazal!, M. R. Islam, Nitthiyah Jeyaratnama and A. R. Yuvarajc: "Polyurethane types, synthesis and applications a review", RSC Advances, vol. 6, Nov. 24, 2016 (Nov. 24, 2016), pp. 114453-114482, XP002794407, DOI: 10.1039/C6RA14525F.

Sharudin, R. W. B. et al. "Preparation of microcellular thermoplastic elastomer foams from polystyrene-b-ethylene-butylene-b-polystyrene (SEBS) and their blends with polystyrene" Publisher: John Wiley and Sons Inc. Elastomers; Journal of Applied Polymer Science, v 128, n 4, p. 2245-2254, May 15, 2013.

Lippa, N. "Mechanical ageing protocol selection affects macroscopic performance and molecular level properties of ethylene vinyl acetate (EVA) running shoe midsole foam" Publisher: Elsevier Ltd; Conference: 2014 10th Conference of the International Sports

(56) References Cited

OTHER PUBLICATIONS

Engineering Association;Procedia Engineering, v 72, p. 285-291, Jul. 2014.
Characterization of Ethylene Vinyl Acetate Copolymers by Dielectric Analysis, TA Instruments, https://www.tainstruments.com/pdf/.
Larkin, J. B. "Block Copolymer Thermoplastic Rubbers: Their Properties and End Use Applications" SPE, p. 26-37, 1976; Conference: SPE Bicenten Reg Tech Conf, Plast in the Mid-Ohio Val, Nov. 30, 1976-Dec. 1, 1976.
Damani, A. G. "Polyblends of polystyrene and high impact polystyrene with styrene ethylene butylene styrene thermoplastic elastomer" University of Massachusetts Lowell, ProQuest Dissertations Publishing; MAI 35/04, p. 1058, Aug. 1997.
Zhao et al., "Tuning the mechanical properties of weakly phase-separated olefin block copolymer by establishing co-crystallization structure with the aid of linear polyethylene; the dependence on molecular chain length," CrystEngComm, 2017, 19, pp. 2884-2893.
Written Opinion of the International Preliminary Examining Authority for PCT/US2017/022350 mailed Jan. 23, 2018.
Yin, H. et al. "EVA/SEBS blends foaming technology" Publisher: Chengdu University of Science and Technology; Gaofenzi Cailiao Kexue Yu Gongcheng/Polymeric Materials Science and Engineering, v 25, n 8, p. 90-93, Aug. 2009 (Language: Chinese).
Hiroyuki, M.A.E. "Relationship of mechanical properties between neat PP/SEBS blends and syntactic pp/sebs foams with polymer microballoons" Publisher: Society of Materials Science Japan; v 57, n 12, p. 1253-1260, Dec. 2008.
Data Sheet for Tuftec H1221. Asahi Kasei. 2017.
Data Sheet for Tuftec H1051. Asahi Kasei. 2017.
International Preliminary Report on Patentability for PCT/US2017/022359 mailed Jun. 14, 2018.
Hydrogenated Styrenic Block Copolymer Offers Benefits for PSAs. ASI Adhesives and sealants, Mar. 20, 2003.
Written Opinion of the International Preliminary Examining Authority for PCT/US2017/022359 mailed Jan. 25, 2018.
International Search Report and Written Opinion for PCT/US2017/022359 mailed Jul. 18, 2017.
International Preliminary Report on Patentability for PCT/US2019/035258 mailed Jul. 13, 2020.

Phinyocheep, P. et al. "Influence of compatibilizers on mechanical properties, crystallization, and morphology of polypropylene/scrap rubber dust blends" Journal of Applied Polymer Science, v 86, n 1, p. 148-159, Oct. 3, 2002.
Schroeder, P. et al. "Gear lever in hand: Two component concept for private cars" Kunststoffe Plast Europe, v 92, n 3, p. 41-42+122-123, Mar. 2002 (Language: German).
International Search Report and Written Opinion for PCT/US2019/035258 mailed Oct. 8, 2019.
Ulug, E. et al. "Effects of HIPS on the mechanical, thermal and morphological properties of SEBS and SIS type elastomers". 11th International Conference on the Mechanical Behavior of Materials; Procedia Engineering, v 10, p. 3092-3097, 2011.
Wang, Y. et al. "SEBS modified reclaimed rubber microcellular foaming material as the sole of the shoe" Publisher: Chengdu University of Science and Technology; Gaofenzi Cailiao Kexue Yu Gongcheng/Polymeric Materials Science and Engineering, v 26, n 12, p. 148-151, Dec. 2010 (Language: Chinese).
Written Opinion of the International Preliminary Examining Authority for PCT/US2017/022356 mailed Jan. 29, 2018.
International Search Report for PCT/US/2019/064267 mailed Feb. 18, 2020.
International Preliminary Report on Patentability for PCT/US2017/022356 mailed Jun. 14, 2018.
Data Sheet for Tuftec H1052. Asahi Kasei. 2017.
Data Sheet for Tuftec H1062. Asahi Kasei. 2017.
Maiti, M. "Microcellular foam from ethylene vinyl acetate/polybutadiene rubber (EVA/BR) based thermoplastic elastomers for footwear applications" Industrial and Engineering Chemistry Research, v 51, n 32, p. 10607-10612, Aug. 15, 2012.
Kuraray "Septon Hybar Thermoplastic Elastomers Technical Information," 2017.
Written Opinion of the International Preliminary Examining Authority for PCT/US2019/035258 mailed Apr. 30, 2020.
Tafmer, Alpha olefin copolymer, DF series, Mitsubishi Chem., 2010.
International Search Report and Written Opinion for PCT/US2017/022356 mailed Jul. 18, 2017.

\* cited by examiner

FOAM COMPOSITIONS AND USES THEREOF

CROSS-REFERENCE TO RELATED APPLICATIONS

This application is a continuation of U.S. patent application entitled "FOAM COMPOSITIONS AND USES THEREOF" having Ser. No. 18/177,949, filed Mar. 3, 2023, which is a continuation of U.S. patent application entitled "FOAM COMPOSITIONS AND USES THEREOF" having Ser. No. 17/474,874 filed Sep. 14, 2021, now U.S. Pat. No. 11,643,535, which is a continuation of U.S. patent application entitled "FOAM COMPOSITIONS AND USES THEREOF" having Ser. No. 16/425,281 filed May 29, 2019, now U.S. Pat. No. 11,149,138, which is a continuation of U.S. patent application entitled "FOAM COMPOSITIONS AND USES THEREOF" having Ser. No. 15/833,276 filed Dec. 6, 2017, now U.S. Pat. No. 10,344,150, which is a continuation of U.S. patent application entitled "FOAM COMPOSITIONS AND USES THEREOF" having Ser. No. 15/458,332 filed Mar. 14, 2017, now U.S. Pat. No. 9,879,133, which claim priority to, and the benefit of U.S. provisional application entitled "FOAM COMPOSITIONS AND USES THEREOF" having Ser. No. 62/308,694 filed Mar. 15, 2016, U.S. provisional application entitled "FOAM COMPOSITIONS AND USES THEREOF" having Ser. No. 62/329,625 filed Apr. 29, 2016, and U.S. provisional application entitled "FOAM COMPOSITIONS AND USES THEREOF" having Ser. No. 62/429,912 filed Dec. 5, 2016, the contents of which are each incorporated by reference in their entirety.

TECHNICAL FIELD

The present disclosure generally relates to materials, and in particular to materials for the footwear and related industries and uses thereof.

BACKGROUND

Footwear design involves a variety of factors from the aesthetic aspects, to the comfort and feel, to the performance and durability. While footwear design and fashion may be rapidly changing, the demand for increasing performance in the athletic footwear market is unchanging. To balance these demands, footwear designers employ a variety of materials and designs for the various components that make up an article of footwear.

BRIEF DESCRIPTION OF THE DRAWINGS

Further aspects of the present disclosure will be readily appreciated upon review of the detailed description, described below, when taken in conjunction with the accompanying drawings.

DETAILED DESCRIPTION

New designs and materials for the footwear industry are needed. In particular, there remains a need for improved foam compositions, for example that can be used in the footwear industry to provide improved cushion and energy return when used in a midsole or other component for an article of footwear.

In various aspects, compositions are provided that can be foamed, i.e. can be used to produce a foam composition. For clarity, compositions that have not been foamed will, in some instances be referred to as "pre-foam" compositions. Foam compositions are also provided, e.g. compositions that have been prepared by foaming a "pre-foam" composition described herein. Articles of footwear, such as athletic shoes, and components thereof are also provided including one or more of the foam compositions. In particular, various aspects of the present disclosure describe sole components for an article of footwear having exceptionally high energy return. The sole components having exceptionally high energy return can be made from foaming a pre-foam composition described herein. Methods of making the compositions and components made therefrom are also provided.

Before the present disclosure is described in greater detail, it is to be understood that this disclosure is not limited to particular aspects described, and as such may, of course, vary. Other systems, methods, features, and advantages of foam compositions and components thereof will be or become apparent to one with skill in the art upon examination of the following drawings and detailed description. It is intended that all such additional systems, methods, features, and advantages be included within this description, be within the scope of the present disclosure, and be protected by the accompanying claims. It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Articles of Footwear

In various aspects, articles of footwear are provided. In particular, articles of footwear are provided including one or more components made entirely or partially from a foam mentioned above and described in more detail below. The foams and components made therefrom can have a range of desirable properties for footwear, including softness, durability, and an exceptionally high energy return. The articles of footwear can, in principal, include any article of footwear. In various aspects, the article of footwear can include a shoe, a boot, or a sandal.

Figure 1:
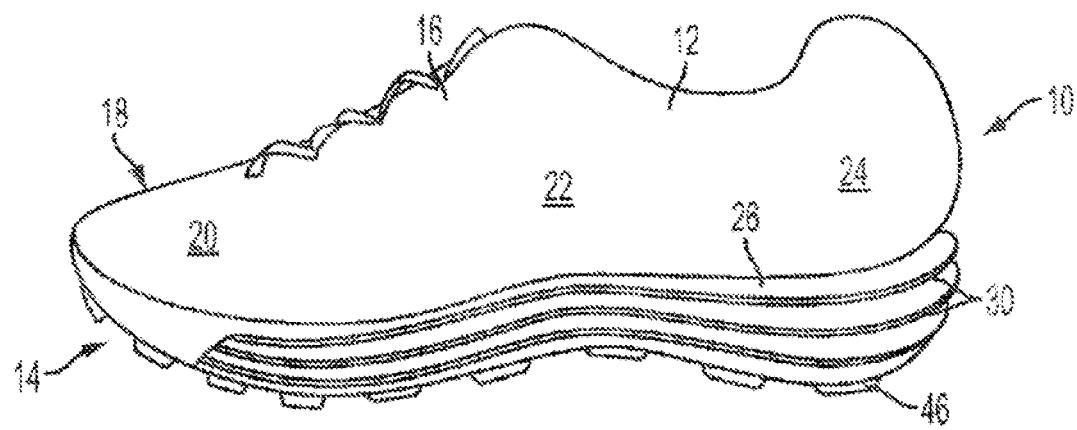
FIG. 1 is an elevation view of an article of footwear with a sole component according to an aspect of the invention.

The most common articles of footwear are shoes. Shoes can include athletic shoes such as baseball shoes, basketball shoes, soccer shoes, football shoes, running shoes, cross-trainer shoes, cheerleading shoes, golf shoes, and the like. The shoes can, in some aspects, be cleated. An exemplary article of footwear 10 is shown in FIG. 1. While an athletic shoe is exemplified in FIG. 1, it will be readily understood that some of the terminology employed will also apply to other articles of footwear or to other styles of shoe. Footwear 10 includes an upper 12 and a sole component 14 secured to upper 12. Sole component 14 can be secured to upper 12 by adhesive or any other suitable means. As used herein, the sole component 14 can be a monolithic component formed entirely of the foam material as described herein, or a multi-component assembly formed of a plurality of monolithic components, where at least one of the monolithic components is formed entirely of the foam material as described herein. Footwear 10 has a medial, or inner, side 16 and a lateral, or outer, side 18.

The upper, in some aspects, is unformed until the point that it is attached to the sole component. In some aspects, the upper is a lasted upper. A "lasted upper," as used herein, refers to an upper that is formed into the shoe shape prior to attachment to the sole by one or more mechanical means. The lasted upper can include a heel counter formed to shape the heel of the upper. The lasted upper can include a strobel sock or a strobel board attached to the upper, typically via a strobel stitch.

Sole component 14, which is generally disposed between the foot of the wearer and the ground, provides attenuation of ground reaction forces (i.e., imparting cushioning), traction, and may control foot motions, such as pronation. As with conventional articles of footwear, sole component 14 can include an insole (not shown) located within upper 12. In some aspects, the sole component is an insole or sockliner or is a multi-component assembly including an insole or sockliner, can further include an insole or sockliner located within the upper, where the insole or sockliner is formed entirely or partially of a foam material described herein. Articles of footwear described herein can include an insole or sockliner formed entirely or partially of a foam material described herein.

The most common components of shoes and other footwear can be classified into one of three types of components: upper components, lower components, and grindery components. Upper components refer collectively to all of the components that are stitched or otherwise joined together to form the upper. The materials in the upper generally contribute to characteristics such as breathability, conformability, weight, and suppleness or softness. The lower components refer collectively to all of the components that collectively form the lower. The lower can include, for example, the outsole and midsole. The choice of outsole materials and design will contribute, for instance, to the durability, traction, as well as to the pressure distribution during use. The midsole materials and design contribute to factors such as the cushioning and support. Grindery components include all of the additional components that can be attached to the upper, lower, or both. Grindery components can include, for example, eyelets, toe puffs, shanks, nails, laces, velcro, catches, backers, linings, padding, heel backings, heel foxings, toe caps, etc.

For purposes of general reference, footwear 10 can be divided into three general portions: a forefoot portion 20, a midfoot portion 22, and a heel portion 24. Portions 20, 22, and 24 are not intended to demarcate precise areas of footwear 10. Rather, portions 20, 22, and 24 are intended to represent general areas of footwear 10 that provide a frame of reference during the following discussion.

Unless otherwise stated, or otherwise clear from the context below, directional terms used herein, such as rearwardly, forwardly, top, bottom, inwardly, downwardly, upwardly, etc., refer to directions relative to footwear 10 itself. Footwear is shown in FIG. 1 to be disposed substantially horizontally, as it would be positioned on a horizontal surface when worn by a wearer. However, it is to be appreciated that footwear 10 need not be limited to such an orientation. Thus, in FIG. 1, rearwardly is toward heel portion 24, that is, to the right as seen in FIG. 1. Naturally, forwardly is toward forefoot portion 20, that is, to the left as seen in FIG. 1, and downwardly is toward the bottom of the page as seen in FIG. 1. Top refers to elements toward the top of the page as seen in FIG. 1, while bottom refers to elements toward the bottom of the page as seen in FIG. 1. Inwardly is toward the center of footwear 10, and outwardly is toward the outer peripheral edge of footwear 10.

Unless otherwise stated, or otherwise clear from the context below, directional terms used herein, such as rearwardly, forwardly, top, bottom, inwardly, downwardly, upwardly, etc., refer to directions relative to footwear 10 itself. Footwear is shown in FIG. 1 to be disposed substantially horizontally, as it would be positioned on a horizontal surface when worn by a wearer. However, it is to be appreciated that footwear 10 need not be limited to such an orientation. Thus, in FIG. 1, rearwardly is toward heel portion 24, that is, to the right as seen in FIG. 1. Naturally, forwardly is toward forefoot portion 20, that is, to the left as seen in FIG. 1, and downwardly is toward the bottom of the page as seen in FIG. 1. Top refers to elements toward the top of the page as seen in FIG. 1, while bottom refers to elements toward the bottom of the page as seen in FIG. 1. Inwardly is toward the center of footwear 10, and outwardly is toward the outer peripheral edge of footwear 10.

Figure 2:
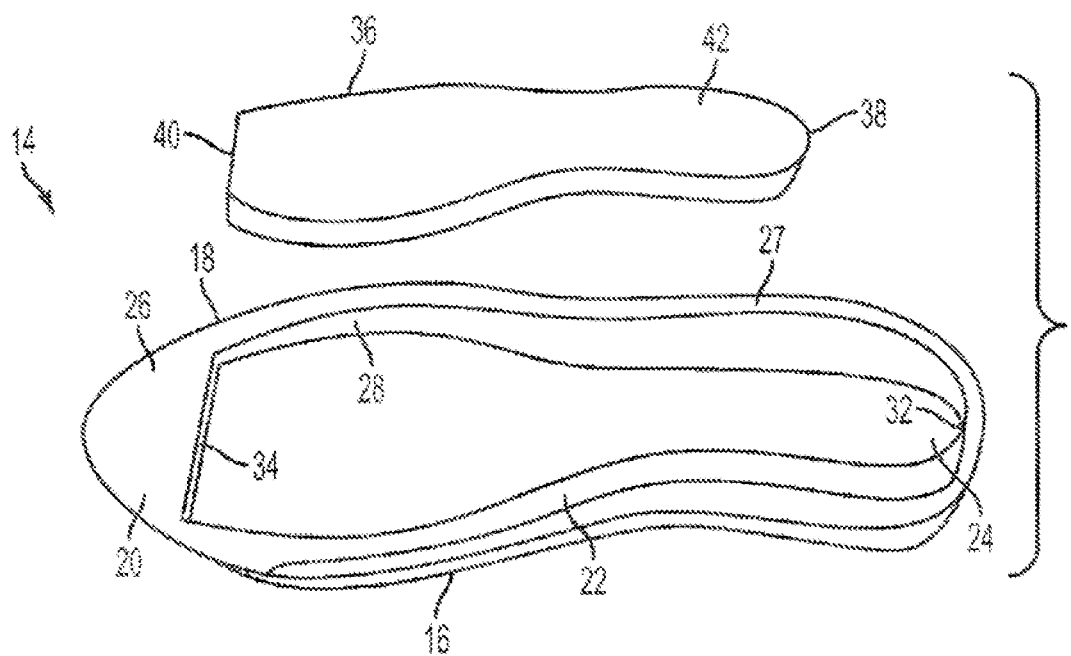
FIG. 2 is an exploded view of the sole component of the article of footwear of FIG. 1.

As can be seen in FIG. 2, sole component 14 consists of a first portion 26 having an upper surface 27 with a recess 28 formed therein. Upper surface 27 is secured to upper 12 with adhesive or other suitable fastening means. A plurality of substantially horizontal ribs 30 is formed on the exterior of first portion 26. In certain aspects, ribs 30 extend from a central portion of forefoot portion 20 on medial side 16 rearwardly along first portion 26, around heel portion 24 and forwardly on lateral side 18 of first portion 26 to a central portion of forefoot portion 20.

First portion 26 provides the external traction surface of sole component 14. In certain aspects it is to be appreciated that a separate outsole component could be secured to the lower surface of first portion 26.

Recess 28 extends from heel portion 24 to forefoot portion 20. In certain aspects, the rear surface 32 of recess 28 is curved to substantially follow the contour of the rear of heel portion 24 and the front surface 34 of recess 28 extends transversely across first portion 26.

An insert 36 is received in recess 28. Insert 36 has a curved rear surface 38 to mate with curved rear surface 32 of recess 28 and a transverse front surface 40 to mate with transverse front surface 34 of recess 28. An upper surface 42 of insert 36 is in contact with and secured to upper 12 with adhesive or other suitable fastening means.

Figure 3:
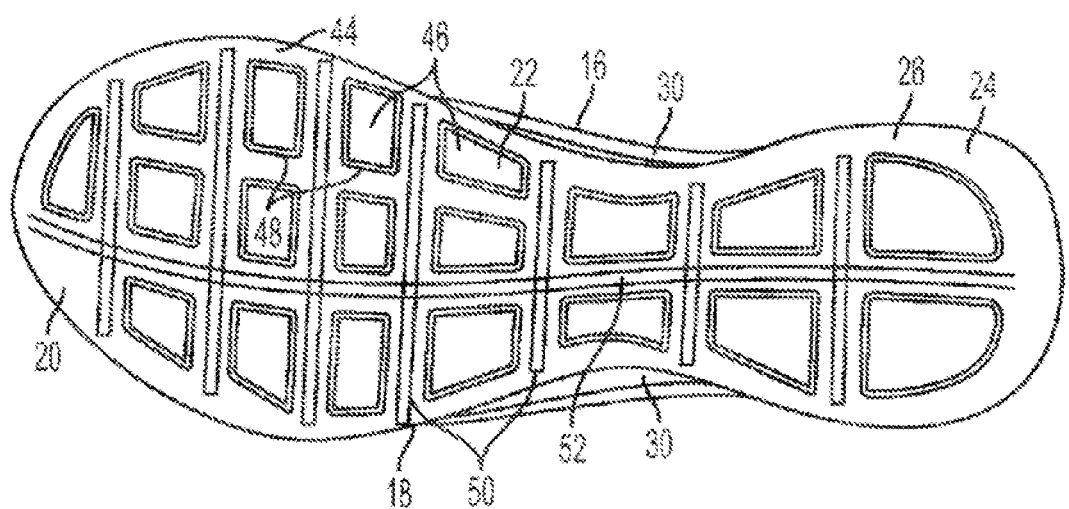
FIG. 3 is a plan view of the bottom of the sole component of the article of footwear of FIG. 1.

As seen best in FIG. 3, a ground engaging lower surface 44 of first portion 26 includes a plurality of projections 46. Each projection 46 is surrounded by a groove 48. A plurality of transverse slots 50 are formed in lower surface 44, extending between adjacent projections 46. A longitudinal slot 52 extends along lower surface 44 from heel portion 26 to forefoot portion 20.

As illustrated in FIG. 2, insert 36 can provide cushioning or resiliency in the sole component. First portion 26 can provide structure and support for insert 36. In such aspects, first portion 26 can be formed of a material of higher density and/or hardness as compared to insert 36 such as, for example, non-foam materials including rubber and thermoplastic polyurethane, as well as foam materials. In certain aspects, insert 36 can be formed of a foam material as disclosed herein.

Figure 4:
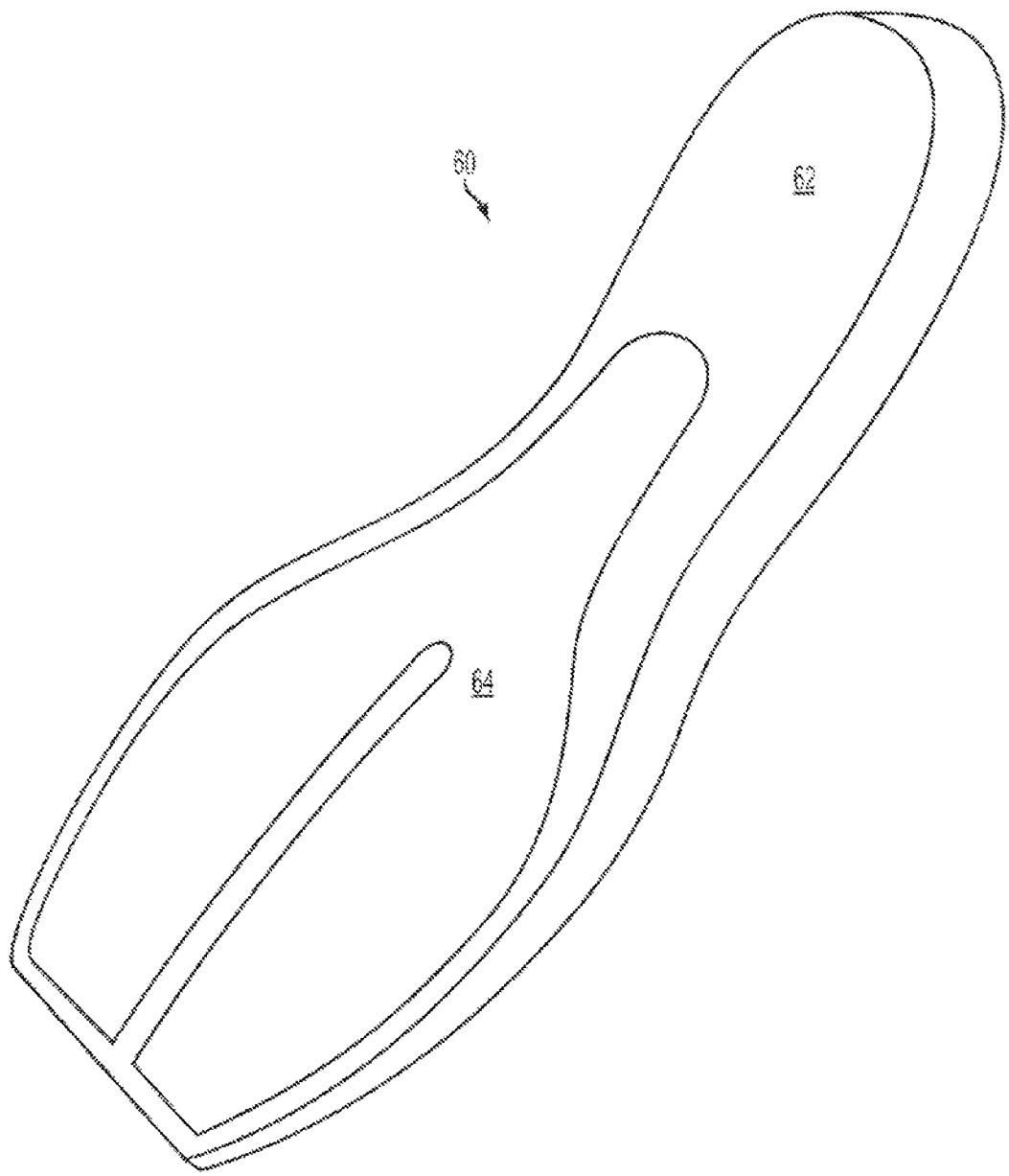
FIG. 4 is a bottom view of an insert for use in a sole component of an article of footwear.
Figure 5:
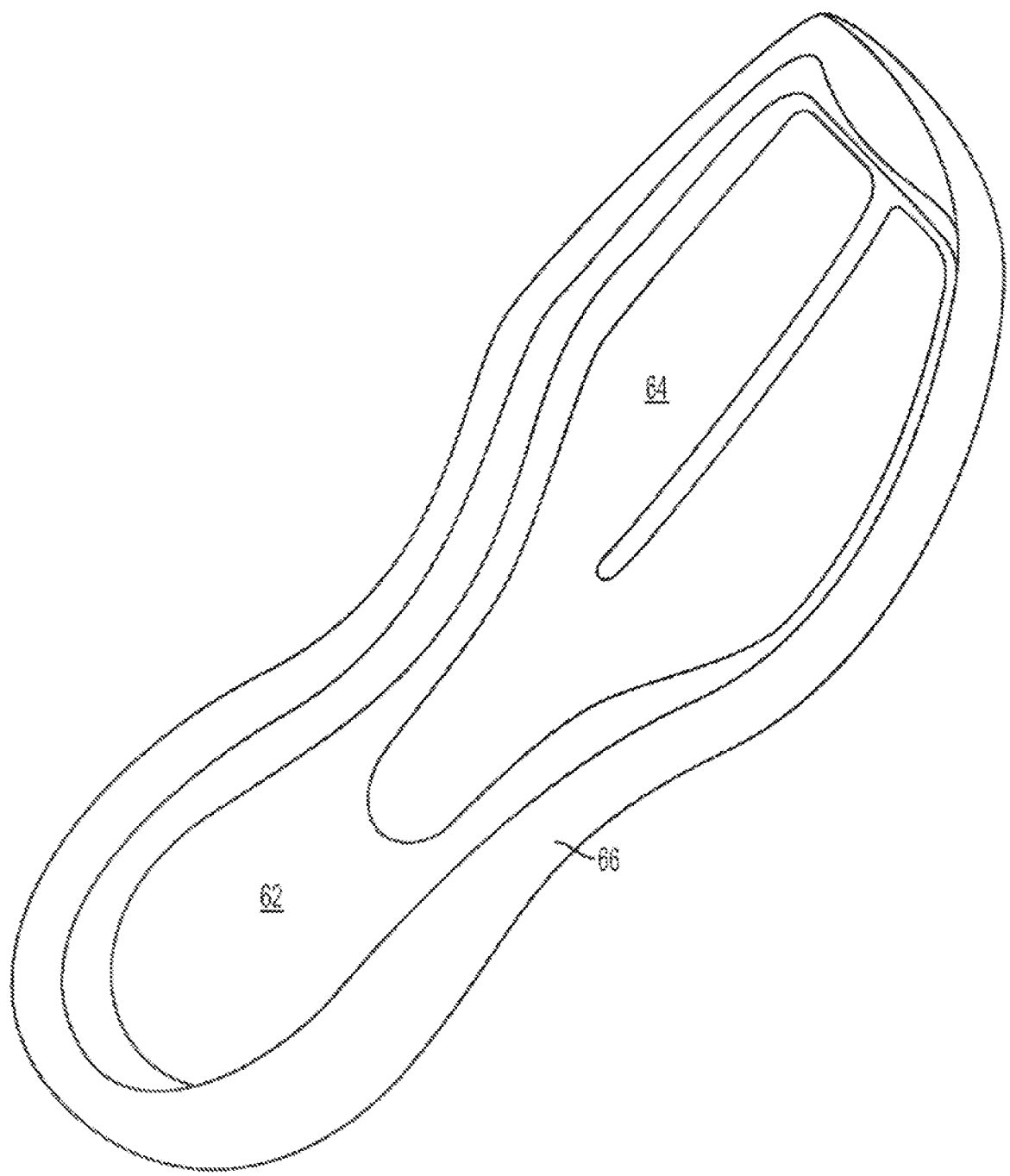
FIG. 5 is a top view of the insert of FIG. 4 inserted in a first portion to form a sole component.

FIGS. 4 and 5 show bottom and top views of an insert 60 which can be used in a sole component as described herein. Insert 60 is similar to insert 36, but as illustrated in FIGS. 4 and 5, insert 60 is formed of two types of materials 62 and 64, where at least one of the materials is a foam as disclosed herein. FIG. 4 shows a bottom view of insert 60, while FIG.

5 shows a top view of insert 60 formed of two types of materials 62 and 64, with the insert placed inside a first portion 66 to form a sole component 14. Inserts with more than two types of materials, at least one of which is a foam as disclosed herein, can also be used. In the example illustrated in FIGS. 4 and 5, a portion of a first material 62 can be used in the heel region of the insert, and a portion of a second material 64 can be used in the toe region of the insert. A higher density material can be used to support the heel region, while a lower density material can be used to support the toe region. For example, the density of the first material can be at least 0.02 g/cm$^3$ greater than the density of the second material. The shape of the portions of the two materials 62 and 64 of the insert can be any suitable shape. For example, the heel region can be in the shape of a wedge. Inserts formed of two types of materials can be useful in running shoes, as well as in basketball shoes.

While the compositions and foams described herein can be used for making any of a variety of components for an article of footwear, in particular aspects the components include a midsole, an outsole, an insole, a tongue padding, a collar padding, and a combination thereof. In some aspects, the component is a sole component, such as a sole component 14 depicted in FIGS. 1-5, that includes a foam described herein. In some aspects, the component is an insert such as insert 36 or insert 60 depicted in FIGS. 4-5 that includes a foam described herein. The sole components and inserts for sole components can be made partially or entirely of a foam described herein. Any portion of a sole component or an insert for a sole component can be made of a foam described herein. For example, first portion 26 of the sole component (optionally including the ground engaging lower surface 44, such as the plurality of projections 46 and/or the groove 48 surrounding the projections), the entire insert 36, portions 62 or 64 of insert 60, a separate outsole component, or any combination thereof, can include a foam as described herein. The sole components and inserts can be made by foaming a composition provided herein, for example by injection molding or by injection molding followed by compression molding as described herein. The foams and components can demonstrate improved physical properties including one or more of an enhanced energy return, and enhanced split tear, a decreased specific density, or a combination thereof.

Split tear is an important physical property for a foam for a component of an article of footwear or athletic equipment. In some aspects, the foam or component can have a split tear value of about 1.0 kg/cm to 4.5 kg/cm, about 1.6 kg/cm to 4.0 kg/cm, about 2.0 kg/cm to 4.0 kg/cm, about 2.0 kg/cm to 3.5 kg/cm, or about 2.5 kg/cm to 3.5 kg/cm. The split tear can be measured as described in the examples below. In some aspects, the foam or component is compression molded, and the compression molded foam or component can have a split tear of about 0.08 kg/cm to 4.0 kg/cm, about 0.9 kg/cm to 3.0 kg/cm, about 1.0 to 2.0 kg/cm, about 1.0 kg/cm to 1.5 kg/cm, or about 2 kg/cm. In some aspects, the foam or component is injection molded, and the foam or component can have a split tear of about 0.07 kg/cm to 2.0 kg/cm, or about 0.8 kg/cm to 1.5 kg/cm, or about 0.9 to 1.2 kg/cm, about 1.5 kg/cm to 2.2 kg/cm.

The energy return, a measure of the percentage of energy the foam or component returns when compressed, is an important physical property. This is especially true for running and other athletic shoes. In some aspects, the foams and components provided herein have an energy return of about 60% to 90%, about 60% to 85%, about 65% to 85%, or about 70% to 85%. In some aspects, the foam or component is compression molded and can have an energy return of about 60% to 95% (e.g., about 60% to 85%; about 65% to 80%; about 65% to 75%; about 70% to 80%; or about 75% to 80%; about 75% to 85%; about 80% to 95%; or about 85% to 95%). The energy return can be measured as described in the examples below.

The foams and components can be lightweight. In some aspects, the foams and components can have a specific density of about 0.05 to 0.25, about 0.05 to 0.2, about 0.05 to 0.15 about 0.08 to 0.15, about 0.08 to 0.20, about 0.08 to 0.25, or about 0.1 to 0.15. In some aspects the foam or component is compression molded and can have a specific density of about 0.15 to 0.3, about 0.2 to 0.3, or about 0.15 to 0.25.

In some examples, the process for making the foams and components of the various examples described herein further includes compression molding the foam to give a compression molded foam or a compression molded component. In some aspects, compression molding foamed preforms formed from the foam compositions of the present disclosure can produce compression molded foam components having physical properties which make these components particularly advantageous for use in articles of footwear and athletic equipment. For example, the physical properties of these compression molded foam components make them particularly useful for use as cushioning elements, such as midsoles.

In some aspects, the resiliency and/or energy return of the compression molded foam or compression molded component can be significantly greater than the resiliency and/or energy return of the otherwise same foam preform used to make the compression molded foam component. While compression molded foam components formed from preforms foamed using other blowing methods sometimes have greater resiliency and/or energy return than their preforms, an even greater increase in resiliency and/or energy return can be achieved when compression molding foam preforms that were foamed using an impregnation process utilizing a physical blowing agent, as described herein. The resiliency and/or energy return of the compression molded foam component can be at least at least 6 percentage points, or at least 7 percentage points, or at least 8 percentage points, or at least 9 percentage points, or at least 10 percentage points, or at least 12 percentage points greater than the resiliency and/or energy return of the foam preform used to make the compression molded foam component. In particular examples, the resiliency and/or energy return of the compression molded foam component is at least 9 percentage points greater than the resiliency and/or energy return of the foam preform used for make the compression molded foam component.

This greater increase in the resiliency and/or energy return of the compression molded foam component can thus result in components having higher resiliency and/or energy return than would be possible using foam preforms made using other blowing methods. Using the blowing methods described herein, it has been found that it is possible to produce compression molded foam components having higher than usual resiliencies while using materials and methods which are cost-effective for use in consumer goods such as articles of footwear and athletic equipment. The resiliency and/or energy return of the compression molded foam component can be greater than 45%, or greater than 50%, or greater than 55%, or greater than 60%, or greater than 65%. For example, the resiliency and/or energy return of the compression molded foam component can be from 45% to 95%, or from 50% to 90%, or from 55% to 90%, or from 60% to 80%, or from 50% to 85%, or from 55% to 75%, or from 60% to 75%. Compression molded foam components having resiliencies greater than 45%, or 50%, or 55%, or 60%, or 65%, can be particularly advantageous for use in articles of footwear. Additionally or in combination, the resiliency and/or energy return of the foam preform can be less than 75%, or less than 70%, or less than 65%, or less than 60%. For example, the resiliency and/or energy return of the foam preform can be from 40% to 80%, or from 55% to 75%, or from 50% to 70% or from 65% to 80%.

In particular examples, the resiliency and/or energy return of the compression molded foam component can be at least at least 6 percentage points, or at least 7 percentage points, or at least 8 percentage points, or at least 9 percentage points, or at least 10 percentage points, or at least 12 percentage points greater than the resiliency and/or energy return of the foam preform used to make the compression molded foam component when the compression molded foam component has a resiliency and/or energy return greater than 45%, or greater than 50%, or greater than 55%, or greater than 60%, or greater than 65%.

Several methods of measuring resiliency and/or energy return of foams (e.g., foam preforms and foam components) exist in the art. One method of measuring resiliency of foams is based on ASTM D 2632-92, which is a test for solid rubber materials. For use with foams, the test sample is prepared as described in ASTM D2632-92, but uses a sample of foam in place of the sample of solid rubber. This test uses a plunger which is dropped from a height onto a test sample while being guided by a vertical rod. The drop height is divided into 100 equal parts, and the height to which the plunger rebounds is measured using this 100 part scale, to determine the resiliency of the sample. Alternative methods which use a ball of standard weight dropped onto a sample, and which measure the rebound height of the ball to determine the resiliency of the sample can also be used.

The specific gravity of a foam is also an important physical property to consider when using a foam for a component of an article of footwear or athletic equipment. The foams and components of the present disclosure can have a specific gravity of from 0.02 g/cm$^3$ to 0.22 g/cm$^3$, or of from 0.03 g/cm$^3$ to 0.12 g/cm$^3$, or of from 0.04 g/cm$^3$ to 0.10 g/cm$^3$, or from 0.11 g/cm$^3$ to 0.12 g/cm$^3$, from 0.15 g/cm$^3$ to 0.2 g/cm$^3$; 0.15 g/cm$^3$ to 0.30 g/cm$^3$. Alternatively or in addition, the foam preform can have a specific gravity of from 0.01 g/cm$^3$ to 0.10 g/cm$^3$, or of from 0.02 g/cm$^3$ to 0.08 g/cm$^3$, or of from 0.03 g/cm$^3$ to 0.06 g/cm$^3$; 0.08 g/cm$^3$ to 0.15 g/cm$^3$; or from 0.10 g/cm$^3$ to 0.12 g/cm$^3$. For example, the specific gravity of the compression molded foam component can be from or from 0.15 g/cm$^3$ to 0.2 g/cm$^3$, and the specific gravity of the foam preform can be from 0.10 g/cm$^3$ to 0.12 g/cm$^3$. The foam or component can be compression molded.

In particular examples, the resiliency and/or energy return of the compression molded foam component can be at least at least 6 percentage points, or at least 7 percentage points, or at least 8 percentage points, or at least 9 percentage points, or at least 10 percentage points, or at least 12 percentage points greater than the resiliency and/or energy return of the foam preform used to make the compression molded foam component when the compression molded foam component has a resiliency and/or energy return greater than 45%, or greater than 50%, or greater than 55%, or greater than 60%, or greater than 65%, and the compression molded foam can have a specific gravity of from 0.02 g/cm$^3$ to 0.15 g/cm$^3$, or of from 0.03 g/cm$^3$ to 0.12 g/cm$^3$, or of from 0.04 g/cm$^3$ to 0.10 g/cm$^3$ or from 0.11 g/cm$^3$ to 0.12 g/cm$^3$, from 0.15 g/cm$^3$ to 0.2 g/cm$^3$; or 0.15 g/cm$^3$ to 0.30 g/cm$^3$.

The specific gravity of the foam or component can be determined by testing at least 3 representative samples taken from a foam preform or compression molded foam component (e.g., a 2 inch×2 inch sample or a 1 inch×1 inch sample), or at least 3 entire foam preforms or compression molded foam components. Using a balance with appropriate accuracy for the weight of the sample, the weight of each sample is determined both in air and when the sample is completely submerged in distilled water at a temperature of 22° C.±2° C., after removing any air bubbles adhered to the surface of the foam sample weighing. The specific gravity (S.G.) is then calculated by taking the weight of the sample in water and subtracting that from the weight of the sample in air, and this value is then divided into the weight of the sample in air, where all the weights are weights in grams.

Compression set of a foam is another important physical property for a foam used as a component of an article of footwear or athletic equipment. In accordance with the present disclosure, the compression molded foam or compression molded component can have a compression set of from 40% to 100%. For example, the compression set can be from 45% to 90%, or from 40% to 80%, or from 50% to 75%.

Compression set can be measured by preparing a sample of a standard thickness (e.g., 10 mm) of a foam preform. Components having a thickness less than the standard can be stacked to make a sample having the standard thickness. The sample is loaded into a metal compression plate and compressed to a height of 50% of the original thickness (e.g., 5 mm). The sample is placed in a 50° C. oven on its side for 6 hours. At the end of the 6 hours, the sample is removed from the oven and from the metal compression plate, and allowed to cool for 30 minutes. Once cooled, the thickness of the sample is measured. The percent compression set (C.S.) is calculated by (a) subtracting the final sample thickness from the original sample thickness, and (b) subtracting the 50% compressed thickness from the original sample thickness, (c) dividing (a) by (b), and (d) multiplying the result by 100 to obtain the percent compression set (where all thicknesses are measured in millimeters).

Durometer is another important physical property of a foam or component that is to be used in an article of footwear or athletic equipment. In accordance with the present disclosure, the compression molded foam or component can have a durometer of at least 20 Asker C, or at least 30 Asker C, or at least 40 Asker C, or at least 50 Asker C. For example, the durometer of the compression molded foam or compression molded component can have a durometer of from 20 Asker C to 70 Asker C, or of from 20 Asker C to 40 Asker C, or from 30 Asker C to 35 Asker C, or of from 25 Asker C to 65 Asker C, or of from 30 Asker C to 50 Asker C, or of from 40 Asker C to 70 Asker C, or of from 35 Asker C to 55 Asker C, or from 50 Asker C to 65 Asker C. The foam preform can have a durometer of less than 40 Asker C, or less than 30 Asker C, or less than 20 Asker C. For example, the durometer of the foam preform can be from 15 Asker C to 50 Asker C, or from 20 Asker C to 50 Asker C, or from 20 Asker C to 40 Asker C, or from 20 Asker C to 30 Asker C. The durometer can be measured on a flat area of foam, e.g., at least 6 mm thick using an Asker C durometer.

In particular examples, the resiliency and/or energy return of the compression molded foam component can be at least at least 6 percentage points, or at least 7 percentage points, or at least 8 percentage points, or at least 9 percentage points, or at least 10 percentage points, or at least 12 percentage points greater than the resiliency and/or energy return of the foam preform used to make the compression molded foam component when the compression molded foam component has a resiliency and/or energy return greater than 45%, or greater than 50%, or greater than 55%, or greater than 60%, or greater than 65%, and the compression molded foam component can have a of at least 20 Asker C, or at least 30 Asker C, or at least 40 Asker C, or at least 50 Asker C. In addition, the compression molded foam can have a specific gravity of from 0.02 g/cm³ to 0.15 g/cm³, or of from 0.03 g/cm³ to 0.12 g/cm³, or of from 0.04 g/cm³ to 0.10 g/cm³, or from 0.11 g/cm³ to 0.12 g/cm³ from 0.15 g/cm³ to 0.2 g/cm³; or 0.15 g/cm³ to 0.30 g/cm³.

Split tear is another important physical property for a foam or a component used in an article of footwear or athletic equipment. In accordance with the present disclosure, the compression molded foam or component can have a split tear of from 0.08 kg/cm to 4.0 kg/cm, or of from 0.9 kg/cm to 3.0 kg/cm, or of from 1.0 to 2.0 kg/cm, or of from 1.0 kg/cm to 1.5 kg/cm, or of about 2 kg/cm. Alternatively or in addition, the foam preform can have a split tear of from 0.07 kg/cm to 2.0 kg/cm, or of from 0.8 kg/cm to 1.5 kg/cm, or of from 0.9 to 1.2 kg/cm, or from about 1.5 kg/cm to about 2.2 kg/cm.

Split tear for foam preforms and compression molded foam components can be measured using ASTM D3574-95. Although this method is directed to bonded and molded urethane foams, it can be used on any foam material in accordance with the present disclosure. A sample of foam having a thickness of 10 mm±1 mm. If the foam preform or compression molded foam component has an outer skin, the outer skin should not be present on the test sample. A 3 cm long cut is placed in the center of one end of the specimen, and marked in five successive 2 cm portions along the edge of the sample. The sample is tested as described in ASTM D3574-95.

The tear strength of the compression molded foam component can range from 4 kg/cm to 10 kg/cm.

The tensile strength of the foam is another important physical characteristic. The foam or component can have a tensile strength of from 5 kg/cm² to 25 kg/cm², or of from 10 kg/cm² to 23 kg/cm², or of from 15 kg/cm² to 22 kg/cm². The tensile strength can be measured on a die cut sample of the foam in the shape of a dumbbell of a standard size such as a 2.5 cm in width by 11.5 cm in length, with a minimum thickness of 3 to 4 mm. The dumbbell follows the shape described in ASTM D412, die C. The sample is loaded symmetrically into and tested using a long travel extensometer such as the Instron 2603-080 which allows for a minimum of 1000% strain with a gauge length of 25 mm and a resolution of at least 0.1 mm. The tensile value at the failure point of the sample (the point during testing when the load value initially drops) is recorded. The foam or component can be compression molded.

Another physical property to consider when determining whether or not a foam is suitable for use as a component of an article of footwear or athletic equipment is its 300% elongation. The compression molded foam or component can have an elongation of at least 125 kg/cm², or at least 150 kg/cm².

Some examples described herein are directed to a foam article (e.g., articles used to make at least portions of footwear or athletic equipment) made by a process/method comprising: forming a pre-foam composition comprising a polymer comprising styrene repeating units and non-styrenic repeating units; and a $C_4$-$C_{100}$ unsaturated olefin; crosslinking the polymer comprising styrene repeating units and non-styrenic repeating units and the $C_4$-$C_{100}$ unsaturated olefin olefin block copolymer of the pre-foam composition, forming a crosslinked pre-foam composition; and blowing the pre-foam composition, the crosslinked pre-foam composition, or blowing both the pre-foam composition and the crosslinked pre-foam composition, to give a foam article. In some examples, the cross-linking and the blowing can occur substantially simultaneously. In some examples, the process for forming foam articles further comprises injection molding the pre-foam composition, and the crosslinking occurs during the injection molding. In some examples, the crosslinked composition, or both the pre-foam composition and the crosslinked composition are blown in a mold. In some examples, the crosslinking occurs during the injection molding (e.g., the crosslinking occurs substantially in the mold).

In some examples, the foam articles of the various examples described herein can further comprise at least one ethylene vinyl acetate copolymer and/or at least one olefin block copolymer, as each of the terms is defined herein. The component, such as the midsole, can have a variety of beneficial properties.

It has been found that, for many examples, the resiliency and/or energy return (also referred to as energy return) of the compression molded foam article can be significantly greater than the resiliency and/or energy return of the foam article used to make the compression molded foam article. While compression molded foam articles formed using other blowing methods sometimes have greater resiliency and/or energy return than the corresponding foam article, an even greater increase in resiliency and/or energy return can be achieved when compression molding foam articles that were foamed using an impregnation process utilizing a physical blowing agent, as described herein. The resiliency and/or energy return of the compression molded foam article can be at least at least 6 percentage points, or at least 7 percentage points, or at least 8 percentage points, or at least 9 percentage points, or at least 10 percentage points, or at least 12 percentage points greater than the resiliency and/or energy return of the foam article used to make the compression molded foam article. In particular examples, the resiliency and/or energy return of the compression molded foam article is at least 9 percentage points greater than the resiliency and/or energy return of the foam article used for make the compression molded foam article.

This greater increase in the resiliency and/or energy return of the compression molded foam article can thus result in components having higher resiliency and/or energy return than would be possible using foam articles made using other blowing methods. Using the blowing methods described herein, it has been found that it is possible to produce compression molded foam articles having higher than usual resiliencies while using materials and methods which are cost-effective for use in consumer goods such as articles of footwear and athletic equipment. The resiliency and/or energy return of the compression molded foam article can be greater than 45%, or greater than 50%, or greater than 55%, or greater than 60%, or greater than 65%. For example, the resiliency and/or energy return of the compression molded foam article can be from 45% to 95%, or from 50% to 90%, or from 55% to 90%, or from 60% to 80%, or from 50% to 85%, or from 55% to 75%, or from 60% to 75%. Compression molded foam articles having resiliencies greater than 45%, or 50%, or 55%, or 60%, or 65%, can be particularly advantageous for use in articles of footwear. Additionally or in combination, the resiliency and/or energy return of the foam article can be less than 75%, or less than 70%, or less than 65%, or less than 60%. For example, the resiliency and/or energy return of the foam article can be from 40% to 80%, or from 55% to 75%, or from 50% to 70% or from 65% to 80%.

In particular examples, the resiliency and/or energy return of the compression molded foam article can be at least at least 6 percentage points, or at least 7 percentage points, or at least 8 percentage points, or at least 9 percentage points, or at least 10 percentage points, or at least 12 percentage points greater than the resiliency and/or energy return of the foam article used to make the compression molded foam article when the compression molded foam article has a resiliency and/or energy return greater than 45%, or greater than 50%, or greater than 55%, or greater than 60%, or greater than 65%.

The specific gravity of a foam article is also an important physical property to consider when using a foam for a component of an article of footwear or athletic equipment. The compression molded foam articles of the present disclosure can have a specific gravity of from 0.02 g/cm$^3$ to 0.22 g/cm$^3$, or of from 0.03 g/cm$^3$ to 0.12 g/cm$^3$, or of from 0.04 g/cm$^3$ to 0.10 g/cm$^3$, or from 0.11 g/cm$^3$ to 0.12 g/cm$^3$, or from 0.10 g/cm$^3$ to 0.12 g/cm$^3$, from 0.15 g/cm$^3$ to 0.2 g/cm$^3$; 0.15 g/cm$^3$ to 0.30 g/cm$^3$. Alternatively or in addition, the foam article can have a specific gravity of from 0.01 g/cm$^3$ to 0.10 g/cm$^3$, or of from 0.02 g/cm$^3$ to 0.08 g/cm$^3$, or of from 0.03 g/cm$^3$ to 0.06 g/cm$^3$; 0.08 g/cm$^3$ to 0.15 g/cm$^3$; or from 0.10 g/cm$^3$ to 0.12 g/cm$^3$. For example, the specific gravity of the compression molded foam article can be from or from 0.15 g/cm$^3$ to 0.2 g/cm$^3$, and the specific gravity of the foam article can be from 0.10 g/cm$^3$ to 0.12 g/cm$^3$.

In particular examples, the resiliency and/or energy return of the compression molded foam article can be at least at least 6 percentage points, or at least 7 percentage points, or at least 8 percentage points, or at least 9 percentage points, or at least 10 percentage points, or at least 12 percentage points greater than the resiliency and/or energy return of the foam article used to make the compression molded foam article when the compression molded foam article has a resiliency and/or energy return greater than 45%, or greater than 50%, or greater than 55%, or greater than 60%, or greater than 65%, and the compression molded foam article can have a specific gravity of from 0.02 g/cm$^3$ to 0.15 g/cm$^3$, or of from 0.03 g/cm$^3$ to 0.12 g/cm$^3$, or of from g/cm$^3$ to 0.10 g/cm$^3$, or from 0.11 g/cm$^3$ to 0.12 g/cm$^3$ from 0.15 g/cm$^3$ to 0.2 g/cm$^3$; or 0.15 g/cm$^3$ to 0.30 g/cm$^3$.

Compression set of a foam article is another important physical property for a foam used as a component of an article of footwear or athletic equipment. In accordance with the present disclosure, the compression molded foam article can have a compression set of from 40% to 100%. For example, the compression set can be from 45% to 90%, or from 40% to 80%, or from 50% to 75%.

Durometer is another important physical property of a foam article used as an article of footwear or athletic equipment. In accordance with the present disclosure, the compression molded foam article can have a durometer of at least 20 Asker C, or at least 30 Asker C, or at least 40 Asker C, or at least 50 Asker C. For example, the durometer of the compression molded foam article can have a durometer of from 20 Asker C to 70 Asker C, or of from 20 Asker C to 40 Asker C, or from 30 Asker C to 35 Asker C, or of from 25 Asker C to 65 Asker C, or of from 30 Asker C to 50 Asker C, or of from 40 Asker C to 70 Asker C, or of from 35 Asker C to 55 Asker C, or from 50 Asker C to 65 Asker C. The foam article can have a durometer of less than 40 Asker C, or less than 30 Asker C, or less than 20 Asker C. For example, the durometer of the foam preform can be from 15 Asker C to 50 Asker C, or from 20 Asker C to 50 Asker C, or from 20 Asker C to 40 Asker C, or from 20 Asker C to 30 Asker C. The durometer can be measured on a flat area of foam, e.g., at least 6 mm thick using an Asker C durometer.

In particular examples, the resiliency and/or energy return of the compression molded foam article can be at least at least 6 percentage points, or at least 7 percentage points, or at least 8 percentage points, or at least 9 percentage points, or at least 10 percentage points, or at least 12 percentage points greater than the resiliency and/or energy return of the foam article used to make the compression molded foam article when the compression molded foam article has a resiliency and/or energy return greater than 45%, or greater than 50%, or greater than 55%, or greater than 60%, or greater than 65%, and the compression molded foam article can have a of at least 20 Asker C, or at least 30 Asker C, or at least 40 Asker C, or at least 50 Asker C. In addition, the compression molded foam article can have a specific gravity of from 0.02 g/cm$^3$ to 0.15 g/cm$^3$, or of from 0.03 g/cm$^3$ to 0.12 g/cm$^3$, or of from 0.04 g/cm$^3$ to 0.10 g/cm$^3$, or from 0.11 g/cm$^3$ to 0.12 g/cm$^3$ from 0.15 g/cm$^3$ to 0.2 g/cm$^3$; or 0.15 g/cm$^3$ to 0.30 g/cm$^3$.

The tear strength of the compression molded foam or article can range from 4 kg/cm to 10 kg/cm. The tensile strength of the foam or article is another important physical characteristic. The compression molded foam article can have a tensile strength of from 5 kg/cm$^2$ to 25 kg/cm$^2$, or of from 10 kg/cm$^2$ to 23 kg/cm$^2$, or of from 15 kg/cm$^2$ to 22 kg/cm$^2$.

Another physical property to consider when determining whether or not a foam article is suitable for use as a component of an article of footwear or athletic equipment is its 300% elongation. The compression molded foam article can have an elongation of at least 125 kg/cm$^2$, or at least 150 kg/cm$^2$.

Various examples include methods of manufacturing an article of footwear or components for an article of footwear. In some examples, the methods of manufacturing an article of footwear include blowing a composition described herein to give a foam article; compression molding the foam article to make a compression molded component for an article of footwear. The component can be a midsole, and the method can include providing an upper and an outsole for an article of footwear; and combining the compression molded midsole, the upper, and the outsole to make an article of footwear. In some examples, the method of manufacturing the article of footwear includes combining a compression molded foam article, an upper, and an outsole to make an article of footwear.

In some aspects, the present disclosure is directed to a compression molded foam, and to a method of forming compression molded foam for, among other applications, articles of footwear or athletic equipment. In some examples, the method can be a process comprising providing (e.g., preparing) a foam preform and then compression molding the foam preform to form a compression molded foam.

The present inventors have recognized, among other things, that the compression molded foam of the various examples described herein has improved physical characteristics, such as, for example, improved resiliency and/or energy return.

In some examples, one step of the method comprises providing (e.g., preparing or obtaining) a pre-foam composition as disclosed herein. For example, the pre-foam composition can be prepared using any method known in the art, including using a suitable kneader, a suitable single-screw or a suitable twin-screw extruder. An extruder (e.g., single or twin screw) can be used to provide a pre-foam composition. The extruder can have a motor to turn a screw inside the extruder. Screw may be a single screw or twin screws made of individual elements of various sizes and pitches appropriate for mixing or kneading the specific materials used. In some examples, the extruder has a twin screw.

The various components that make up the pre-foam compositions of the various examples described herein (e.g., a polymer comprising styrene repeating units and non-styrenic repeating units; a $C_4$-$C_{100}$ unsaturated olefin; and optionally one or more additional components selected from an ethylene vinyl acetate copolymer; an olefin block copolymer; blowing agent; a crosslinking agent, and any combination thereof) are added into the extruder through a port. In some examples, the pre-foam compositions of the various examples described herein can be at least partially crosslinked at a first crosslinking temperature in, e.g., section of extruder to form a crosslinked pre-foam composition (e.g., at least partially crosslinked pre-foam composition), which, in some examples, may be a thermoplastic crosslinked pre-foam composition. Various other components (e.g., pigments, fillers, and blowing agents) can be added via a port into the extruder and mixed or kneaded with the pre-foam compositions and/or the crosslinked pre-foam composition (e.g., at least partially crosslinked pre-foam composition).

The various components that make up the pre-foam compositions of the various examples described herein may be added as a melt or as appropriately-sized solid particles, for example chips or pellets, that are melted in section as they are mixed or kneaded with, e.g., the crosslinked pre-foam composition (e.g., at least partially crosslinked pre-foam composition).

The contents of the extruder or mixer may be heated to, achieve, among other things, crosslinking of the pre-foam compositions to give a crosslinked pre-foam composition (e.g., at least partially crosslinked pre-foam composition). In other examples, the heating may trigger foaming (i.e., blowing) (e.g., via triggering a chemical blowing agent), thereby converting the crosslinked pre-foam composition (e.g., at least partially crosslinked pre-foam composition) to a foam composition that is sufficiently thermoplastic to be extruded or injected into a mold from the extruder 10. Alternatively, the crosslinked pre-foam composition (e.g., at least partially crosslinked pre-foam composition) can be foamed in the extruder using a physical blowing agent. And, in some examples, a chemical blowing agent can also be present, such that, when there is heating, the heating can trigger the chemical blowing agent.

In some examples, the pre-foam compositions may be added as a melt at a temperature close to or at the crosslinking temperature such that crosslinking can occur, but at a temperature that is sufficiently below the temperature that would trigger blowing. The temperature of the extruder can then be increased to a temperature close to or at the triggering temperature of a chemical blowing agent, thereby giving a foam composition.

The extent to which the pre-foam compositions is crosslinked to give a crosslinked pre-foam composition (e.g., at least partially crosslinked pre-foam composition) can be controlled so that the crosslinked pre-foam composition (e.g., at least partially crosslinked pre-foam composition) remains thermoplastic and can be mixed with various other components (e.g., pigments, fillers, and blowing agents) if necessary. This can be accomplished in various ways, for instance by controlling the amount of time for crosslinking; by controlling the crosslinking temperature; by causing a temperature reduction at a desired point of crosslinking to stop or slow further crosslinking; or by a combination of these. For example, the amount of time for crosslinking can be controlled by controlling screw speed, by locating port 8 closer to or further from port 6, or by a combination of these.

In some examples, as the crosslinking density increases, the crosslinked pre-foam composition (e.g., at least partially crosslinked pre-foam composition) can form phase separated domains, wherein, for example, the styrenic segments of the crosslinked polymer comprising styrene repeating units and non-styrenic repeating units phase separate into predominately styrene-rich domains.

A crosslinked pre-foam composition (e.g., at least partially crosslinked pre-foam composition) or a foam composition, each of which is sufficiently thermoplastic to be extruded or injected into a mold from the extruder, is extruded at an end of the extruded opposite the motor. In some examples, a vacuum port may be used to remove volatiles, for example water, volatile organic liquids that may have been introduced as solvents with some materials, crosslinking reaction by-products or blowing agent by-products. The extrudate may be shaped by being extruded through a die (not shown). For example, the extrudate (e.g., crosslinked pre-foam composition or foam composition) may be extruded in the form of strands that are then pelletized, in the form of a tube, or in the form of a sheet. The pelletization can be conducted using a cooled die. Additionally or alternatively, the pelletization can be performed under water, thus cooling the resulting pellets as they exited the pelletization die.

In some examples, the foam preforms of the various examples described herein are obtained by blowing the pre-foam composition, the crosslinked composition, or both the pre-foam composition and the crosslinked composition by about 150% to about 240% (e.g., from about 150% to about 220%; about 150% to about 200%, about 175% to about 225%, about 180% to about 230% or about 160% to about 240%) in at least one dimension (e.g., the vertical dimension) using a blowing agent.

In some examples, the foam preforms of the various examples described herein are made using a process that involves impregnating a pre-foam composition, a crosslinked pre-foam composition or combinations thereof (e.g., at or above a softening temperature of the pre-foam composition, crosslinked pre-foam composition or combinations thereof) with a physical blowing agent at a first concentration or first pressure.

As used herein, the term "impregnating" generally means dissolving or suspending a physical blowing agent in a pre-foam composition, a crosslinked pre-foam composition or combinations thereof. The impregnated pre-foam composition, crosslinked pre-foam composition or combinations thereof can then be foamed, or can be cooled (when applicable) and re-softened (when applicable) for blowing at a later time.

In some instances, the impregnated pre-foam composition, crosslinked pre-foam composition or combinations thereof is foamed by reducing the concentration or pressure of the physical blowing agent. The reduction in concentration of the physical blowing agent can release additional amounts (e.g., to create a secondary expansion of an originally-formed microcell in the pre-foam composition, crosslinked pre-foam composition or combinations thereof) of the impregnated physical blowing agent from the pre-foam composition, crosslinked pre-foam composition or combinations thereof, to further blow the pre-foam composition, crosslinked pre-foam composition or combinations thereof, forming a foam composition (e.g., a foam composition having a closed-cell structure).

In addition to injection molding, the pre-foam compositions of the present disclosure can be foamed and optionally molded using various processes known in the art. For example, the pre-foam compositions can be used to form slab foam, particulate (e.g., bead) foams of various shapes and sizes, etc. These various forms of foam can then be used in different ways. For example, slab foam can be used directly as a finished foam article, can be shaped (e.g., cut or trimmed) to form a finished foam article, or can be compression molded to form a finished foam article. The foams can be subjected to annealing processes as part of forming the finished foam article. Pellets of the pre-foam compositions can be used to form individual particulate foams, or can be foamed and molded to form unitary molded foam articles composed of individual portions of foam affixed to each other.

The foam compositions of the various examples described herein (e.g., foam preforms) may be further shaped or molded by any of the methods known for forming articles from thermoplastic materials.

Another step of the method for forming compression molded foam includes providing a foam preform that has been foamed using any suitable blowing process (e.g., blowing using a physical and/or chemical blowing agent), and then compression molding the foam preform to form a compression molded foam.

In some examples, the foam preform is prepared by a process comprising (i) softening a pre-foam composition, a crosslinked pre-foam composition or combinations thereof (e.g., by heating at a first temperature at or above a softening temperature of the pre-foam composition, crosslinked pre-foam composition or combinations thereof); (ii) simultaneously or sequentially with the softening (when applicable), contacting the pre-foam composition, crosslinked pre-foam composition or combinations thereof with a first concentration or first pressure of a physical blowing agent sufficient to drive an amount of the physical blowing agent into the pre-foam composition, crosslinked pre-foam composition or combinations thereof; (iii) changing the concentration or pressure (e.g., decreasing the pressure or concentration) of the physical blowing agent to a second concentration or second pressure that is effective to foam the pre-foam composition, crosslinked pre-foam composition or combinations thereof, thereby forming a foam composition (e.g., a foam composition having a closed-cell structure); and, (iv) following the changing, cooling (when applicable) the foam composition to (e.g., cooling to a temperature below the softening temperature of the foam composition), to form a foam preform having an initial height. In some examples, this process is conducted with a composition comprising, consisting essentially of or consisting of a crosslinked pre-foam composition.

In other examples, the foam preform is prepared by (i) contacting (e.g., dissolving or suspending) the pre-foam composition, crosslinked pre-foam composition or combinations thereof with a first concentration of a chemical blowing agent, in some examples, at or above a softening temperature of the pre-foam composition, crosslinked pre-foam composition or combinations thereof; (ii) triggering the chemical blowing agent to foam the pre-foam composition, crosslinked pre-foam composition or combinations thereof, thereby forming a foam composition (e.g., a foam composition having a closed-cell structure); and, (iii) following the triggering, in some examples, cooling the foam composition to, e.g., a temperature below its softening temperature, to form a foam preform having an initial height. In some examples, this process is conducted with a composition comprising, consisting essentially of or consisting of a crosslinked pre-foam composition. In some examples, the "triggering" of the chemical blowing agent is performed by any suitable method, including heating the pre-foam composition, crosslinked pre-foam composition or combinations thereof comprising a concentration of the chemical blowing agent to a temperature sufficient to "trigger" the chemical blowing agent, wherein the concentration of the chemical blowing agent is effective to foam the pre-foam composition, crosslinked pre-foam composition or combinations thereof, thereby forming a foam composition (e.g., a foam composition having a closed-cell structure).

In some examples, the contacting comprises contacting at a pressure of from about 10 MPa to about 100 MPa (e.g., from about 30 MPa to about 100 MPa, about 20 MPa to about 80 MPa, about 30 MPa to about 60 MPa or about 40 MPa to about 70 MPa).

In some examples, whether the foam preform is prepared using a physical or chemical blowing agent, a foamed composition (e.g, in the form of a foam preform) can be compression molded. For example, the foamed composition can be compression molded by placing the foam preform in a compression mold having a height less than the initial height of the foam preform and closing the mold, thereby compressing the foam preform to the height of the mold. Simultaneously or sequentially with the compressing, the foam preform can be heated in the closed compression mold. During the compression molding, the temperature of at least a portion of the foam preform in the closed mold can be raised to a temperature within ±30° C. of the softening temperature of the foam composition. The temperature can be raised by heating the closed mold. Following the raising of the temperature, while the foam preform remains closed in the compression mold, the temperature of at least a portion of the foam preform can be lowered. The temperature can be lowered by cooling the closed mold. The lowering can lower the temperature of at least a portion of the foam preform to a temperature at least 35° C. below the softening temperature of the foamed composition, thereby forming the compression molded foam. Following the cooling, the compression mold can be opened, and the compression molded foam can be removed from the compression mold.

Some examples contemplated herein are directed to compression molded components of articles of footwear or athletic equipment made in accordance with the compositions and processes described herein.

Other examples contemplated herein are directed to methods of manufacturing articles of footwear or athletic equipment. For example, the method can comprise providing a compression molded foam component of an article of footwear in accordance with the present disclosure, and combining the component with a footwear upper and an outsole to form the article of footwear. Similarly, the method can comprise providing a compression molded foam component of an article of athletic equipment in accordance with the present disclosure, and combining the compression molded foam component with other components to form a finished article of athletic equipment.

One method of making a compression molded foam (and compression molded foam articles) described herein comprises forming a foam preform and compression molding the foam preform to make a compression molded foam. In some examples, the foam preforms of the various examples described herein are obtained by blowing the pre-foam composition, the crosslinked composition, or both the pre-foam composition and the crosslinked composition by about 150% to about 240% (e.g., from about 150% to about 220%; about 150% to about 200%, about 175% to about 225%, about 180% to about 230% or about 160% to about 240%) in at least one dimension (e.g., the vertical dimension) using a blowing agent. In some examples, the blown pre-foam composition, the crosslinked composition, or both the pre-foam composition and the crosslinked composition can be compression molded to about 120% to about 200% (e.g., from about 120% to about 180%; about 130% to about 190%; about 150% to about 200%; or about 160% to about 190%) in at least one dimension.

Thus for example, if the foaming of the pre-foam composition, the crosslinked composition, or both the pre-foam composition and the crosslinked composition is about 200%, the blown pre-foam composition, the crosslinked composition, or both the pre-foam composition and the crosslinked composition can be compression molded by a net 20% by compression molding to about 180%. In another example, if the pre-foam composition, the crosslinked composition, or both the pre-foam composition and the crosslinked composition is blown into a 20 mm (height)×10 cm (width)×5 cm (depth) slab, and the slab is compression molded in the height direction by 20%, the compression molded slab would have the dimensions 18 mm (height)×10 cm (width)×5 cm (depth). In some examples, the compression molding is substantially maintained.

In some examples, the foam preform is made using a process that involves impregnating a pre-foam composition, a crosslinked pre-foam composition or combinations thereof (e.g., at or above a softening temperature of the pre-foam composition, crosslinked pre-foam composition or combinations thereof) with a physical blowing agent at a first concentration or first pressure. The impregnated pre-foam composition, crosslinked pre-foam composition or combinations thereof can then be foamed, or can be cooled (when applicable) and re-softened (when applicable) for blowing at a later time. In some instances, the impregnated pre-foam composition, crosslinked pre-foam composition or combinations thereof is foamed by reducing the concentration or pressure of the physical blowing agent. The reduction in concentration of the physical blowing agent can release additional amounts of the impregnated physical blowing agent from the pre-foam composition, crosslinked pre-foam composition or combinations thereof, to further blow the pre-foam composition, crosslinked pre-foam composition or combinations thereof, forming a foam composition (e.g., a foam composition having a closed-cell structure).

In some examples, the compression molding process is conducted by heating the foam preform in a closed compression mold. The foam preform is heated to a temperature close to its softening temperature, to allow the foam to retain the shape of the compression mold. For example, the foam preform can be heated to a temperature within ±30° C. of its softening temperature, or within ±20° C. of its softening temperature, or within ±10° C. of its softening temperature, or within ±5° C. of its softening temperature. For example, the foam preform can be heated to a temperature of from about 100° C. to about 250° C., or of from about 140° C. to about 220° C., or of from about 100° C. to about 150° C., or of from about 130° C. to about 150° C.

The material used to form the compression mold can be any material which can withstand the temperatures used during the process, such as machined metals, including aluminum. The compression mold can be made using two pieces, such as a top and a bottom mold. Depending on the shape of the foam component to be molded, a multiple-piece mold may be used in order to more easily release the compression molded foam from the mold.

The compression molding of the foam preform in the compression mold can result in a closed skin forming on the final compression molded foam component. However, care should be taken during the compression molding not to subject the foam preform to conditions such that more than a desired amount of the closed cell structures of the foam collapse. One way to avoid collapsing more than a desired amount of the closed cell structures is to control the temperature of the polymeric composition, for example, by controlling the temperature of the mold. For example, during the compression molding step, the heating of the foam preform in the compression mold can be conducted for time of from 100 seconds to 1,000 seconds, or of from 150 seconds to 700 seconds.

Once the foam preform has been heated in the compression mold at the appropriate temperature for the desired length of time to soften the preform to the desired level, the softened preform is cooled, for example, to a temperature at least 35° C. below its softening temperature, or at least 50° C. below its softening temperature, or at least 80° C. below its softening temperature, to re-solidify the softened foam, thereby forming the compression molded foam. Once cooled, the compression molded foam component is removed from the compression mold. Following the heating, the cooling of the foam preform in the compression mold can be conducted for a time of from 50 to 1,000 seconds, or for a time of from 100 to 400 seconds.

Compositions

In various aspects, compositions are provided that can be foamed, i.e. can be used to form a foam composition. In some aspects, these compositions are referred to as a "pre-foam composition." In some aspects, the compositions can be used to generate foam compositions that are soft and have a high energy return making them useful for footwear. The compositions can be used to generate foams using any of a variety of methods known in the art. In some aspects, the foams are generated using injection molding or injection molding followed by compression molding techniques. The foamed compositions can include components of articles of footwear as described above, for example a midsole 146 as depicted in FIGS. 1A-1B.

The compositions described herein, when used to form foams, in some aspects produced foams having surprisingly high energy return/resiliency values. These compositions also, when used to form foams, in some aspects produce foams having high split-tear values. The compositions can, in some aspects, be used to produce foams having other beneficial properties, including additional properties beneficial for use in footwear including as cushioning components. The compositions of the present disclosure can be foamed and/or molded using various methods. In one example, the polymeric compositions can be foamed as part of an injection molding process. Optionally, the injection molded foam can subsequently be compression molded. Compression molding of the injection molded foam can modify the properties of the polymeric foam, such as reducing the compression set of the foam, which can be beneficial for foams used in footwear-related applications. Foams formed from the polymeric compositions of the present disclosure can be used in footwear-related applications without being compression molded.

In some aspects, a composition is provided including a block copolymer including (1) a first block and a third block, each independently including a linear or branched chain aliphatic polymer having a plurality of aromatic groups attached pendantly thereto, (2) a second block located between the first block and the third block and including an aliphatic polymer having a plurality of aliphatic side chains attached thereto, and (3) a plurality of first ethylenically unsaturated groups present on one or more of the first block, second block, and third block. The block copolymer can include about 50% to 95%, about 60% to 90%, or about 60% to 85% of the second blocks by weight based upon the weight of the block copolymer. The compositions can also include an olefinic copolymer having a plurality of first olefinic segments and a plurality of second olefinic segments having a different chemical structure from the first olefinic segments; and one or more linking polymers, each linking polymer having one or more third olefinic segments. The compositions can include an ethylene vinyl acetate (EVA) copolymer.

In certain aspects, it has been observed that the ratios of the materials in the compositions strongly impact the foam properties such as energy return, durability, and softness. In some aspects, a sum of a ratio I, II, III, IV, and V is from about 1.0 to 10.0, about 1.0 to 8.0, about 1.0 to 5.0, about 1.5 to 5.0, about 1.5 to 8.0, about 3.5 to 8.0, or about 3.5 to 5.0; wherein the ratio I is a ratio of a total parts by weight of the olefinic copolymers present in the composition to a total parts by weight of the block copolymer present in the composition; wherein the ratio II is a ratio of a total parts by weight of the linking polymers present in the composition to a total parts by weight of the block copolymer present in the composition; wherein the ratio III is ratio of a total parts by weight of the EVA copolymers present in the composition to a total parts by weight of the block copolymer present in the composition; wherein the ratio IV is a ratio of the total parts by weight of the linking polymers present in the composition to a total parts by weight of the block copolymers present in the composition, and wherein the ratio V is a ratio of the total parts by weight of the one or more EVA copolymers present in the composition to a total parts by weight of the one or more olefinic copolymers present in the composition.

The block copolymer can include (1) a first block and a third block, each independently including a linear or branched chain aliphatic polymer having a plurality of aromatic groups attached pendantly thereto, (2) a second block located between the first block and the third block and including an aliphatic polymer having a plurality of aliphatic side chains attached thereto, and (3) a plurality of first ethylenically unsaturated groups present on one or more of the first block, second block, and third block. The aromatic groups can be styrenic groups. The aliphatic groups can include one or more substituted or unsubstituted alkyl side chains having 2 to 20, 2 to 18, 2 to 15, 2 to 12, 5 to 12, 5 to 15, 5 to 18, or 5 to 20 carbon atoms.

The olefinic copolymer can have a plurality of first olefinic segments and a plurality of second olefinic segments having a different chemical structure from the first olefinic segments. For example, the olefinic block copolymer can be a copolymer of ethylene and the second alpha-olefin. In some aspects, the second alpha-olefin has 4 to 20, 4 to 18, 4 to 15, 4 to 12, 6 to 12, 6 to 15, 6 to 18, or 6 to 20 carbon atoms. The olefinic block copolymer can have one or more blocks rich in the first alpha-olefin and one or more blocks rich in the second alpha-olefin.

The linking polymers can each, independently, have one or more third olefinic segments. In some aspects, the compositions include a first alpha-olefin linking polymer and a second alpha-olefin linking polymer different from the first alpha-olefin linking polymer. For example, the first alpha-olefin linking polymer and the second alpha-olefin linking polymer can both be copolymers of ethylene and 1-butene, each having a different ratio of ethylene to 1-butene monomer content in the copolymer.

The ethylene vinyl acetate (EVA) copolymer can have a vinyl acetate content of about 5% to 50%, about 5% to 45%, about 5% to 40%, about 10% to 50%, about 10% to 45%, about 10% to 40%, about 15% to 40%, about 15% to 45%, about 15% to 50%, about 20% to 50%, or about 30% to 50% by weight based upon the weight of the ethylene-vinyl acetate copolymer.

In some aspects, a composition is provided including a block copolymer having a first block and a third block, each independently comprising a linear or branched chain aliphatic polymer having a plurality of aromatic groups attached pendantly thereto, a second block located between the first block and the third block and comprising an aliphatic polymer having a plurality of aliphatic side chains attached thereto, and a plurality of first ethylenically unsaturated group present on one or more of the first block, second block, and third block; wherein the block copolymer contains about 40% to 95%, about 40% to 90%, about 50% to 90%, about 60% to 90%, or about 65% to 85% of the second blocks by weight based upon the weight of the block copolymer; an olefinic copolymer comprising a plurality of first olefinic segments and a plurality of second olefinic segments having a different chemical structure from the first olefinic segments; one or more linking polymers, each linking polymer comprising one or more third olefinic segments; and an ethylene vinly-acetate copolymer.

In some aspects, a composition is provided including an A-B-A block copolymer, wherein each of the A blocks comprise styrenic repeat units, the B block is a random copolymer of ethylene and an alpha-olefin having 2 to 12, 2 to 10, 2 to 8, 3 to 8, 3 to 10, 3 to 12, 6 to 12, or 6 to 8 carbon atoms, and wherein the A-B-A-block copolymer comprises about 5% to 50%, about 10% to 50%, about 10% to 40%, or about 15% to 35% of the A blocks by weight based upon the weight of the A-B-A block copolymer; an olefinic block copolymer, wherein the olefinic block copolymer is a copolymer of ethylene and an alpha-olefin having 2 to 12, 2 to 10, 2 to 8, 3 to 8, 3 to 10, 3 to 12, 6 to 12, or 6 to 8 carbon atoms, and wherein the olefinic block copolymer has one or more blocks rich in the ethylene and one or more blocks rich in the alpha-olefin; an alpha-olefin linking polymer, wherein the alpha-olefin linking polymer is a copolymer of ethylene and an alpha-olefin having about 2 to 12, 2 to 10, 2 to 8, 3 to 8, 3 to 10, 3 to 12, 6 to 12, or 6 to 8 carbon atoms, and wherein the alpha-olefin linking polymer has an alpha-olefin monomer content of about 15% to about 40% by weight based upon the weight of the alpha-olefin linking polymer; and an ethylene-vinyl acetate copolymer having a vinyl acetate content of about 5% to 50%, about 5% to 45%, about 5% to 40%, about 10% to 50%, about 10% to 45%, about 10% to 40%, about 15% to 40%, about 15% to 45%, about 15% to 50%, about 20% to 50%, or about 30% to 50% by weight based upon the weight of the ethylene-vinyl acetate copolymer.

In some aspects, each of the A blocks consists essentially of polystyrene. In some aspects, the B block consists essentially of a copolymer of ethylene and octene. In some aspects, the B block consists essentially of a copolymer of ethylene and butadiene.

In some aspects, a composition is provided including a partially hydrogenated thermoplastic elastomeric block copolymer, the partially hydrogenated thermoplastic elastomeric block copolymer comprising one or more A blocks comprising aromatic repeat units, one or more B blocks comprising aliphatic repeat units, and one or more first ethylenically unsaturated groups present on one or both of the aromatic repeat units and the aliphatic repeat units; an olefinic block copolymer, wherein the olefinic block copolymer is a copolymer of a first alpha-olefin and a second alpha-olefin different from the first alpha-olefin, and wherein the olefinic block copolymer comprising one or more second ethylenically unsaturated groups; an alpha-olefin linking polymer, wherein the alpha-olefin linking polymer comprises one or more aliphatic sidechains; and an ethylene-vinyl acetate copolymer; wherein a sum of a ratio I, II, III, IV, and V is from about 1.0 to 10.0, about 1.0 to 8.0, about 1.0 to 5.0, about 1.5 to 5.0, about 1.5 to 8.0, about 3.5 to 8.0, or about 3.5 to 5.0. The ratio I is a ratio of a total parts by weight of the olefinic copolymers present in the composition to a total parts by weight of the partially hydrogenated thermoplastic elastomeric block copolymer present in the composition. The ratio II is a ratio of a total parts by weight of the alpha-olefin linking polymers present in the composition to a total parts by weight of the partially hydrogenated thermoplastic elastomeric block copolymer present in the composition. Ratio III is ratio of a total parts by weight of the ethylene-vinyl acetate copolymers present in the composition to a total parts by weight of the partially hydrogenated thermoplastic elastomeric block copolymer present in the composition. Ratio IV is a ratio of the total parts by weight of the alpha-olefin linking polymers present in the composition to a total parts by weight of the partially hydrogenated thermoplastic elastomeric block copolymer present in the composition. Ratio V is a ratio of the total parts by weight of the one or more ethylene-vinyl acetate copolymers present in the composition to a total parts by weight of the one or more olefinic copolymers present in the composition.

In some aspects, a composition is provided including a partially hydrogenated thermoplastic elastomeric block copolymer, the partially hydrogenated thermoplastic elastomeric block copolymer including one or more A blocks comprising aromatic repeat units, one or more B blocks comprising aliphatic repeat units, and one or more first ethylenically unsaturated groups present on one or both of the aromatic repeat units and the aliphatic repeat units; an olefinic block copolymer, wherein the olefinic block copolymer is a copolymer of a first alpha-olefin and a second alpha-olefin different from the first alpha-olefin, and wherein the olefinic block copolymer comprising one or more second ethylenically unsaturated groups; an alpha-olefin linking polymer, wherein the alpha-olefin linking polymer comprises one or more aliphatic sidechains; and an ethylene-vinyl acetate copolymer.

In some aspects, a composition is provided including one or more partially hydrogenated thermoplastic elastomeric block copolymers, each of the one or more partially hydrogenated thermoplastic elastomeric block copolymers independently comprising one or more aromatic blocks, one or more aliphatic blocks, and one or more first ethylenically unsaturated units; one or more olefinic block copolymers, each of the one or more olefinic block copolymers comprising second ethylenically unsaturated units; one or more alpha-olefin linking polymers; and one or more ethylene-vinyl acetate copolymers; wherein a sum of a ratio I, II, III, IV, and V is from about 1.0 to 10.0, about 1.0 to 8.0, about 1.0 to 5.0, about 1.5 to 5.0, about 1.5 to 8.0, about 3.5 to 8.0, or about 3.5 to 5.0. Ratio I is a ratio of a total parts by weight of the olefinic block copolymers present in the composition to a total parts by weight of the partially hydrogenated thermoplastic elastomeric block copolymer present in the composition. Ratio II is a ratio of a total parts by weight of the alpha-olefin linking polymers present in the composition to a total parts by weight of the partially hydrogenated thermoplastic elastomeric block copolymer present in the composition. Ratio III is ratio of a total parts by weight of the ethylene-vinyl acetate copolymers present in the composition to a total parts by weight of the partially hydrogenated thermoplastic elastomeric block copolymer present in the composition. Ratio IV is a ratio of the total parts by weight of the alpha-olefin linking polymers present in the composition to a total parts by weight of the partially hydrogenated thermoplastic elastomeric block copolymer present in the composition. Ratio V is a ratio of the total parts by weight of the one or more ethylene-vinyl acetate copolymers present in the composition to a total parts by weight of the one or more olefinic copolymers present in the composition.

In some aspects, a composition is provided including one or more partially hydrogenated thermoplastic elastomeric block copolymers, each of the one or more partially hydrogenated thermoplastic elastomeric block copolymers independently comprising one or more aromatic blocks, one or more aliphatic blocks, and one or more first ethylenically unsaturated units; one or more olefinic block copolymers, each of the one or more olefinic block copolymers comprising second ethylenically unsaturated units; one or more alpha-olefin linking copolymers; and one or more ethylene-vinyl acetate copolymers. The partially hydrogenated thermoplastic elastomeric block copolymer can have an A-B block structure or an A-B-A block structure, wherein each of the A blocks comprise one or more aromatic repeat units, and wherein the B block is an aliphatic polymer block comprising the one or more first ethylenically unsaturated units. The partially hydrogenated thermoplastic elastomeric block copolymer can include about 5% to 50%, about 5% to 40%, about 10% to 50%, about 10% to 40%, about 15% to 40%, or about 15% to 35% of the A block by weight based upon the weight of the partially hydrogenated thermoplastic elastomeric block copolymer.

The composition can include about 5 parts by weight to about 30 parts by weight, about 5 parts by weight to about 20 parts by weight, about 5 parts by weight to about 15 parts by weight, about 10 parts by weight to about 20 parts by weight, about 10 parts by weight to about 30 parts by weight, or about 15 parts by weight to about 25 parts by weight of the A-B-A block copolymer or partially hydrogenated thermoplastic elastomeric block copolymer based upon the total weight of the composition.

The composition can include about 5 parts by weight to about 15 parts by weight, about 5 parts by weight to about 10 parts by weight, about 10 parts by weight to about 15 parts by weight, or about 5 parts by weight to about 20 parts by weight of the A-B-A block copolymer or partially hydrogenated thermoplastic elastomeric block copolymer based upon the total weight of the composition.

The composition can include about 5 parts by weight to about 20 parts by weight, about 5 parts by weight to about 15 parts by weight, about 10 parts by weight to about 20 parts by weight, about 10 parts by weight to about 15 parts by weight, about 5 parts by weight to about 10 parts by weight, about 15 parts by weight to about 20 parts by weight, about 5 parts by weight to about 30 parts by weight, about 5 parts by weight to about 20 parts by weight, about 5 parts by weight to about 15 parts by weight, about 10 parts by weight to about 20 parts by weight, about 10 parts by weight to about 30 parts by weight, or about 15 parts by weight to about 25 parts by weight of the olefinic block copolymer by weight based upon the total weight of the composition.

The composition can include about 10 parts by weight to about 50 parts by weight, about 15 parts by weight to about 50 parts by weight, about 10 parts by weight to about 35 parts by weight, about 10 parts by weight to about 20 parts by weight, about 20 parts by weight to about 30 parts by weight, about 30 parts by weight to about 40 parts by weight, about 40 parts by weight to about 50 parts by weight, about 20 parts by weight to about 35 parts by weight, or about 20 parts by weight to about 30 parts by weight of the alpha-olefin linking polymer based upon the total weight of the composition.

The composition can include about 10 parts by weight to about 50 parts by weight, about 10 parts by weight to about 45 parts by weight, about 20 parts by weight to about 45 parts by weight, about 20 parts by weight to about 50 parts by weight, about 20 parts by weight to about 30 parts by weight, about 30 parts by weight to about 40 parts by weight, or about 40 parts by weight to about 50 parts by weight of the ethylene-vinyl acetate copolymer based upon the total weight of the composition.

In some aspects, a composition is provided including an A-B-A block copolymer, wherein each of the A blocks have styrenic repeat units, the B block is a random copolymer of ethylene and a first alpha-olefin having 3 to 8 carbon atoms (e.g. 3, 4, 5, 6, 7, or 8 carbon atoms), and wherein the A-B-A-block copolymer includes about 10% to 50%, about 10% to 40%, about 15% to 40%, or about 15% to 30% of the A blocks by weight based upon an entire weight of the A-B-A block copolymer; an olefinic block copolymer, wherein the olefinic block copolymer is a copolymer of ethylene and a second alpha-olefin having about 4 to 14, about 6 to 12, or about 6 to 10 carbon atoms, and wherein the olefinic block copolymer has one or more blocks rich in the ethylene and one or more blocks rich in the second alpha-olefin; and an alpha-olefin linking polymer, wherein the alpha-olefin linking polymer is a copolymer of ethylene and a third alpha-olefin having about 2 to 24, about 3 to 24, about 3 to 18, or about 6 to 18 carbon atoms, and wherein the alpha-olefin linking polymer has an alpha-olefin monomer content of about 10% to 50%, about 10% to 40%, about 15% to 40%, or about 15% to 30% by weight based upon an entire weight of the alpha-olefin linking polymer.

In some aspects, a composition is provided including an A-B-A block copolymer, wherein each of the A blocks include repeat units according to the following formula

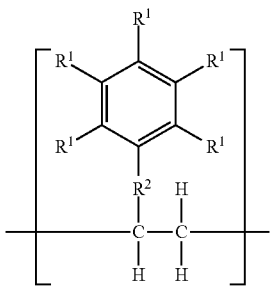

where each occurrence of $R^1$ is independently a hydrogen, halogen, hydroxyl, or a substituted or unsubstituted alkyl group having from 1 to 18, 1 to 15, 1 to 12, 3 to 18, 3 to 15, or 3 to 12 carbon atoms; where each occurrence of $R^2$ is independently none or a substituted or unsubstituted alkyl group having from 1 to 15, 1 to 12, 1 to 8, 3 to 8, 3 to 12, or 3 to 15 carbon atoms; wherein the B block is a random copolymer of ethylene and a first alpha-olefin having about 3 to 12, 3 to 10, or 3 to 8 carbon atoms; and wherein the A-B-A-block copolymer includes about 10% to 50%, about 10% to 40%, about 15% to 40%, or about 15% to 30% of the A blocks by weight based upon an entire weight of the A-B-A block copolymer; an olefinic block copolymer, wherein the olefinic block copolymer is a copolymer of ethylene and a second alpha-olefin having about 4 to 14, about 6 to 12, or about 6 to 10 carbon atoms, and wherein the olefinic block copolymer has one or more blocks rich in the ethylene and one or more blocks rich in the second alpha-olefin; and an alpha-olefin linking polymer, wherein the alpha-olefin linking polymer is a copolymer of ethylene and a third alpha-olefin having bout 2 to 24, about 3 to 24, about 3 to 18, or about 6 to 18 carbon atoms; wherein a ratio II of a total parts by weight of the A-B-A block copolymer present in the composition to a total parts by weight of the linking polymer present in the is from about 1.00 to 5.00, about 1.00 to 4.00, about 1.50 to 4.00, about 1.50 to 3.50, about 1.00 to 3.00, or about 2.00 to 4.00.

In some aspects, a composition is provided including an A-B-A block copolymer, wherein each of the A blocks include repeat units according to the following formula

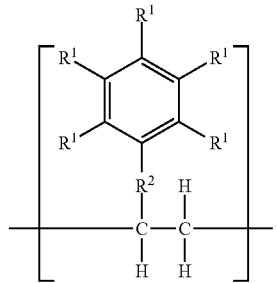

where each occurrence of $R^1$ is independently a hydrogen, halogen, hydroxyl, or a substituted or unsubstituted alkyl group having from 1 to 18, 1 to 15, 1 to 12, 3 to 18, 3 to 15, 3 to 12, 1 to 8, 3 to 8, 1 to 5, or 3 to 5 carbon atoms; where each occurrence of $R^2$ is independently none or a substituted or unsubstituted alkyl group having from 1 to 15, 1 to 12, 1 to 8, 3 to 8, 3 to 12, 3 to 15, 1 to 8, 1 to 5, or 1 to 3 carbon atoms; wherein the B block is a random copolymer of ethylene and a first alpha-olefin having about 3 to 12, 3 to 10, or 3 to 8 carbon atoms; and wherein the A-B-A-block copolymer includes about 10% to 50%, about 10% to 40%, about 15% to 40%, or about 15% to 30% of the A blocks by weight based upon an entire weight of the A-B-A block copolymer; an olefinic block copolymer, wherein the olefinic block copolymer is a copolymer of ethylene and a second alpha-olefin having about 4 to 14, about 6 to 12, or about 6 to 10 carbon atoms, and wherein the olefinic block copolymer has one or more blocks rich in the ethylene and one or more blocks rich in the second alpha-olefin; and an alpha-olefin linking polymer, wherein the alpha-olefin linking polymer is a copolymer of ethylene and a third alpha-olefin having bout 2 to 24, about 3 to 24, about 3 to 18, or about 6 to 18 carbon atoms.

In some aspects, the alpha-olefin linking polymer has an alpha-olefin monomer content of about 10% to 50%, about 10% to 45%, about 15% to 45%, about 15% to 40%, or about 20% to 40% by weight based upon an entire weight of the alpha-olefin linking polymer.

In some aspects, each of the A blocks include a large amount of polystyrene. For example, each of the A blocks can include at least 80%, 90% or more styrene repeat units based upon the number of repeat units in the A block. In some aspects, each of the A blocks consists essentially of polystyrene.

In some aspects, each of the B blocks includes a random copolymer of ethylene and a first alpha-olefin having 4, 5, 6, 7, or 8 carbon atoms. In some aspects, the B block is essentially a random copolymer of ethylene and octene, or is random copolymer of ethylene and butadiene.

In some aspects there can be more than one alpha-olefin linking polymer present in the composition. For example, in some aspects, the composition incudes a first alpha-olefin linking polymer and a second alpha-olefin linking polymer, wherein the first alpha-olefin linking polymer and the second alpha-olefin linking polymer are copolymers of ethylene and 1-butene, each having a different ratio of ethylene to 1-butene monomer content in the copolymer.

In some aspects, the composition includes about 5 parts by weight to about 15 parts by weight of the A-B-A block copolymer, about 10 parts by weight to about 20 parts by weight of the olefinic block copolymer, and about 25 parts by weight to about 35 parts by weight of the alpha-olefin linking polymers based upon an entire weight of the composition.

In some aspects, the composition includes an ethylene-vinyl acetate copolymer having a vinyl acetate content of about 10% to about 45% by weight based upon the weight of the ethylene-vinyl acetate copolymer.

In various aspects, the composition also includes comprising an ethylene-vinyl acetate copolymer having a vinyl acetate content of about 5% to 55%, about 5% to 50%, about 10% to 50%, about 10% to 45%, or about 15% to 40% by weight based upon the weight of the ethylene-vinyl acetate copolymer.

The A-B-A block copolymer can be at least partially or fully hydrogenated. In some aspects, the A-B-A block copolymer has a degree of hydrogenation of about 40% to 99%, about 50% to 99%, about 50% to 95%, about 50% to 90%, about 50% to 80%, or about 60% to 80%.

In some aspects, a composition is provided including partially hydrogenated thermoplastic elastomeric block copolymer, an olefinic block copolymer, and an alpha-olefin linking polymer. The partially hydrogenated thermoplastic elastomeric block copolymer can include one or more A blocks with aromatic repeat units, one or more B blocks with aliphatic repeat units, and one or more first ethylenically unsaturated groups present on one or both of the aromatic repeat units and the aliphatic repeat units. In some aspects, the aromatic repeat units are styrenic repeat units. The olefinic block copolymer can be a copolymer of a first alpha-olefin and a second alpha-olefin different from the first alpha-olefin, and wherein the olefinic block copolymer includes one or more second ethylenically unsaturated groups. The alpha-olefin linking polymer can include one or more aliphatic sidechains.

In some aspects, the partially hydrogenated thermoplastic elastomeric block copolymer can have an A-B block structure or an A-B-A block structure, wherein the A blocks and B blocks are as described herein. For example, each of the A blocks can independently include one or more aromatic repeat units such as styrene. Each of the B blocks can be an aliphatic polymer block comprising the one or more first ethylenically unsaturated units.

The aromatic repeat units can include any of a variety of aromatic units. The aromatic repeat units can include aliphatic backbones having a plurality of aromatic side chains.

In some aspects, a composition is provided including at least one polymer containing styrenic repeating units and non-styrenic repeating units; and at least one $C_4$-$C_{100}$ unsaturated olefin. The styrenic repeat units can include blocks of polystyrene. The polymer containing styrenic repeating units and non-styrenic repeating units can be a block copolymer including blocks of polystyrene and non-styrenic polymeric blocks. In some examples, the polymer can include non-styrenic repeating units selected from the group polyester, poly-$C_2$-$C_8$-alkylene units, polyether units, polycarbonate units, polyamide units, polyketone units, polysiloxane units, and any combination thereof. The styrene repeating units and non-styrenic repeating units (e.g., polyester, poly-$C_2$-$C_8$-alkylene units, polyether units, polycarbonate units, polyamide units, polyketone units, polysiloxane units, and any combination thereof), can be in any order. Mixtures of two or more polymers including styrenic repeat units and non-styrenic repeat units are also contemplated herein.

As used herein, unless otherwise dictated by context, when two of the same type of components are said to be "different" this means that one has a different chemical composition from the other. For example, the second alpha-olefin being different from the first alpha-olefin means the second alpha-olefin has a chemical formula that is different from the chemical formula of the first alpha-olefin.

In some specific examples, the compositions include a polymer including styrene repeating units and non-styrenic repeating units, wherein the polymer includes block units of polyester. In some examples, the polymer including styrenic repeating units and non-styrenic repeating units includes poly-$C_2$-$C_8$-alkylene units. In some examples, the polymer including styrenic repeating units and non-styrenic repeating units of the various examples described herein includes units of polyethylene. In some examples, the polymer including styrenic repeating units and non-styrenic repeating units of the various examples described herein includes units of polypropylene. In other examples, the polymer including styrenic repeating units and non-styrenic repeating units of the various examples described herein includes units of polybutylene. In still other examples, the polymer including styrene repeating units and non-styrenic repeating units of the various examples described herein includes units of polybutadiene. In yet other examples, the polymer including styrenic repeating units and non-styrenic repeating units of the various examples described herein includes units of polyisoprene. The non-styrenic repeating units of the polymer can include polyethylene, polypropylene, polybutylene, polybutadiene, polyisoprene, or any combination thereof, and can be present in the polymer in any order.

In some examples, when the polymer comprising styrene repeating units and non-styrenic repeating units described herein comprise polyethylene, the polyethylene content of the polymer comprising styrene repeating units and non-styrenic repeating units is from about 50 mol % to about 80 mol % (e.g., from about 50 mol % to about 75 mol %; about 60 mol % to about 80 mol %; about 55 mol % to about 70 mol %; about 65 mol % to about 80 mol %; or about 70 mol % to about mol %).

In some examples the polymer comprising styrene repeating units and non-styrenic repeating units is a $PS_q$-$X^1_n$-$X^2_m$-

$X^3{}_p$ block copolymer wherein: PS represents polystyrene; $X^1$ is a poly-$C_2$-$C_8$-alkylene; $X^2$ is a poly-$C_2$-$C_8$-alkylene; $X^3$ is polyether, polyester, polycarbonate, polyamide, polyketone or polysiloxane; the subscripts q, n, m, and p represent mole fractions; 1>q>0, n is 0 to 1, m is 0 to 1, and p is 0 to 1, provided that q+n+m+p=1; and the order of the PS, $X^1$, $X^2$, and $X^3$ blocks can be random or in the order shown. In some examples, $X^1$ is polyethylene, polypropylene, polybutylene, polybutadiene, or polyisoprene. In other examples, $X^2$ is polyethylene, polypropylene, polybutylene, polybutadiene, or polyisoprene.

Some examples of polymers comprising styrene repeating units and non-styrenic repeating units contemplated herein include styrene-butadiene-styrene block copolymers; styrene-polybutylene-styrene block copolymers; styrene-ethylene-butadiene-styrene block copolymers; styrene-ethylene-polybutylene-styrene block copolymers; styrene-isoprene-butadiene-styrene block copolymers; and combinations thereof.

Generally speaking, the block copolymers, such as the A-B-A block copolymer or the polymer comprising styrene repeating units and non-styrenic repeating units described herein, can be at least partially unsaturated (e.g., comprising ethylenic unsaturation). Thus, for example, at least one of the repeating units can comprise ethylenic unsaturation. As used herein, the term "partially unsaturated" (e.g., comprising ethylenic unsaturation) generally means that the polymer can have from about 20 mol % to about 60 mol % unsaturation (e.g., from about 20 mol % to about 50 mol %, about 20 mol % to about 30 mol %; about 25 mol % to about 45 mol %; about 30 mol % to about 50 mol %; about 20 mol % to about 40 mol %; or about 25 mol % to about 40 mol % unsaturation, such as ethylenic unsaturation). But it should be understood that, by virtue of the fact that polymers comprising styrene repeating units comprise phenyl rings, they will be "partially unsaturated."

Generally speaking, partial unsaturation makes it possible to form covalent crosslinking between, for example, the polymer comprising styrene repeating units and non-styrenic repeating units (intermolecular and intramolecular); the $C_4$-$C_{100}$ unsaturated olefin (intermolecular and intramolecular); and between the polymer comprising styrene repeating units and non-styrenic repeating units and the $C_4$-$C_{100}$ unsaturated olefin.

Generally speaking, the block copolymers, such as the A-B-A block copolymer or the polymer comprising styrene repeating units and non-styrenic repeating units described herein, have a weight average molecular weight (Mw) from about 25,000 g/mol to about 1.5×10⁶ g/mol (e.g., from about 250,000 g/mol to about 1.5×10⁶ g/mol, about 25,000 g/mol to about 100,000 g/mol; about 50,000 g/mol to about 200,000 g/mol, 75,000 g/mol to about 150,000 g/mol; about 100,000 g/mol to about 300,000 g/mol; about 250,000 g/mol to about 750,000 g/mol; about 300,000 g/mol to about 800,000 g/mol; about 250,000 g/mol to about 650,000 g/mol; about 500,000 g/mol to about 1.5×10⁶ g/mol; about 750,000 g/mol to about 1.5×10⁶ g/mol; or about 650,000 g/mol to about 1.3×10⁶ g/mol).

Some examples of polymers comprising styrene repeating units and non-styrenic repeating units include those available from Kraton Performance Polymers Inc., Houston, TX, such as KRATON® D styrene-butadiene-styrene (SBS) polymer comprising styrene repeating units and non-styrenic repeating units; KRATON® D styrene-isoprene-styrene/styrene-isoprene-butadiene-styrene polymer comprising styrene repeating units and non-styrenic repeating units (SIS)/(SIBS); KRATON® G styrene-ethyelen-butadiene-styrene/styrene-ethylene-propylene-styrene (SEBS/SEPS) polymer comprising styrene repeating units and non-styrenic repeating units; and KRATON® FG maleic anhydride-grafted styrene-ethyelen-butadiene-styrene (SEBS) polymer comprising styrene repeating units and non-styrenic repeating units. Some examples of polymer comprising styrene repeating units and non-styrenic repeating units also include SEPTON® hydrogenated polymer comprising styrene repeating units and non-styrenic repeating units (e.g., SEPTON® 4055; SEPTON® 8006; SEPTON® 4077; and SEPTON® 4099) available from Kuraray Co., Ltd., Tokyo, Japan. Other examples of polymer comprising styrene repeating units and non-styrenic repeating units include hydrogenated SEBS block copolymers available from Asahi Kasei Chemicals Corporation (e.g., the various grades of TUFTEC® hydrogenated SEBS block copolymers, including TUFTEC® P1083). While not being bound by any specific theory, it is believed that the level of hydrogenation of the polymer comprising styrene repeating units and non-styrenic repeating units, which in some examples influences (e.g., reduces) the level of ethylenic unsaturation of the polymer comprising styrene repeating units and non-styrenic repeating units, can influence the crystallinity and/or rigidity of the polymer comprising styrene repeating units and non-styrenic repeating units. Thus, for example, partially hydrogenated polymer comprising styrene repeating units and non-styrenic repeating units (e.g., those that are about 50 to about 80% hydrogenated) can be less crystalline and more rigid than their non-hydrogenated counterparts (e.g., those that are less than about 50% hydrogenated).

In one aspect, the pre-foam compositions of the various examples described herein can comprise any suitable amount of a polymer comprising styrene repeating units and non-styrenic repeating units. In some examples, the pre-foam compositions comprise from about 5 wt. % to about 50 wt. % (e.g., from about 5 wt. % to about 20 wt. %; about 15 wt. % to about 40 wt. %; about 10 wt. % to about 45 wt. %; about 25 wt. % to about 50 wt. %; or about 20 wt. % to about 45 wt. %) of the polymer comprising styrene repeating units and non-styrenic repeating units. In addition, or alternatively, the polymer comprising styrene repeating units and non-styrenic repeating units comprises a content of styrene repeating units from about 5 mol % to about 50 mol % (e.g., from about 5 mol % to about 20 mol %; about 15 mol % to about 40 mol %; about 10 mol % to about 45 mol %; about 25 mol % to about 50 mol %; or about 20 mol % to about 45 mol %). In addition, or alternatively, the polymer comprising styrene repeating units and non-styrenic repeating units comprises a content of non-styrenic repeating units from about 50 mol % to about 95 mol % (e.g., from about 50 mol % to about 80 mol %, about 60 mol % to about 90 mol %, about 70 mol % to about 95 mol % or about 75 mol % to about 95 mol %). In some instances, the sum of the content of styrene repeating units and the content of non-styrenic repeating units is 100 mol %.

In particular examples, the pre-foam compositions described herein comprise from about 5 parts per hundred of resin (phr) to about 45 phr of the polymer comprising styrene repeating units and non-styrenic repeating units component (i.e., the styrenic copolymer component). The pre-foam compositions can comprise from about 10 phr to about 40 phr of the styrenic copolymer component. The pre-foam compositions can comprise from about 12 phr to about 35 phr of the styrenic copolymer component. The pre-foam compositions can comprise from about 15 phr to about 35 phr of the styrenic copolymer component. The pre-foam compositions can comprise from about 10 phr to about 30 phr of the styrenic copolymer component. The pre-foam compositions can comprise from about 10 phr to about 25 phr of the styrenic copolymer component. The pre-foam compositions can comprise from about 10 phr to about 22 phr of the styrenic copolymer component.

As used herein, the stryrenic copolymer component is understood to refer to all the polymers present in the pre-foam composition which individually have both styrene repeating units and non-styrenic repeating units. Thus, the concentration of the styrenic copolymer component in a pre-foam composition refers to the total concentration of each polymer comprising styrene repeating units and non-styrenic repeating units present in the composition. In some pre-foam compositions, the styrenic copolymer component can be formed of only a single polymer comprising styrene repeating units and non-styrenic repeating units. In other pre-foam compositions, the styrenic copolymer component can be by formed of a plurality of polymers each of which has both styrene repeating units and non-styrenic repeating units.

The pre-foam composition described herein also comprises at least one $C_4$-$C_{100}$ unsaturated olefin. The $C_4$-$C_{100}$ unsaturated olefin can be a $C_8$-$C_{50}$-unsaturated olefin. The $C_4$-$C_{100}$ unsaturated olefin can be a $C_{12}$-$C_{30}$-unsaturated olefin. The $C_4$-$C_{100}$ unsaturated olefin can be a $C_{16}$-$C_{100}$-unsaturated olefin. The $C_4$-$C_{100}$ unsaturated olefin can be a $C_{50}$-$C_{100}$-unsaturated olefin. As used herein, the $C_x$-$C_y$ nomenclature is understood to specify the carbon length of the unsaturated olefin, not the location of unsaturation. Mixtures of two or more $C_4$-$C_{100}$ unsaturated olefins are also contemplated herein. In some examples, a $C_4$-$C_{100}$ unsaturated olefin can be pre-polymer (e.g., a monomer); a linear oligomer; a polymer.

As used herein, the term "unsaturated olefin" is understood to encompass any $C_4$-$C_{100}$ olefin comprising at least one terminal C—C double bond and a total of about 4 to about 100 (e.g., 8 to 50; 12 to 30; 4 to 20; 10 to 50; 30 to 90; 20 to 100; 50 to 75; or 20 to 80) total carbon atoms. Additional carbon-carbon double bonds can be present in the unsaturated olefin. Examples of $C_4$-$C_{100}$ unsaturated olefins include propene, 1-butene, 4-methyl-1-pentene, 1-hexene, 1-octene, 1-decene, 1-dodecene, 1-tetradecene, 1-hexadecene, and 1-octadecene. In other examples, $C_4$-$C_{100}$ unsaturated olefins can be alkyl- or cycloalkyl-substituted unsaturated olefins. As used herein, the term "unsaturated olefin" is also understood to encompass any $C_4$-$C_{100}$ olefin comprising a plurality of polymerized units, wherein at least a portion of the polymerized units include at least one terminal C—C double bond and a total of about 4 to about 100 (e.g., 8 to 50; 12 to 30; 4 to 20; 10 to 50; 30 to 90; 20 to 100; 50 to 75; or 20 to 80) total carbon atoms. In other words, the unsaturated olefin can be an unsaturated olefin polymer or copolymer, including unsaturated olefin block copolymers. Additional carbon-carbon double bonds can be present in the unsaturated olefin polymer or copolymer. Examples of unsaturated olefinic copolymers include the TAFMER® unsaturated olefin copolymers available from Mitsui Chemicals America, Inc., Rye Brook, NY (e.g., TAFMER® DF110 and TAFMER® DF605 ethylene/unsaturated olefin copolymers); and ENGAGE® and INFUSE® olefin block copolymers, both available from The Dow Chemical Company, Midland, MI (e.g., INFUSE® 9107 olefin block copolymer).

In some examples, the pre-foam compositions of the various examples described herein can comprise one or more polymers comprising styrene repeating units and non-styrenic repeating units, one or more $C_4$-$C_{100}$ unsaturated olefins, and one or more olefin block copolymers.

In some examples, $C_4$-$C_{100}$ unsaturated olefins can comprise one or more heteroatoms (e.g., —O—, $NR^1$—, —S(O)$_q$— (wherein q is an integer from 0 to 2) and combinations thereof). An example of such heteroatom-interrupted $C_4$-$C_{100}$ unsaturated olefins include allyl ether and allyl-terminated polyethylene glycol.

In particular examples, the pre-foam compositions described herein comprise from about 30 phr to about 90 phr of the $C_4$-$C_{100}$ unsaturated olefin component (i.e., the unsaturated olefin component). The pre-foam compositions can comprise from about 35 phr to about 85 phr of the unsaturated olefin component. The pre-foam compositions can comprise from about 40 phr to about 80 phr of the unsaturated olefin component. The pre-foam compositions can comprise from about 45 phr to about 75 phr of the unsaturated olefin component. The pre-foam compositions can comprise from about 40 phr to about 85 phr of the unsaturated olefin component. The pre-foam compositions can comprise from about 45 phr to about 85 phr of the unsaturated olefin component. The pre-foam compositions can comprise from about 43 phr to about 82 phr of the unsaturated olefin component.

As used herein, the unsaturated olefin component is understood to refer to all the $C_4$-$C_{100}$ unsaturated olefins present in the pre-foam composition. Thus, the concentration of the unsaturated olefin component in a pre-foam composition refers to the total concentration of each $C_4$-$C_{100}$ unsaturated olefin present in the composition, including all $C_4$-$C_{100}$ unsaturated olefin monomers, $C_4$-$C_{100}$ unsaturated olefin oligomers, $C_4$-$C_{100}$ unsaturated olefin polymers, and $C_4$-$C_{100}$ unsaturated olefin copolymers. In some pre-foam compositions, the unsaturated olefin component can be formed of only a single $C_4$-$C_{100}$ unsaturated olefin, such as, for example, a single $C_4$-$C_{100}$ unsaturated olefin copolymer. In other pre-foam compositions, the unsaturated olefin component can be formed of a plurality of $C_4$-$C_{100}$ unsaturated olefin, such as, for example, a plurality of $C_4$-$C_{100}$ unsaturated olefin copolymers.

The compositions of the various examples described herein can also comprise at least one ethylene vinyl acetate copolymer, in addition to the polymer comprising styrene repeating units and non-styrenic repeating units; and the $C_4$-$C_{100}$ unsaturated olefin. And, in some instances, the at least one ethylene vinyl acetate copolymer comprises two different ethylene vinyl acetate copolymers.

In some examples, the at least one ethylene vinyl acetate copolymer is a random copolymer. In other examples, the at least one ethylene vinyl acetate copolymer comprises an ethylene content. In still other examples, the at least one ethylene vinyl acetate copolymer is at least partially unsaturated (e.g., comprises ethylenic unsaturation). In some examples, the pre-foam composition comprises about 20 wt. % to about 60 wt. % (e.g., from about 25 wt. % to about 50 wt. %; about 30 wt. % to about 50 wt. %; about 40 wt. % to about 60 wt. %; about 30 wt. % to about 60 wt. %; or about 45 wt. % to about 60 wt. %) of the at least one ethylene vinyl acetate copolymer. A suitable ethylene vinyl acetate copolymer includes EVLAX® 40L-03 ethylene vinyl acetate resin available from E.I. DuPont de Nemours Co., Wilmington, DE. Other suitable ethylene vinyl acetate copolymers include EVATHENE® UE659 and EVATHENE® UE3300 ethylene vinyl acetate copolymers available from USI Corporation, Taiwan, ROC.

In some examples, the pre-foam compositions comprise about 1 to about 10 wt. % of a first ethylene vinyl acetate copolymer and about 5 to about 50 wt. % of a second ethylene vinyl acetate copolymer, wherein the wt. % amounts are relative to the weight of the pre-foam composition.

In one example, when the at least one ethylene vinyl acetate copolymer comprises two different ethylene vinyl acetate copolymers, the at least two different ethylene vinyl acetate copolymers can differ in at least vinyl acetate content. Thus, for example, a first ethylene vinyl acetate copolymer can comprise about 15 to about 40 mol % vinyl acetate (e.g., from about 15 to about 30 mol %; about 25 to about 35 mol %; or about 20 mol % to about 40 mol %) and a second ethylene vinyl acetate copolymer comprises about 15 to about 30 mol % (e.g., from about 15 to about 25 mol %; about 20 mol % to about 30 mol %; or about 15 mol % to about 30 mol %) vinyl acetate.

In particular examples, the pre-foam compositions described herein do not include an ethylene vinyl acetate copolymer (EVA). In other words, the pre-foam compositions described herein can be free of an EVA component.

Alternatively, the pre-foam compositions described herein can comprise from about 5 phr to about 50 phr of the EVA component. The pre-foam compositions can comprise from about 10 phr to about 45 phr of the EVA component. The pre-foam compositions can comprise from about 20 phr to about 45 phr of the EVA component. The pre-foam compositions can comprise from about 25 phr to about 40 phr of the EVA component. The pre-foam compositions can comprise from about 25 phr to about 35 phr of the EVA component. The pre-foam compositions can comprise from about 30 phr to about 37 phr of the EVA component. As used herein, the EVA component is understood to refer to all the ethylene vinyl acetate copolymers present in the pre-foam composition. Thus, the concentration of the EVA component in a pre-foam composition refers to the total concentration of each ethylene vinyl acetate copolymer present in the composition. In some pre-foam compositions, the EVA component can be formed of only a single ethylene vinyl acetate copolymer. In other pre-foam compositions, the EVA component can be formed of a plurality of different ethylene vinyl acetate copolymers.

Particular ratios of the components of the pre-foam compositions have been found to produce foams having beneficial properties. As used herein and unless otherwise indicated or dictated by context, the ratio of a first component to a second component is understood to the parts per hundred of resin (phr) of the first component divided by the phr of the second component present in the composition. In some aspects, a sum of ratios is presented, which is understood to mean the sum of the specific ratios described.

The composition can be a composition having a ratio of the styrenic copolymer component to the unsaturated olefin component of about 0.1 to about 1.0. The ratio of the styrenic copolymer component to the unsaturated olefin component can be from about 0.05 to about 0.40. The ratio of the styrenic copolymer component to the unsaturated olefin component can be from about 0.1 to about 0.3. The ratio of the styrenic copolymer component to the unsaturated olefin component can be from about 0.15 to about 0.32.

The composition can be a composition having a ratio of the styrenic copolymer component to the EVA component of about 0.2 to about 2.0. The ratio of the styrenic copolymer component to the EVA component can be from about 0.3 to about 1.0. The ratio of the styrenic copolymer component to the EVA component can be from about 0.3 to about 0.8. The ratio of the styrenic copolymer component to the EVA component can be from about 0.35 to about 0.72.

The composition can be a composition having a ratio of the unsaturated olefin component to the EVA component of about 2.0 to about 4.0. The ratio of the unsaturated olefin component to the EVA component can be from about 1.5 to about 3.0. The ratio of the unsaturated olefin component to the EVA component can be from about 1.5 to about 2.5. The ratio of the unsaturated olefin component to the EVA component can be from about 2.0 to about 2.5.

In some aspects, a ratio I of a total parts by weight of the olefinic copolymers present in the composition to a total parts by weight of the A-B-A block copolymer or partially hydrogenated thermoplastic elastomeric block copolymers present in the composition is from about 0.65 to about 7.00, about 0.65 to 2.00, about 0.8 to 2.00, about 0.8 to 7.00, about 1.00 to 2.00, about 2.00 to 3.00, about 1.00 to 3.00, about 0.8 to 3.00, or about 0.65 to 3.00.

In some aspects, a ratio II of a total parts by weight of the linking polymers present in the composition to a total parts by weight of the A-B-A block copolymer or partially hydrogenated thermoplastic elastomeric block copolymers present in the composition is from about 0.40 to 3.50, about 0.40 to 3.25, about 1.00 to 3.50, about 1.00 to 3.25, about 1.00 to 3.00, about 1.2 to 2.8, about 1.25 to 3.25, about 2.00 to 3.00, about 2.00 to 3.50, or about 1.00 to 2.00.

In some aspects, a ratio III of a total parts by weight of the EVA copolymers present in the composition to a total parts by weight of the A-B-A block copolymer or partially hydrogenated thermoplastic elastomeric block copolymers present in the composition is from about 1.00 to 5.00, about 1.00 to 2.00, about 2.00 to 3.00, about 3.00 to 4.00, about 4.00 to 5.00, about 3.00 to 5.00, about 3.50 to 5.00, about 4.00 to 5.00, or about 3.50 to 4.50.

In some aspects, a ratio IV of a total parts by weight of the linking polymers present in the composition to a total parts by weight of the A-B-A block copolymers or partially hydrogenated thermoplastic elastomeric block copolymers present in the composition is from about 1.00 to 10.00, about 1.00 to 5.00, about 3.00 to 10.00, about 3.00 to 5.00, about 3.50 to 5.00, about 3.00 to 4.00, or about 4.00 to 5.00.

In some aspects, a ratio V of a total parts by weight of the one or more EVA copolymers present in the composition to a total parts by weight of the one or more olefinic copolymers present in the composition is from about 1.00 to 10.00, about 2.00 to 10.00, about 2.00 to 5.00, about 1.00 to 5.00, about 1.50 to 5.00, about 2.50 to 5.00, about 2.50 to 4.50, or about 2.00 to 4.50.

In some aspects, a ratio VI of a total parts by weight of the one or more EVA copolymers present in the composition to a total parts by weight of the one or more linking polymers present in the composition is about 1.00 to 2.00, about 0.50 to 5.00, about 0.50 to 3.00, about 1.00 to 3.00, about 1.00 to 5.00, or about 1.20 to 2.00.

In some aspects, a sum of ratio I, II, III, IV, and V is from about 1.00 to 10.00, about 1.00 to 2.00, about 2.00 to 3.00, about 3.00 to 4.00, about 4.00 to 5.00, about 5.00 to 6.00, about 6.00 to 7.00, about 7.00 to 8.00, about 8.00 to 9.00, about 9.00 to 10.00, about 2.50 to 7.50, about 3.50 to 7.50, about 3.50 to 5.00, about 2.50 to 5.00, or .about 2.75 to 4.50.

In some aspects, a sum of ratio I, II, III, IV, V and VI is from about 1.50 to 16.00, about 5.00 to 16.00, about 10.00 to 16.00, about 14.00 to 16.00, about 14.00 to 15.00, about 10.00 to 15.00, about 5.00 to 10.00, about 1.50 to 5.00, or about 12.00 to 15.00.

When the composition includes an EVA component, the composition can have a sum of the ratio of the styrenic copolymer component to the unsaturated olefin component, of the ratio of the styrenic copolymer component to the EVA component, and of the ratio of the unsaturated olefin component to the EVA component of about 1.5 to about 4.5. The sum of the ratios for the composition can be from about 2.0 to about 4.5. The sum of the ratios for the composition can be from about 2.2 to about 3.8. The sum of the ratios for the composition can be from about 2.5 to about 3.5.

It has been found that, in some aspects, a ratio II of a total parts by weight of the A-B-A block copolymer present in the composition to a total parts by weight of the linking polymer present in the composition has a strong impact on the desired softness and energy return of the foamed compositions. In some aspects, foam compositions having an improved softness and energy return can be formed from compositions having a ratio II from about 1.00 to 5.00, about 1.00 to 4.00, about 1.50 to 4.00, about 1.50 to 3.50, about 1.00 to 3.00, or about 2.00 to 4.00.

The compositions of the various examples described herein can also comprise a blowing agent, a free-radical initiator or combinations thereof.

The blowing agent can be any appropriate type of physical blowing agent known in the art including nitrogen, carbon dioxide, hydrocarbons (e.g., propane, pentane, isopentane, and cyclopentane), chlorofluorocarbons, noble gases (e.g., helium (He), neon (Ne), argon (Ar), krypton (Kr), and xenon (Xe)) and/or mixtures thereof. In one example, the blowing agent comprises nitrogen. The blowing agent may be supplied in any flowable physical state such as a gas, a liquid, or a supercritical fluid. According to one example, a blowing agent source provides a blowing agent (e.g., carbon dioxide, nitrogen, and methanol) that is in a supercritical fluid state upon contacting (e.g., injection into) the pre-foam compositions of the various examples described herein, e.g., when the pre-foam compositions are formed in an extruder (e.g., a twin-screw extruder).

Alternatively, the blowing agent can be any appropriate type of chemical blowing agent known in the art including carbonates (e.g., ammonium carbonate and carbonates of alkali metals), azo compounds, diazo compounds, and combinations thereof. Chemical blowing agents include 2,2'-azobis(2-cyanobutane), 2,2'-azobis(methylbutyronitrile), azodicarbonamide, p,p'-oxybis(benzene sulfonyl hydrazide), p-toluene sulfonyl semicarbazide, p-toluene sulfonyl hydrazide, and combinations thereof. In the case of chemical blowing agents, gaseous products (e.g., nitrogen gas) and other by-products are formed by a chemical reaction(s), promoted by the process or by a reacting polymer's exothermic heat. Since the blowing reaction occurs forming low molecular weight compounds acting as the blowing gas, additional exothermic heat may also be released.

In some examples, the compositions described herein may require a temperature (e.g., from heating) of from about 130° C. to about 210° C. (e.g., from about 150° C. to about 190° C. or 165° C. to about 195° C.—such as temperatures to which an extruder and/or a mold might be heated) to "trigger" the chemical blowing agent to "decompose" to produce the gas(es) necessary to transform the pre-foam compositions of the various examples described herein into the foam compositions of the various examples described herein.

Examples of blowing agents include UNICELL brand blowing agents, such as UNICELL-D600 MT, available from Dongjin Semichem Co., Ltd., Seoul, Korea.

In some examples, a combination of physical and chemical blowing agents can be used.

The pre-foam compositions of the various examples described herein can also comprise metal oxides, organic acids, fillers, nucleating agents, and combinations thereof. Examples of metal oxides include zinc oxide, titanium dioxide, and combinations thereof. Examples of organic acids include $C_3$-$C_{30}$-alkanoic acids (e.g., $C_{14}$-$C_{30}$-alkanoic acids such as fatty acids) such as stearic acid and combinations of two or more $C_3$-$C_{30}$-alkanoic acids. Calcium carbonate is an example of a material which can be used both as a filler and as a nucleating agent.

The pre-foam compositions of the various examples described herein can also comprise one or more crosslinking agents. Examples of crosslinking agents include aliphatic unsaturated amides, such as methylenebisacryl- or -methacrylamide or ethylenebisacrylamide; aliphatic esters of polyols or alkoxylated polyols with ethylenically unsaturated acids, such as di(meth)acrylates or tri(meth)acrylates of butanediol or ethylene glycol, polyglycols or trimethylolpropane; di- and triacrylate esters of trimethylolpropane; acrylate and methacrylate esters of glycerol and pentaerythritol; allyl compounds, such as allyl (meth)acrylate, alkoxylated allyl (meth)acrylate, triallyl cyanurate, triallyl isocyanurate, maleic acid diallyl ester, poly-allyl esters, vinyl trimethoxysilane, vinyl triethoxysilane, polysiloxane comprising at least two vinyl groups, tetraallyloxyethane, tetraallyloxyethane, triallylamine, and tetraallylethylenediamine. Mixtures of the crosslinking agents can also be employed.

The pre-foam compositions of the various examples described herein can also comprise one or more free-radical initiators, such as an organic peroxide, a diazo compound (e.g., those described in U.S. Pat. No. 6,303,723, which is incorporated by reference as if fully set forth herein) or combinations of two or more free-radical initiators. Examples of organic peroxides that can be used as free-radical initiators include dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy) hexyne-3; di(2-t-butyl-peroxyisopropyl)benzene; dilauroyl peroxide; dibenzoyl peroxide; t-butyl hydroperoxide; and combinations thereof.

The pre-foam compositions of the various examples described herein can be solids or liquids at a temperature of about 25° C.

The pre-foam compositions of the various examples described herein can be crosslinked to form crosslinked pre-foam compositions. The pre-foam compositions can be crosslinked using various methods, including chemical crosslinking methods or crosslinking methods using actinic radiation (e.g., thermal radiation, UV light, electron beam and gamma radiation). Such compositions comprise, in some examples, a polymer comprising styrene repeating units and non-styrenic repeating units, the polymer crosslinked with a $C_4$-$C_{100}$ unsaturated-olefin block copolymer comprising blocks of $C_4$-$C_{100}$ unsaturated-olefin olefin. The crosslinking between the polymer comprising styrene repeating units and non-styrenic repeating units and the $C_4$-$C_{100}$ unsaturated olefin block copolymer can occur directly between the molecules of the polymer comprising styrene repeating units and non-styrenic repeating units and the $C_4$-$C_{100}$ unsaturated olefin block copolymer, for example, without an "external" crosslinking agent such as the one or more crosslinking agents described herein. The crosslinking between the polymer comprising styrene repeating units and non-styrenic repeating units and the $C_4$-$C_{100}$ unsaturated olefin block copolymer can also occur with an "external" crosslinking agent, such as the one or more crosslinking agents described herein.

Those of ordinary skill in the art will also recognize that there can be intramolecular crosslinking occurring between portions of a polymer comprising styrene repeating units and non-styrenic repeating units molecule or portions of a $C_4$-$C_{100}$ unsaturated olefin block copolymer. This crosslinking can occur in the presence or in the absence of an "external" crosslinking agent such as the one or more crosslinking agents described herein.

In some examples, the pre-foam compositions of the various examples described herein can be crosslinked to form crosslinked pre-foam compositions in the presence of a blowing agent (e.g., a chemical blowing agent or a physical blowing agent, as described herein).

In some examples, the crosslinked pre-foam compositions of the various examples described herein can be solids or liquids, but generally are solids (e.g., thermoplastic solids) at a temperature of about 25° C. or higher (e.g., at a temperature of from about 25° C. to about 220° C. and a pressure of from about 500 kPa to about 100 MPa). In some examples, the foam compositions of the various examples described herein are generally are solids (e.g., thermoplastic solids) at a temperature of about 25° C. or higher (e.g., at a temperature of from about 25° C. to about 220° C. and a pressure of from about 500 kPa to about 100 MPa).

In some examples, the crosslinked pre-foam compositions of the various examples described herein can further comprise at least one ethylene vinyl acetate copolymer and/or at least one olefin block copolymer, as each of the terms is defined herein.

Foam compositions are also contemplated herein and are interchangeably called "foam preforms." As used herein, the term "foam compositions" refers to:
  a crosslinked pre-foam composition that is foamed (e.g., foamed using a blowing agent (physical and/or chemical)) before crosslinking, after crosslinking or substantially simultaneously with crosslinking; or
  combinations of a pre-foam composition and a crosslinked pre-foam composition (e.g., a combination of a pre-foam composition and a crosslinked pre-foam composition, wherein the combination is foamed (e.g., foamed using a blowing agent (physical and/or chemical)) after the combination is formed either after mixing two such compositions or after partially crosslinking the pre-foam composition, such that some crosslinked pre-foam composition is formed in situ).

In some examples, the foam compositions of the various examples described herein can further comprise at least one ethylene vinyl acetate copolymer and/or at least one olefin block copolymer, as each of the terms is defined herein.

Some foam compositions of the various examples described herein (e.g., foam compositions comprising a polymer comprising styrene repeating units and non-styrenic repeating units, crosslinked with a $C_4$-$C_{100}$ unsaturated olefin) can form solid (e.g., thermoplastic) foam materials. These thermoplastic foam materials can be used as "foam preforms" and the foam preforms can subsequently be compression molded. The foam compositions of the present disclosure can have a density of about 0.08 g/cm³ to about 0.15 g/cm³ (e.g., from about 0.10 g/cm³ to about 0.12 g/cm³). In some examples, such foam preforms have an energy return from about 60% to about 85% (e.g., from about 65% to about 80%; about 65% to about 75%; about 70% to about 80%; or about 75% to about 80%).

Some foam compositions of the various examples described herein (e.g., foam preforms) can be compression molded to form compression molded foam. Such compression molded foam can have a density of from about 0.15 g/cm³ to about 0.30 g/cm³ (e.g., from about 0.15 g/cm³ to about 0.2 g/cm³).

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

All publications, patents, and patent applications cited in this specification are cited to disclose and describe the methods and/or materials in connection with which the publications are cited. All such publications, patents, and patent applications are herein incorporated by references as if each individual publication or patent were specifically and individually indicated to be incorporated by reference. Such incorporation by reference is expressly limited to the methods and/or materials described in the cited publications, patents, and patent applications and does not extend to any lexicographical definitions from the cited publications, patents, and patent applications. Any lexicographical definition in the publications, patents, and patent applications cited that is not also expressly repeated in the instant specification should not be treated as such and should not be read as defining any terms appearing in the accompanying claims.

Although any methods and materials similar or equivalent to those described herein can also be used in the practice or testing of the present disclosure, the preferred methods and materials are now described. Functions or constructions well-known in the art may not be described in detail for brevity and/or clarity. Aspects of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'". It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.4%, 3.2%, and 4.4%) within the indicated range.

The term "about," as used herein, can include traditional rounding according to significant figures of the numerical value. In some aspects, the term about is used herein to mean a deviation of 10%, 5%, 2.5%, 1%, 0.5%, 0.1%, 0.01%, or less from the specified value.

The articles "a" and "an," as used herein, mean one or more when applied to any feature in aspects of the present disclosure described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

As used herein, the term "units" can be used to refer to individual (co)monomer units such that, for example, styrenic repeat units refers to individual styrene (co)monomer units in the polymer. In addition, the term "units" can be used to refer to polymeric block units such that, for example, "styrene repeating units" can also refer to polystyrene blocks; "units of polyethylene" refers to block units of poplyethylene; "units of polypropylene" refers to block units of polypropylene; "units of polybutylene" refers to block units of polybutylene, and so on. Such use will be clear from the context.

EXAMPLES

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

Materials

The materials referred to throughout the examples are, unless otherwise indicated, described in Table 1 below. The partially hydrogenated SEBS block copolymers from Asahei Kasei (marketed under the trade name TUFTEC®) all have an elongation at break of greater than 650% when measured using ASTM D638. The P1083 (and the research grade JT-83) have a styrene content of about 20%, while the P5051 has a styrene content of about 47%. The SEBS copolymer from KRATON Polymers (KRATON® G1651 E) has a styrene content of about 30%-33%. The ENGAGE® polyolefin elastomers are copolymers of ethylene and octene, while the TAFMER® linking polymers are random copolymers of ethylene and 1-butene. For materials where the supplier is not listed in Table 1 (e.g. stearic acid), these materials are generally available from a variety of suppliers.

TABLE 1

Materials Used In Examples

| Trade Name | Ingredient | Description | Supplier |
| --- | --- | --- | --- |
| TUFTEC ® P1083 | Partially hydrogenated SEBS block copolymer | Aromatic/aliphatic copolymer | Asahei Kasei |
| TUFTEC ® JT-83 (research grade of P1083) | Partially hydrogenated SEBS block copolymer | Aromatic/aliphatic copolymer | Asahei Kasei |
| TUFTEC ® P5051 | Partially hydrogenated SEBS block copolymer | Aromatic/aliphatic copolymer | Asahei Kasei |
| KRATON ® G1651E | partially hydrogenated SEBS block copolymer | Aromatic/aliphatic copolymer | KRATON Polymers Group |
| INFUSE ™ 9000 OBC | Olefin block copolymer | Olefinic Copolymer | Dow Chemical Co. |
| INFUSE ™ 9107 OBC | Olefin block copolymer | Olefinic Copolymer | Dow Chemical Co. |
| INFUSE ™ 9530 OBC | Olefin block copolymer | Olefinic Copolymer | Dow Chemical Co. |
| ENGAGE ® 8480 | Polyolefin elastomer | Olefinic Copolymer | Dow Chemical Co. |
| ENGAGE ® 8540 | Polyolefin elastomer | Olefinic Copolymer | Dow Chemical Co. |
| ENGAGE ® 8440 | Polyolefin elastomer | Olefinic Copolymer | Dow Chemical Co. |
| TAFMER ® DF-110 | Alpha-olefin copolymer | Linking Polymer | Mitsui Elastomers |
| TAFMER ® DF-605 | Alpha-olefin copolymer | Linking Polymer | Mitsui Elastomers |
| EVA-659 | Ethylene vinyl acetate copolymer | Ethylene vinyl acetate (EVA) | USI Corporation |
| EVA-3330 | Ethylene vinyl acetate copolymer | EVA | USI Corporation |
| ELVAX ® 360 | Ethylene vinyl acetate copolymer | EVA | DuPont |
| ST/AC | Stearic Acid | Organic acid | |
| ZnO | Zinc oxide | Metal oxide | |
| $TiO_2$ | Titanium Dioxide | Metal oxide | |
| $CaCO_3$ | Calcium Carbonate | Filler/Nucleating Agent | |
| TAC-50GR | Triallyl cyanurate | Crosslinking agent | |
| Color base | | Coloring agent | |
| 27020 | Blue tint | Coloring agent | |
| EVA 1375 | Red pigment | Coloring agent | |
| 8502 | Black pigment | Coloring agent | |

TABLE 1-continued

Materials Used In Examples

| Trade Name | Ingredient | Description | Supplier |
|---|---|---|---|
| R929 | | Coloring agent | |
| UNICELL D600-MT (MB-50%) | | Blowing agent | Tramaco |
| JTR/TL | | Blowing agent | Kumyang |
| COLINK 101-45GE | 2,5-Dimethyl-2,5-di(tert-butylperoxy)hexane | Free-radical initiator | |
| DCP | Dicumyl peroxide | Free-radical initiator | |

Example 1: Batch Process of Preparing Compositions Capable of Being Foamed

The pre-foam compositions, compositions prior to being foamed, described in Tables 3 and 4 were prepared. Some of the pre-foam compositions were first compounded using the components shown in Table 2 to form pre-foam base compositions (PFBC) 1 and PFBC 2, according to Example 1. These PFBCs were then used to prepare the foam compositions shown in Tables 3, 4. The properties of the foam compositions are described in Table 5. In some instances, PFC 1 or PFBC 2 were further modified as shown in Tables 3, 4 and 5 by adding additional materials. Other formulations were prepared directly, without first forming a pre-foam base composition.

TABLE 2

Composition of Pre-Foam Base Compositions Used For Making Pre-Foam Compositions

| TABLE 2 Trade Name | Pre-Foam Base Composition 1 (PFBC 1) phr in PFBC1 | Pre-Foam Base Composition 2 (PFBC 2) phr in PFBC2 | Formulations A, B, C and D phr in formulation |
|---|---|---|---|
| TUFTEC ® P1083 | 10.0 | 16.6 | ** |
| TUFTEC ® P5051 | 0.0 | 0.0 | ** |
| TUFTEC ® JT-83 | 0.0 | 0.0 | ** |
| KRATON ® D G1651E | 0.0 | 0.0 | ** |
| INFUSE ™ OBC9000 | 0.0 | 0.0 | ** |
| INFUSE ™ OBC9107 | 15.0 | 24.9 | ** |
| INFUSE ™ OBC9507 | 0.0 | 0.0 | ** |
| INFUSE ™ OBC9530 | 0.0 | 0.0 | ** |
| ENGAGE ® 8480 | 0.0 | 0.0 | ** |
| ENGAGE ® 8540 | 0.0 | 0.0 | ** |
| ENGAGE ® 8440 | 0.0 | 0.0 | ** |
| TAFMER ® DF-110 | 12.0 | 19.9 | ** |
| TAFMER ® DF-605 | 18.0 | 29.9 | ** |
| EVA-659 | 40.0 | 0.0 | ** |
| EVA-3330 | 5.0 | 0.0 | ** |
| ELVAX ® 360 | 0.0 | 0.0 | ** |
| ELVAX ® 40L-03 | 0.0 | 0.0 | ** |
| ST/AC | 1.0 | 1.7 | 0.0 |
| ZnO | 0.8 | 1.4 | 1.5 |
| TiO$_2$ | 0.0 | 0.0 | 3.6 |
| CaCO$_3$ | 0.0 | 0.0 | 5.0 |
| TAC-50GR | 0.3 | 0.5 | 0.0 |
| Color base | 11.0 | 18.3 | 0.0 |
| 27020 | 0.0 | 0.0 | 0.0 |
| EVA 1375 | 0.0 | 0.0 | 0.0 |
| 8502 | 0.0 | 0.0 | 0.0 |
| R929 | 0.0 | 0.0 | 0.1 |
| UNICELL D600-MT | 11.5 | 11.5 | 0.0 |
| JTR/TL | 0.0 | 0.0 | 9.8 |
| COLINK 101-45GE | 0.0 | 0.0 | 0.0 |
| DCP | 0.7* | 0.7* | 0.7 |

*concentration in formulation
** See Table 2 and 3

The pre-foam compositions were formed using a batch process where the partially hydrogenated SEBS block copolymer and the olefin polymer were combined in a kneader for about 20 minutes. During this time, the kneader temperature was maintained at a temperature of from about 100° C. to about 120° C. In some examples, the ethylene vinyl acetate copolymer (the EVA component of the composition) and/or pigments was added to the mixture the partially hydrogenated SEBS block copolymer and the olefin polymer.

Next, where present, the one or more metal oxide, one or more organic acid, and one or more crosslinking agent were added to the mixture. The combined mixture including the partially hydrogenated SEBS block copolymer and the olefin polymer, as well as (if present) the EVA along with the metal oxide, organic acid, and crosslinking agent were mixed in the kneader for about 20 minutes, while the kneader temperature was held at a temperature of from about 100° C. to about 120° C.

Next, the kneader temperature was lowered to about 90° C. or below. The combined mixture in the kneader was then combined with the blowing agent and a free radical initiator. The kneaded mixture was then subjected to pelletization using a die that is cooled to maintain the temperature at about 90° C. or below.

TABLE 3

Composition of foams

| | Composition | | | | |
|---|---|---|---|---|---|
| | A | B | C | D | E |
| Material | Parts by Wt. | Parts by Wt. | Parts by Wt. | Parts by Wt. | Parts by Wt. |
| PFBC 1 (MB1) | 0.0 | 0.0 | 0.0 | 0.0 | 0.0 |
| PFBC 2 (MB2) | 0.0 | 0.0 | 0.0 | 0.0 | 70.0 |

TABLE 3-continued

Composition of foams

| Material | | | | | |
|---|---|---|---|---|---|
| Kraton G1651E | 0.0 | 0.0 | 0.0 | 0.0 | 0.0 |
| TUFTEC ® P1083 | 0.0 | 0.0 | 0.0 | 0.0 | 9.3 |
| TUFTEC ® JT-83 | 20.0 | 20.0 | 20.0 | 20.0 | 10.0 |
| TUFTEC ® P5051 | 0.0 | 0.0 | 0.0 | 0.0 | 0.0 |
| INFUSE ™ 9000 OBC | 0.0 | 0.0 | 0.0 | 0.0 | 0.0 |
| INFUSE ™ 9107 OBC | 0.0 | 0.0 | 0.0 | 0.0 | 13.9 |
| INFUSE ™ 9530 OBC | 0.0 | 0.0 | 0.0 | 20.0 | 20.0 |
| ENGAGE ® 8440 | 0.0 | 0.0 | 20.0 | 0.0 | 0.0 |
| ENGAGE ® 8480 | 20.0 | 0.0 | 0.0 | 0.0 | 0.0 |
| ENGAGE ® 8540 | 0.0 | 20.0 | 0.0 | 0.0 | 0.0 |
| TAFMER ® DF-110 | 0.0 | 0.0 | 0.0 | 0.0 | 11.1 |
| TAFMER ® DF-605 | 0.0 | 0.0 | 0.0 | 0.0 | 16.7 |
| EVA-659 | 0.0 | 0.0 | 0.0 | 0.0 | 0.0 |
| EVA-3330 | 0.0 | 0.0 | 0.0 | 0.0 | 0.0 |
| ELVAX ® 360 | 60.0 | 60.0 | 60.0 | 60.0 | 0.0 |
| ZnO | | | | | 1.0 |
| ST/AC | | | | | 1.0 |
| TAC-GR50 | | | | | 0.3 |
| D600MT | | | | | 8.9 |
| DCP | | | | | 0.0 |
| 101-45GE | | | | | 0.9 |
| Total Parts by Wt. | 120.7 | 120.7 | 120.7 | 120.7 | 112.0 |

Composition

| Material | F Parts by Wt. | G Parts by Wt. | H Parts by Wt. | I Parts by Wt. | J Parts by Wt. |
|---|---|---|---|---|---|
| PFBC 1 (MB1) | 0.0 | 0.0 | 0.0 | 0.0 | 0.0 |
| PFBC 2 (MB2) | 90.0 | 70.0 | 100.0 | 50.0 | 80.0 |
| Kraton G1651E | 0.0 | 0.0 | 0.0 | 0.0 | 0.0 |
| TUFTEC ® P1083 | 11.9 | 9.3 | 13.2 | 6.6 | 10.6 |
| TUFTEC ® JT-83 | 10.0 | 10.0 | 0.0 | 10.0 | 0.0 |
| TUFTEC ® P5051 | 0.0 | 0.0 | 0.0 | 20.0 | 0.0 |
| INFUSE ™ 9000 OBC | 0.0 | 0.0 | 0.0 | 0.0 | 0.0 |
| INFUSE ™ 9107 OBC | 17.9 | 13.9 | 19.9 | 9.9 | 15.9 |
| INFUSE ™ 9530 OBC | 0.0 | 20.0 | 0.0 | 20.0 | 20.0 |
| ENGAGE ® 8440 | 0.0 | 0.0 | 0.0 | 0.0 | 0.0 |
| ENGAGE ® 8480 | 0.0 | 0.0 | 0.0 | 0.0 | 0.0 |
| ENGAGE ® 8540 | 0.0 | 0.0 | 0.0 | 0.0 | 0.0 |
| TAFMER ® DF-110 | 14.3 | 11.1 | 15.9 | 7.9 | 12.7 |
| TAFMER ® DF-605 | 21.5 | 16.7 | 23.8 | 11.9 | 19.1 |
| EVA-659 | 0.0 | 0.0 | 0.0 | 0.0 | 0.0 |
| EVA-3330 | 0.0 | 0.0 | 0.0 | 0.0 | 0.0 |
| ELVAX ® 360 | 0.0 | 0.0 | 0.0 | 0.0 | 0.0 |
| ZnO | 1.0 | 1.0 | 1.0 | 1.0 | 1.0 |
| ST/AC | 1.0 | 1.0 | 1.0 | 1.0 | 1.0 |
| TAC-GR50 | 0.2 | 0.4 | 0.4 | 0.3 | 0.4 |
| D600MT | 10.0 | 8.9 | 15.2 | 8.9 | 4.7 |
| DCP | 0.4 | 0.0 | 0.0 | 0.0 | 0.0 |
| 101-45GE | 0.9 | 0.8 | 0.8 | 0.9 | 0.8 |
| Total Parts by Wt. | 113.5 | 112.1 | 118.4 | 112.0 | 107.9 |

Composition

| Material | K Parts by Wt. | L Parts by Wt. | M Parts by Wt. | N Parts by Wt. | O Parts by Wt. |
|---|---|---|---|---|---|
| PFBC 1 (MB1) | 0.0 | 0.0 | 0.0 | 0.0 | 0.0 |
| PFBC 2 (MB2) | 60.0 | 80.0 | 100.0 | 100.0 | 70.0 |
| Kraton G1651E | 0.0 | 0.0 | 0.0 | 0.0 | 0.0 |
| TUFTEC ® P1083 | 7.9 | 10.6 | 13.2 | 13.2 | 9.3 |
| TUFTEC ® JT-83 | 0.0 | 0.0 | 0.0 | 0.0 | 10.0 |
| TUFTEC ® P5051 | 0.0 | 0.0 | 0.0 | 0.0 | 0.0 |
| INFUSE ™ 9000 OBC | 0.0 | 0.0 | 0.0 | 0.0 | 20.0 |
| INFUSE ™ 9107 OBC | 11.9 | 15.9 | 19.9 | 19.9 | 13.9 |
| INFUSE ™ 9530 OBC | 40.0 | 20.0 | 0.0 | 0.0 | 0.0 |
| ENGAGE ® 8440 | 0.0 | 0.0 | 0.0 | 0.0 | 0.0 |
| ENGAGE ® 8480 | 0.0 | 0.0 | 0.0 | 0.0 | 0.0 |
| ENGAGE ® 8540 | 0.0 | 0.0 | 0.0 | 0.0 | 0.0 |
| TAFMER ® DF-110 | 9.5 | 12.7 | 15.9 | 15.9 | 11.1 |
| TAFMER ® DF-605 | 14.3 | 19.1 | 23.8 | 23.8 | 16.7 |
| EVA-659 | 0.0 | 0.0 | 0.0 | 0.0 | 0.0 |
| EVA-3330 | 0.0 | 0.0 | 0.0 | 0.0 | 0.0 |
| ELVAX ® 360 | 0.0 | 0.0 | 0.0 | 0.0 | 0.0 |
| ZnO | 1.0 | 1.0 | 1.0 | 1.0 | 1.0 |
| ST/AC | 1.0 | 1.0 | 1.0 | 1.0 | 1.0 |
| TAC-GR50 | 0.4 | 0.4 | 0.4 | 0.4 | 0.3 |
| D600MT | 4.4 | 8.6 | 5.0 | 8.6 | 8.9 |
| DCP | 0.0 | 0.0 | 0.0 | 0.0 | 0.0 |
| 101-45GE | 0.8 | 0.8 | 0.8 | 0.8 | 0.9 |
| Total Parts by Wt. | 107.6 | 111.8 | 108.2 | 111.8 | 112.0 |

Composition

| Material | P Parts by Wt. | Q Parts by Wt. | R Parts by Wt. | S Parts by Wt. | T Parts by Wt. |
|---|---|---|---|---|---|
| PFBC 1 (MB1) | 0.0 | 0.0 | 0.0 | 0.0 | 0.0 |
| PFBC 2 (MB2) | 70.0 | 100.0 | 60.0 | 70.0 | 100.0 |
| Kraton G1651E | 0.0 | 0.0 | 0.0 | 0.0 | 0.0 |
| TUFTEC ® P1083 | 9.3 | 13.2 | 7.9 | 9.3 | 13.2 |
| TUFTEC ® JT-83 | 10.0 | 0.0 | 0.0 | 10.0 | 0.0 |
| TUFTEC ® P5051 | 0.0 | 0.0 | 0.0 | 0.0 | 0.0 |
| INFUSE ™ 9000 OBC | 0.0 | 0.0 | 0.0 | 0.0 | 0.0 |
| INFUSE ™ 9107 OBC | 13.9 | 19.9 | 11.9 | 13.9 | 19.9 |
| INFUSE ™ 9530 OBC | 20.0 | 0.0 | 40.0 | 20.0 | 0.0 |
| ENGAGE ® 8440 | 0.0 | 0.0 | 0.0 | 0.0 | 0.0 |
| ENGAGE ® 8480 | 0.0 | 0.0 | 0.0 | 0.0 | 0.0 |
| ENGAGE ® 8540 | 0.0 | 0.0 | 0.0 | 0.0 | 0.0 |
| TAFMER ® DF-110 | 11.1 | 15.9 | 9.5 | 11.1 | 15.9 |
| TAFMER ® DF-605 | 16.7 | 23.8 | 14.3 | 16.7 | 23.8 |
| EVA-659 | 0.0 | 0.0 | 0.0 | 0.0 | 0.0 |
| EVA-3330 | 0.0 | 0.0 | 0.0 | 0.0 | 0.0 |
| ELVAX ® 360 | 0.0 | 0.0 | 0.0 | 0.0 | 0.0 |
| ZnO | 1.0 | 1.0 | 1.0 | 1.0 | 1.0 |
| ST/AC | 1.0 | 1.0 | 1.0 | 1.0 | 1.0 |
| TAC-GR50 | 0.3 | 0.4 | 0.4 | 0.4 | 0.4 |
| D600MT | 8.6 | 8.8 | 8.3 | 8.9 | 15.2 |
| DCP | 0.0 | 0.0 | 0.0 | 0.0 | 0.0 |
| 101-45GE | 0.9 | 0.8 | 0.8 | 0.8 | 0.8 |
| Total Parts by Wt. | 111.8 | 116.5 | 111.5 | 112.1 | 118.4 |

Composition

| Material | U Parts by Wt. | V' Parts by Wt. | W' Parts by Wt. |
|---|---|---|---|
| PFBC 1 (MB1) | 100.0 | 100.0 | 100.0 |
| PFBC 2 (MB2) | 0.0 | 0.0 | 0.0 |
| Kraton G1651E | 0.0 | 0.0 | 0.0 |
| TUFTEC ® P1083 | 8.0 | 8.0 | 8.0 |
| TUFTEC ® JT-83 | 0.0 | 0.0 | 0.0 |
| TUFTEC ® P5051 | 0.0 | 0.0 | 0.0 |
| INFUSE ™ 9000 OBC | 0.0 | 0.0 | 0.0 |
| INFUSE ™ 9107 OBC | 12.0 | 12.0 | 12.0 |
| INFUSE ™ 9530 OBC | 0.0 | 0.0 | 0.0 |
| ENGAGE ® 8440 | 0.0 | 0.0 | 0.0 |
| ENGAGE ® 8480 | 0.0 | 0.0 | 0.0 |
| ENGAGE ® 8540 | 0.0 | 0.0 | 0.0 |
| TAFMER ® DF-110 | 9.6 | 9.6 | 9.6 |
| TAFMER ® DF-605 | 14.4 | 14.4 | 14.4 |
| EVA-659 | 31.9 | 31.9 | 31.9 |
| EVA-3330 | 4.0 | 4.0 | 4.0 |
| ELVAX ® 360 | 0.0 | 0.0 | 0.0 |
| ZnO | 1.0 | 1.0 | 1.0 |
| ST/AC | 1.0 | 1.0 | 1.0 |
| TAC-GR50 | 0.4 | 1.0 | 0.6 |
| D600MT | 8.8 | 8.4 | 7.9 |
| DCP | 0.0 | 0.0 | 0.0 |
| 101-45GE | 0.8 | 0.2 | 0.6 |
| Total Parts by Wt. | 112.0 | 111.6 | 111.1 |

Example 2: Continuous Process of Preparing Pre-Foam Compositions

Pre-foam compositions can be prepared using a continuous process where the styrenic copolymer component and the unsaturated olefin component are pre-mixed in a hopper and fed into a twin-screw extruder. The zone in the twin-screw extruder into which the styrenic copolymer component and the unsaturated olefin component are fed (ZONE 1) is held at a temperature of from about 100° C. to about 120° C. When included in the pre-foam composition, the optional EVA component and/or pigments are pre-mixed with the styrenic copolymer component and the unsaturated olefin component.

Next, one or more metal oxide, one or more organic acid, and one or more crosslinking agent are added to the mixture of polymer and unsaturated olefin The particle size of the metal oxide used was less than 1 micron. The combined mixture of the styrenic copolymer component, the unsaturated olefin component, the optional EVA component, and the metal oxide, organic acid, and crosslinking agent are mixed in ZONE 1 of the twin-screw extruder at a temperature of from about 100° C. to about 120° C. until thoroughly mixed.

The combined mixture of the styrenic copolymer component, the, unsaturated olefin component, the optional EVA component, and the metal oxide, organic acid, and crosslinking agent move to ZONE 2 of the twin-screw extruder, where the temperature is about 90° C. or below. The combined mixture of the styrenic copolymer component, the unsaturated olefin component, the EVA component, and the metal oxide, organic acid, and crosslinking agent are then combined in ZONE 2 with a blowing agent and a free radical initiator.

Next, the mixture of the styrenic copolymer component, the unsaturated olefin component, the optional EVA component, and the metal oxide, organic acid, crosslinking agent, blowing agent, and free radical initiator is then subjected to pelletization using a die that is cooled to maintain the temperature at about 90° C. or below. The pelletization can performed under water, thus cooling the resulting pellets as they exit the pelletization die.

Example 3: Forming Foam Articles from Pre-Foam Compositions

Pellets made according to the batch process described in Examples 1 using the pre-foam composition formulations described in Tables 1-4 were injection molded (IM) into a pre-heated mold where the mold temperature was, from about 170° C. to about 180° C. The mold temperature was above the decomposition temperature of the chemical blowing agent, which decomposed producing gas in the softened composition and foaming it. The mold temperature was also above the initiation temperature of the free-radical initiator, producing a polymerization reaction which crosslinked the unsaturated styrenic copolymer component with the unsaturated olefin component of the composition.

As indicated in Table 5, some of the pre-foam compositions were foamed and injection molded in a single-step process (IM) to produce the finished molded foam article without a compression molding step, while other pre-foam compositions were foamed and molded using a process in which the pre-foam composition was first injection molded to form a molded foam pre-foam, then the molded foam pre-form was annealed, and then the annealed molded foam pre-form was compression molded to produce the finished molded foam article (IM+CM).

For the pre-foam compositions which were injection molded and subsequently compression molded to produce the finished molded foam articles (IM+CM), the injection molded foam preform was taken through an annealing process in which the foam preform was heated to a temperature of about 70° C. to about 80° C. for about 10 to about 15 minutes; then cooled to a temperature of about 60° C. to about 70° C. and held at that temperature for about 10 to about 15 minutes; next the preform was cooled to a temperature of about 50° C. to about 60° C. and held at that temperature for about 10 to about 15 minutes; then cooled to a temperature of about 45° C. to about 55° C. and held at that temperature for about 10 to about 15 minutes. The annealed molded foam preform was then washed with water (about 35° C. to about 40° C.) for about 10 to about 15 minutes and subsequently dried for 24 hours.

The annealed molded foam preform was then placed in a compression mold which is at least 10% smaller at least one dimension relative to its initial foamed, molded and annealed state prior to the compression molding. During the compression molding process, the foam preform is heated to a surface temperature of from about 130° C. to about 150° C. Then the foam preform is cooled to a surface temperature of about 30° C. in about 15 minutes or less (e.g., in about 12 minutes or less) to give a finished compression molded foam article.

While this experiment used the pre-foam compositions only to produce injection molded foam articles (IM) and injection molded and compression molded foam articles (IM+CM) using the processes described above, the pre-foam compositions described herein can be foamed and/or molded using other types of processes known in the art. For example, these pre-foam compositions can be used to form slab foam, particulate (e.g., bead) foams, etc. These forms of foam can then be used in various ways. For example, slab foam can be formed, and then can be used as formed as a final component, or can be compression molded to form a final component. Pellets of the pre-foam compositions can be used to form individual particulate foams, or can be foamed and molded to form molded foam articles.

TABLE 4

Compositions and Component Ratios for Foams

| Composition | A | B | C | D | E |
|---|---|---|---|---|---|
| Aromatic/Aliphatic Block Copolymer (Parts by Wt.) | 20.0 | 20.0 | 20.0 | 20.0 | 19.3 |
| Olefinic Copolymer (Parts by Wt.) | 20.0 | 20.0 | 20.0 | 20.0 | 33.9 |
| Linking Polymer (Parts by Wt.) | 0.0 | 0.0 | 0.0 | 0.0 | 27.8 |
| EVA Copolymer (Parts by Wt.) | 0.0 | 0.0 | 0.0 | 0.0 | 0.0 |
| Resin Component (Parts by Wt.) | 40.0 | 40.0 | 40.0 | 40.0 | 81.0 |
| Component Ratios | | | | | |
| I: Olefinic Copolymer (Parts by Wt.) to Aromatic/Aliphatic Block Copolymer (Parts by Wt.) | 1.00 | 1.00 | 1.00 | 1.00 | 1.76 |
| II: Linking Polymer (Parts by Wt.) to Aromatic/Aliphatic Block Copolymer (Parts by Wt.) | 0.00 | 0.00 | 0.00 | 0.00 | 1.44 |
| III: EVA Copolymer (Parts by Wt.) to Aromatic/Aliphatic Block Copolymer (Parts by Wt.) | 0.00 | 0.00 | 0.00 | 0.00 | 0.00 |
| IV: Linking Polymer (Parts by Wt.) to Olefinic Copolymer (Parts by Wt.) | 0.00 | 0.00 | 0.00 | 0.00 | 0.82 |

TABLE 4-continued

Compositions and Component Ratios for Foams

| | | | | | |
|---|---|---|---|---|---|
| V: EVA Copolymer (Parts by Wt.) to Olefinic Copolymer (Parts by Wt.) | 0.00 | 0.00 | 0.00 | 0.00 | 0.00 |
| VI: EVA Copolymer (Part by Wt.) to Linking Polymer (Parts by Wt.) | N/A | N/A | N/A | N/A | 0.00 |
| Sum of Ratios I-V | 1.00 | 1.00 | 1.00 | 1.00 | 3.20 |
| Sum of Ratios I-VI* | N/A | N/A | N/A | N/A | 4.02 |

| Composition | F | G | H | I | J |
|---|---|---|---|---|---|
| Aromatic/Aliphatic Block Copolymer (Parts by Wt.) | 21.9 | 19.3 | 13.2 | 36.6 | 10.6 |
| Olefinic Copolymer (Parts by Wt.) | 17.9 | 33.9 | 19.9 | 29.9 | 35.9 |
| Linking Polymer (Parts by Wt.) | 35.7 | 27.8 | 39.7 | 19.9 | 31.8 |
| EVA Copolymer (Parts by Wt.) | 0.0 | 0.0 | 0.0 | 0.0 | 0.0 |
| Resin Component (Parts by Wt.) | 75.5 | 81.0 | 72.8 | 86.4 | 78.2 |
| Component Ratios | | | | | |
| I: Olefinic Copolymer (Parts by Wt.) to Aromatic/Aliphatic Block Copolymer (Parts by Wt.) | 0.82 | 1.76 | 1.50 | 0.82 | 3.39 |
| II: Linking Polymer (Parts by Wt.) to Aromatic/Aliphatic Block Copolymer (Parts by Wt.) | 1.63 | 1.44 | 3.00 | 0.54 | 3.00 |
| III: EVA Copolymer (Parts by Wt.) to Aromatic/Aliphatic Block Copolymer (Parts by Wt.) | 0.00 | 0.00 | 0.00 | 0.00 | 0.00 |
| IV: Linking Polymer (Parts by Wt.) to Olefinic Copolymer (Parts by Wt.) | 2.00 | 0.82 | 2.00 | 0.66 | 0.89 |
| V: EVA Copolymer (Parts by Wt.) to Olefinic Copolymer (Parts by Wt.) | 0.00 | 0.00 | 0.00 | 0.00 | 0.00 |
| VI: EVA Copolymer (Part by Wt.) to Linking Polymer (Parts by Wt.) | 0.00 | 0.00 | 0.00 | 0.00 | 0.00 |
| Sum of Ratios I-V | 2.45 | 3.20 | 4.50 | 1.36 | 6.39 |
| Sum of Ratios I-VI* | 4.45 | 4.02 | 6.50 | 2.02 | 7.28 |

| Composition | K | L | M | N | O |
|---|---|---|---|---|---|
| Aromatic/Aliphatic Block Copolymer (Parts by Wt.) | 7.9 | 10.6 | 13.2 | 13.2 | 19.3 |
| Olefinic Copolymer (Parts by Wt.) | 51.9 | 35.9 | 19.9 | 19.9 | 13.9 |
| Linking Polymer (Parts by Wt.) | 23.8 | 31.8 | 39.7 | 39.7 | 27.8 |
| EVA Copolymer (Parts by Wt.) | 0.0 | 0.0 | 0.0 | 0.0 | 0.0 |
| Resin Component (Parts by Wt.) | 83.7 | 78.2 | 72.8 | 72.8 | 61.0 |
| Component Ratios | | | | | |
| I: Olefinic Copolymer (Parts by Wt.) to Aromatic/Aliphatic Block Copolymer (Parts by Wt.) | 6.54 | 3.39 | 1.50 | 1.50 | 0.72 |
| II: Linking Polymer (Parts by Wt.) to Aromatic/Aliphatic Block Copolymer (Parts by Wt.) | 3.00 | 3.00 | 3.00 | 3.00 | 1.44 |
| III: EVA Copolymer (Parts by Wt.) to Aromatic/Aliphatic Block Copolymer (Parts by Wt.) | 0.00 | 0.00 | 0.00 | 0.00 | 0.00 |
| IV: Linking Polymer (Parts by Wt.) to Olefinic Copolymer (Parts by Wt.) | 0.46 | 0.89 | 2.00 | 2.00 | 2.00 |
| V: EVA Copolymer (Parts by Wt.) to Olefinic Copolymer (Parts by Wt.) | 0.00 | 0.00 | 0.00 | 0.00 | 0.00 |
| VI: EVA Copolymer (Part by Wt.) to Linking Polymer (Parts by Wt.) | 0.00 | 0.00 | 0.00 | 0.00 | 0.00 |
| Sum of Ratios I-V | 9.54 | 6.39 | 4.50 | 4.50 | 2.16 |
| Sum of Ratios I-VI* | 10.00 | 7.28 | 6.50 | 6.50 | 4.16 |

| Composition | P | Q | R | S | T |
|---|---|---|---|---|---|
| Aromatic/Aliphatic Block Copolymer (Parts by Wt.) | 19.3 | 13.2 | 7.9 | 19.3 | 13.2 |
| Olefinic Copolymer (Parts by Wt.) | 33.9 | 19.9 | 51.9 | 33.9 | 19.9 |
| Linking Polymer (Parts by Wt.) | 27.8 | 39.7 | 23.8 | 27.8 | 39.7 |
| EVA Copolymer (Parts by Wt.) | 0.0 | 0.0 | 0.0 | 0.0 | 0.0 |
| Resin Component (Parts by Wt.) | 81.0 | 72.8 | 83.7 | 81.0 | 72.8 |
| Component Ratios | | | | | |
| I: Olefinic Copolymer (Parts by Wt.) to Aromatic/Aliphatic Block Copolymer (Parts by Wt.) | 1.76 | 1.50 | 6.54 | 1.76 | 1.50 |
| II: Linking Polymer (Parts by Wt.) to Aromatic/Aliphatic Block Copolymer (Parts by Wt.) | 1.44 | 3.00 | 3.00 | 1.44 | 3.00 |
| III: EVA Copolymer (Parts by Wt.) to Aromatic/Aliphatic Block Copolymer (Parts by Wt.) | 0.00 | 0.00 | 0.00 | 0.00 | 0.00 |
| IV: Linking Polymer (Parts by Wt.) to Olefinic Copolymer (Parts by Wt.) | 0.82 | 2.00 | 0.46 | 0.82 | 2.00 |
| V: EVA Copolymer (Parts by Wt.) to Olefinic Copolymer (Parts by Wt.) | 0.00 | 0.00 | 0.00 | 0.00 | 0.00 |
| VI: EVA Copolymer (Part by Wt.) to Linking Polymer (Parts by Wt.) | 0.00 | 0.00 | 0.00 | 0.00 | 0.00 |
| Sum of Ratios I-V | 3.20 | 4.50 | 9.54 | 3.20 | 4.50 |
| Sum of Ratios I-VI* | 4.02 | 6.50 | 10.00 | 4.02 | 6.50 |

| Composition | U | V' | W' |
|---|---|---|---|
| Aromatic/Aliphatic Block Copolymer (Parts by Wt.) | 8.0 | 8.0 | 8.0 |
| Olefinic Copolymer (Parts by Wt.) | 12.0 | 12.0 | 12.0 |
| Linking Polymer (Parts by Wt.) | 23.9 | 23.9 | 23.9 |
| EVA Copolymer (Parts by Wt.) | 35.9 | 35.9 | 35.9 |
| Resin Component (Parts by Wt.) | 79.8 | 79.8 | 79.8 |
| Component Ratios | | | |
| I: Olefinic Copolymer (Parts by Wt.) to Aromatic/Aliphatic Block Copolymer (Parts by Wt.) | 1.50 | 1.50 | 1.50 |
| II: Linking Polymer (Parts by Wt.) to Aromatic/Aliphatic Block Copolymer (Parts by Wt.) | 3.00 | 3.00 | 3.00 |

TABLE 4-continued

Compositions and Component Ratios for Foams

| | | | |
|---|---|---|---|
| III: EVA Copolymer (Parts by Wt.) to Aromatic/Aliphatic Block Copolymer (Parts by Wt.) | 4.50 | 4.50 | 4.50 |
| IV: Linking Polymer (Parts by Wt.) to Olefinic Copolymer (Parts by Wt.) | 2.00 | 2.00 | 2.00 |
| V: EVA Copolymer (Parts by Wt.) to Olefinic Copolymer (Parts by Wt.) | 3.00 | 3.00 | 3.00 |
| VI: EVA Copolymer (Part by Wt.) to Linking Polymer (Parts by Wt.) | 1.50 | 1.50 | 1.50 |
| Sum of Ratios I-V | 4.50 | 4.50 | 4.50 |
| Sum of Ratios I-VI* | 15.50 | 15.50 | 15.50 |

NT: not tested
N/A: not applicable

Example 4: Testing of Foam Articles

Examples of foam articles formed from the formulations described in Tables 3 and 4 were made and tested to determine their physical properties (e.g., specific gravity, hardness, split tear, compression set, and energy return). The results for foam articles for the various formulations are reported in Table 5.

The purpose of this experiment was to identify pre-foam compositions with improved split-tear values as compared to conventional ethylene vinyl acetate (EVA) foam, but which otherwise maintained the physical properties of conventional EVA foam which are beneficial for us as components of articles of footwear. The experimental pre-foam compositions were based on using a styrenic copolymer component, an unsaturated olefin component, and optionally an EVA component. Some of the formulations were used to produce foams which were first injection molded and then annealed and compression molded to produce a final foam component (IM+CM), while other formulations were used to produce foams which were injection molded to produce a final foam component (IM). The target range for the split-tear values was from about 2.5 kg/cm to about 3.0 kg/cm or greater. As a comparison, the split tear value for conventional EVA foam is about 1.7. The target ranges for the other physical properties of the final foam component were: a specific gravity of about 0.1 to about 0.2; an Asker C hardness of about 40 to about 50; a compression set of about 20% to about 35%; and a resilience of at least about 60%. These target ranges were based primarily on the physical properties of conventional EVA foam used as components for article of footwear, which has a specific gravity of from 0.080 to 0.095, an Asker C hardness of 34-38, a compression set of 75%, and an resiliency of about 59.

The test method used to obtain the specific gravity values reported in Table 5 is as follows.

The specific gravity of the foam was be determined by testing 3 representative samples taken from a foam preform or compression molded foam component. Using a balance with appropriate accuracy for the weight of the sample, the weight of each sample was determined both in air and when the sample was completely submerged in distilled water at a temperature of 22° C.±2° C., after removing any air bubbles adhered to the surface of the foam sample before weighing. The specific gravity (S.G.) was then calculated by taking the weight of the sample in water and subtracting that from the weight of the sample in air, and this value was then divided into the weight of the sample in air, where all the weights are weights in grams.

Split Tear Test

The test method used to obtain the split tear values for foam articles as shown in Table 5 is as follows.

Four die-cut, rectangular-shaped samples of slab sheet or molded foam were prepared, each measuring 2.54 cm×15.24 cm×10±1 mm (thickness). If the foam material to be tested had a skin, the material had its skin removed before preparing the four samples. A 3 cm long cut was made in the center from one end of the sample. Then five successive 2 cm portions were marked on the sample.

The crosshead speed of the tensile test apparatus was set at 50 mm/min. Each separated end of the sample was clamped in an upper grip and a lower grip of the test apparatus. The separation was placed in the middle between both grips. Each section of the sample was held in a clamp in such a manner that the original adjacent cut edges formed a straight line joining the centers of the clamps.

As needed, the cut was aided with a sharp knife to keep separating the foam material in the center of the sample. Readings caused by cutting with the knife were discarded. The lowest values for each of the five portions of each sample were recorded in kg/cm. Five values were recorded for each sample and an average of the five values was then obtained and reported. If a portion of a sample included a portion having an air bubble more than 2 mm in diameter, the value for the portion including the air bubble was not included in the average. If more than one portion of a sample was found to include air bubbles having a diameter greater than 2 mm, another sample was then tested.

Durometer Hardness Test

The test used to obtain the hardness values for the foam articles reported in Table 5 is as follows.

For flat foams, the sample was a minimum of 6 mm thick for Asker C durometer testing. If necessary, foam samples were stacked to make up the minimum thickness. Foam samples were large enough to allow all measurements to be performed at a minimum of 12 mm from the edge of the sample and at least 12 mm from any other measurement. Regions tested were flat and parallel with an area at least 6 mm in diameter. For the samples tested in Table 5, standard samples having dimensions of approximately 35 cm×13 cm×1.8 cm, were used, and a minimum of five hardness measurements were taken and tested using a 1 kg head weight.

Compression Set

The test used to obtain the compression set values for foam articles reported in Table 5 is as follows.

A foam sample was compressed between two metal plates to 50% of its original thickness and placed in an oven at 50° C. for 6 hours. The sample was then cooled and the difference between its precompression and post-compression thickness was used as the measure of static compression set.

For the tests reported in Table 5, molded plaques having skin on one side and a thickness of 10 mm were used to obtain the samples. The plaque was then skived to a thickness of 10+/−0.5 mm to remove the skin before cutting the samples. Compression molded foam materials having skin on two sides had the skin skived from one side, so that skin remained on only one side. Five 2.54 cm diameter circles were then machine drilled from the plaque to obtain the samples to be tested.

The compression set testing device consists of two flat steel plates set between the parallel faces of the compression device with compression rings and spacer bars for each set of parallel faces. Four compression rings of the same thickness (4.5 mm or 5.0 mm based on the specimen thickness) were used for each parallel face of the compression device. The percent compression set was calculated using the following equation:

% Set=((Original gauge−final gauge)/(50% Original gauge))×100

The center area of each specimen was marked and used to measure the specimens with the use of an AMES gage with no load on top.

Energy Return Test

The test used to obtain the energy return values for foam articles reported in Table 5 is as follows.

Energy return of the foam articles was determined using ASTM D 2632 92, which uses a vertical rebound apparatus.

TABLE 5

Processing Methods and Properties of Foam Articles

| Composition | A | B | C | D | E |
|---|---|---|---|---|---|
| Processing Method | 2 | 2 | 2 | 2 | 2 |
| Physical Properties |  |  |  |  |  |
| IM Foam |  |  |  |  |  |
| Specific Gravity | 0.1185 | 0.1166 | 0.1171 | 0.1153 | 0.11 |
| Hardness (Asker C) | 32-33 | 33-34 | 32-33 | 28-30 | 41-42 |
| Split Tear (kg/cm) | 1.79-1.75 | 1.61-1.78 | 1.58-1.62 | 1.52-1.56 | 1.3 |
| Compression Set (%) | 72-73 | 70-71 | 72-74 | 70-71 | 51-53 |
| Energy Return (slab) (%) |  |  |  |  | NA |
| IM + CM Foam |  |  |  |  |  |
| Specific Gravity | 0.2048 | 0.2089 | 0.2021 | 0.2042 | 0.16-0.17 |
| Hardness (Asker C) | 49-50 | 50-51 | 49-50 | 56-58 | 53-54 |
| Split Tear (kg/cm) | 2.7-2.8 | 2.6-2.8 | 2.8-2.9 | 2.4-2.5 | 2 |
| Compression Set (%) | 43-45 | 39-40 | 49-50 | 38-39 | 21 |
| Energy Return (slab) (%) | 50-51 | 49-50 | 53-54 | 47-48 | 68 |

| Composition | F | G | H | I | J |
|---|---|---|---|---|---|
| Processing Method | 2 | 2 | 1 | 2 | 2 |
| Physical Properties |  |  |  |  |  |
| IM Foam |  |  |  |  |  |
| Specific Gravity | 0.09 | 0.1 | 0.15 | 0.11 | 0.159 |
| Hardness (Asker C) | 32-34 | 34-35 | 52-53 | 43-45 | 50-51 |
| Split Tear (kg/cm) | 1.9 | 2 | 2.5-2.6 | 1.6 | 2.98-3.06 |
| Compression Set (%) | 71-72 | 74-76 | 35-55 | 69 | 49-51 |
| Energy Return (slab) (%) | 60 | 83-89 | 71 | 64 | 64-65 |
| IM + CM Foam |  |  |  |  |  |
| Specific Gravity | 0.13-0.14 | NT | NA | 0.18 | NT |
| Hardness (Asker C) | 43-48 | NT | NA | 55-59 | NT |
| Split Tear (kg/cm) | 2.3 | NT | NA | 2.5-2.6 | NT |
| Compression Set (%) | 39-41 | NT | NA | 21-22 | NT |
| Energy Return (slab) (%) | 68 | NT | NA | 69 | NT |

| Composition | K | L | M | N | O |
|---|---|---|---|---|---|
| Processing Method | 2 | 1 | 2 | 1 | 2 |
| Physical Properties |  |  |  |  |  |
| IM Foam |  |  |  |  |  |
| Specific Gravity | 0.15 | 0.17 | 0.167 | 0.17 | 0.13 |
| Hardness (Asker C) | 46-48 | 54-55 | 52-54 | 54-55 | 42-44 |
| Split Tear (kg/cm) | 2.73-3.01 | 2.6-2.7 | 3.0-3.1 | 2.7-2.8 | 2 |
| Compression Set (%) | 59-61 | 26-32 | 43-46 | 28-33 | 71 |
| Energy Return (slab) (%) | 67-72 | 69-70 | 61-63 | 69-72 | 65 |
| IM + CM Foam |  |  |  |  |  |
| Specific Gravity | NT | NA | NT | NA | 0.17-0.18 |
| Hardness (Asker C) | NT | NA | NT | NA | 54-57 |
| Split Tear (kg/cm) | NT | NA | NT | NA | 3.0-3.1 |
| Compression Set (%) | NT | NA | NT | NA | 28 |
| Energy Return (slab) (%) | NT | NA | NT | NA | 69 |

| Composition | P | Q | R | S | T |
|---|---|---|---|---|---|
| Processing Method | 2 | 1 | 1 | 1 | 1 |
| Physical Properties |  |  |  |  |  |
| IM Foam |  |  |  |  |  |
| Specific Gravity | 0.11 | 0.17 | 0.16 | 0.15 | 0.11 |
| Hardness (Asker C) | 42-43 | 54-55 | 51-52 | 49-51 | 33-36 |

TABLE 5-continued

Processing Methods and Properties of Foam Articles

|  |  |  |  |  |  |
|---|---|---|---|---|---|
| Split Tear (kg/cm) | 2 | 3.4 | 2.6 | 2.8-3.0 | 1.4-1.7 |
| Compression Set (%) | 66-72 | 38-39 | 37-43 | 40-50 | 63-70 |
| Energy Return (slab) (%) | NA | 68 | 71-73 | 74-76 | 84-87 |
| IM + CM Foam |  |  |  |  |  |
| Specific Gravity | 0.17 | NA | NA | NA | NA |
| Hardness (Asker C) | 52-55 | NA | NA | NA | NA |
| Split Tear (kg/cm) | 3.1 | NA | NA | NA | NA |
| Compression Set (%) | 31-37 | NA | NA | NA | NA |
| Energy Return (slab) (%) | 67-70 | NA | NA | NA | NA |

| Composition | U | V' | W' |
|---|---|---|---|
| Processing Method | 1 | 1 | 1 |
| Physical Properties |  |  |  |
| IM Foam |  |  |  |
| Specific Gravity | 0.18 | 0.19 | 0.19 |
| Hardness (Asker C) | 42-45 | 42-44 | 43-45 |
| Split Tear (kg/cm) | 2.5-2.6 | 2.6-2.7 | 2.6 |
| Compression Set (%) | 29-33 | 32-34 | 31-32 |
| Energy Return (slab) (%) | 78-80 | 80 | 79-82 |
| IM + CM Foam |  |  |  |
| Specific Gravity | NA | NA | NA |
| Hardness (Asker C) | NA | NA | NA |
| Split Tear (kg/cm) | NA | NA | NA |
| Compression Set (%) | NA | NA | NA |
| Energy Return (slab) (%) | NA | NA | NA |

NT: not tested
NA: not applicable
1: Pre-foam composition was injection molded to form final foam article
2: Pre-foam composition was injection molded to form foam preform, and then the foam preform was compression molded to form final foam article Results Four of the 13 final molded foam articles produced using injection molding and compression molding (IM+CM) had split tear values of greater than 2.5, and 8 of the 11 final molded foam articles produced using just the injection molding process (IM) had split tear values of greater than 2.5. Unexpectedly, 12 of the formulations which produced molded foam articles with the target split tear values also had resiliency values significantly higher than expected. Specifically, formulations H, I, L, N, O, P, Q, R, S, U, V and X had resiliency values ranging from 67% to 82%. However, only 2 pre-foam compositions were found which produced final foam components having all their physical properties in the target ranges (formulations U and X). The resiliency values for these two formulations were found to be over 14 percentage points greater than for conventional EVA foam.

In general, the pre-foam compositions which produced final foam components with unexpectedly high resiliency values included from about 10 parts per hundred of resin (phr) to about 22 phr of the styrenic copolymer component, and from about 45 phr to about 80 phr of the unsaturated olefin component. Some of these pre-form compositions also comprised from about 31 phr to about 36 phr of the EVA component, while others were free of the EVA component. Generally, the pre-foam compositions which produced final foam components with target split tear values and unexpectedly high resiliency values had ratios of the phr of the styrenic copolymer component to the phr of the unsaturated olefin component which ranged from about 0.17 to about 0.30. For the pre-foam compositions including an EVA component, the ratios of the phr of the styrenic copolymer component to the phr of the EVA component ranged from about 0.37 to about 0.70. The ratios of the phr of the unsaturated olefin component to the phr of the EVA component ranged from about 2.2 to about 2.3. For the pre-foam compositions including an EVA component, the sum of all three ratios ranged from about 2.7 to about 3.3.

It should be emphasized that the above-described aspects of the present disclosure are merely possible examples of implementations, and are set forth only for a clear understanding of the principles of the disclosure. Many variations and modifications may be made to the above-described aspects of the disclosure without departing substantially from the spirit and principles of the disclosure. All such modifications and variations are intended to be included herein within the scope of this disclosure.

The present disclosure will be better understood upon review of the following clauses, which should not be confused with the claims.

1. A composition comprising:
  a block copolymer comprising
    a first block and a third block, each independently comprising a linear or branched chain aliphatic polymer having a plurality of aromatic groups attached pendantly thereto,
    a second block located between the first block and the third block and comprising an aliphatic polymer having a plurality of aliphatic side chains attached thereto, and
    a plurality of first ethylenically unsaturated group present on one or more of the first block, second block, and third block;
  wherein the block copolymer comprises about 60% to about 90% of the second blocks by weight based upon the weight of the block copolymer;
  an olefinic copolymer comprising a plurality of first olefinic segments and a plurality of second olefinic segments having a different chemical structure from the first olefinic segments;

one or more linking polymers, each linking polymer comprising one or more third olefinic segments; and an ethylene-vinyl acetate (EVA) copolymer.

wherein a sum of a ratio I, II, III, IV, and V is from about 1.00 to about 10.00;

wherein the ratio I is a ratio of a total parts by weight of the olefinic copolymers present in the composition to a total parts by weight of the block copolymer present in the composition;

wherein the ratio II is a ratio of a total parts by weight of the linking polymers present in the composition to a total parts by weight of the block copolymer present in the composition;

wherein the ratio III is ratio of a total parts by weight of the EVA copolymers present in the composition to a total parts by weight of the block copolymer present in the composition;

wherein the ratio IV is a ratio of the total parts by weight of the linking polymers present in the composition to a total parts by weight of the block copolymers present in the composition, and wherein the ratio V is a ratio of the total parts by weight of the one or more EVA copolymers present in the composition to a total parts by weight of the one or more olefinic copolymers present in the composition.

2. The composition according to clause 1, wherein the sum of ratio I, II, III, IV, and V is from about 3.50 to about 5.00.

3. A composition comprising:

a block copolymer comprising
- a first block and a third block, each independently comprising a linear or branched chain aliphatic polymer having a plurality of aromatic groups attached pendantly thereto,
- a second block located between the first block and the third block and comprising an aliphatic polymer having a plurality of aliphatic side chains attached thereto, and
- a plurality of first ethylenically unsaturated group present on one or more of the first block, second block, and third block;

wherein the block copolymer comprises about 60% to about 90% of the second blocks by weight based upon the weight of the block copolymer;

an olefinic copolymer comprising a plurality of first olefinic segments and a plurality of second olefinic segments having a different chemical structure from the first olefinic segments;

and one or more linking polymers, each linking polymer comprising one or more third olefinic segments.

4. A composition comprising:

an A-B-A block copolymer, wherein each of the A blocks comprise styrenic repeat units, the B block is a random copolymer of ethylene and an alpha-olefin having about 3 to 8 carbon atoms, and wherein the A-B-A-block copolymer comprises about 10% to about 40% of the A blocks by weight based upon the weight of the A-B-A block copolymer;

an olefinic block copolymer, wherein the olefinic block copolymer is a copolymer of ethylene and an alpha-olefin having about 6 to 12 carbon atoms, and wherein the olefinic block copolymer has one or more blocks rich in the ethylene and one or more blocks rich in the alpha-olefin;

an alpha-olefin linking polymer, wherein the alpha-olefin linking polymer is a copolymer of ethylene and an alpha-olefin having about 3 to 8 carbon atoms, and wherein the alpha-olefin linking polymer has an alpha-olefin monomer content of about 15% to about 40% by weight based upon the weight of the alpha-olefin linking polymer; and an ethylene-vinyl acetate copolymer having a vinyl acetate content of about 10% to about 40% by weight based upon the weight of the ethylene-vinyl acetate copolymer.

5. The composition according to any one of clauses 1-4, wherein each of the A blocks consists essentially of polystyrene.

6. The composition according to any one of clauses 1-5, wherein the B block consists essentially of a copolymer of ethylene and octene.

7. The composition according to any one of clauses 1-5, wherein the B block consists essentially of a copolymer of ethylene and butadiene.

8. The composition according to any one of clauses 1-7, wherein the composition comprises a first alpha-olefin linking polymer and a second alpha-olefin linking polymer,
wherein the first alpha-olefin linking polymer and the second alpha-olefin linking polymer are copolymers of ethylene and 1-butene, each having a different ratio of ethylene to 1-butene monomer content in the copolymer.

9. The composition according to any one of clauses 1-8, wherein the composition comprises about 5 parts by weight to about 15 parts by weight of the A-B-A block copolymer, about 10 parts by weight to about 20 parts by weight of the olefinic block copolymer, about 25 parts by weight to about 35 parts by weight of the alpha-olefin linking polymers, and about 30 parts by weight to about 60 parts by weight of the ethylene-vinyl acetate copolymer based upon the weight of the pre-foam composition.

10. A composition comprising:

a partially hydrogenated thermoplastic elastomeric block copolymer, the partially hydrogenated thermoplastic elastomeric block copolymer comprising:
- one or more A blocks comprising aromatic repeat units,
- one or more B blocks comprising aliphatic repeat units, and
- one or more first ethylenically unsaturated groups present on one or both of the aromatic repeat units and the aliphatic repeat units;

an olefinic block copolymer, wherein the olefinic block copolymer is a copolymer of a first alpha-olefin and a second alpha-olefin different from the first alpha-olefin, and wherein the olefinic block copolymer comprising one or more second ethylenically unsaturated groups;

an alpha-olefin linking polymer, wherein the alpha-olefin linking polymer comprises one or more aliphatic sidechains; and an ethylene-vinyl acetate copolymer;

wherein a sum of a ratio I, II, III, IV, and V is from about 1.00 to about 10.00;

wherein the ratio I is a ratio of a total parts by weight of the olefinic copolymers present in the composition to a total parts by weight of the partially hydrogenated thermoplastic elastomeric block copolymer present in the composition;

wherein the ratio II is a ratio of a total parts by weight of the alpha-olefin linking polymers present in the composition to a total parts by weight of the partially hydrogenated thermoplastic elastomeric block copolymer present in the composition;

wherein the ratio III is ratio of a total parts by weight of the ethylene-vinyl acetate copolymers present in the composition to a total parts by weight of the partially hydrogenated thermoplastic elastomeric block copolymer present in the composition;

wherein the ratio IV is a ratio of the total parts by weight of the alpha-olefin linking polymers present in the composition to a total parts by weight of the partially hydrogenated thermoplastic elastomeric block copolymer present in the composition, and wherein the ratio V is a ratio of the total parts by weight of the one or more ethylene-vinyl acetate copolymers present in the composition to a total parts by weight of the one or more olefinic copolymers present in the composition.

11. The composition according to clause 10, wherein the sum of ratio I, II, III, IV, and V is from about 3.50 to about 5.00.

12. A composition comprising:
a partially hydrogenated thermoplastic elastomeric block copolymer, the partially hydrogenated thermoplastic elastomeric block copolymer comprising:
one or more A blocks comprising aromatic repeat units,
one or more B blocks comprising aliphatic repeat units, and
one or more first ethylenically unsaturated groups present on one or both of the aromatic repeat units and the aliphatic repeat units;
an olefinic block copolymer, wherein the olefinic block copolymer is a copolymer of a first alpha-olefin and a second alpha-olefin different from the first alpha-olefin, and wherein the olefinic block copolymer comprising one or more second ethylenically unsaturated groups;
an alpha-olefin linking polymer, wherein the alpha-olefin linking polymer comprises one or more aliphatic sidechains; and
an ethylene-vinyl acetate copolymer.

13. A composition comprising:
one or more partially hydrogenated thermoplastic elastomeric block copolymers, each of the one or more partially hydrogenated thermoplastic elastomeric block copolymers independently comprising one or more aromatic blocks, one or more aliphatic blocks, and one or more first ethylenically unsaturated units;
one or more olefinic block copolymers, each of the one or more olefinic block copolymers comprising second ethylenically unsaturated units;
one or more alpha-olefin linking polymers; and
one or more ethylene-vinyl acetate copolymers;
wherein a sum of a ratio I, II, III, IV, and V is from about 1.00 to about 10.00;
wherein the ratio I is a ratio of a total parts by weight of the olefinic block copolymers present in the composition to a total parts by weight of the partially hydrogenated thermoplastic elastomeric block copolymer present in the composition;
wherein the ratio II is a ratio of a total parts by weight of the alpha-olefin linking polymers present in the composition to a total parts by weight of the partially hydrogenated thermoplastic elastomeric block copolymer present in the composition;
wherein the ratio III is ratio of a total parts by weight of the ethylene-vinyl acetate copolymers present in the composition to a total parts by weight of the partially hydrogenated thermoplastic elastomeric block copolymer present in the composition;
wherein the ratio IV is a ratio of the total parts by weight of the alpha-olefin linking polymers present in the composition to a total parts by weight of the partially hydrogenated thermoplastic elastomeric block copolymer present in the composition, and wherein the ratio V is a ratio of the total parts by weight of the one or more ethylene-vinyl acetate copolymers present in the composition to a total parts by weight of the one or more olefinic copolymers present in the composition.

14. The composition according to clause 13, wherein the sum of ratio I, II, III, IV, and V is from about 3.50 to about 5.00.

15. A composition comprising:
one or more partially hydrogenated thermoplastic elastomeric block copolymers, each of the one or more partially hydrogenated thermoplastic elastomeric block copolymers independently comprising one or more aromatic blocks, one or more aliphatic blocks, and one or more first ethylenically unsaturated units;
one or more olefinic block copolymers, each of the one or more olefinic block copolymers comprising second ethylenically unsaturated units;
one or more alpha-olefin linking copolymers; and
one or more ethylene-vinyl acetate copolymers.

16. The composition according to any one of clauses 13-15, wherein the partially hydrogenated thermoplastic elastomeric block copolymer comprises an A-B block structure or an A-B-A block structure,
wherein each of the A blocks comprise one or more aromatic repeat units, and
wherein the B block is an aliphatic polymer block comprising the one or more first ethylenically unsaturated units.

17. The composition according to any one of clauses 10-16, wherein the partially hydrogenated thermoplastic elastomeric block copolymer comprises about 10% to about 40% of the A block by weight based upon the weight of the partially hydrogenated thermoplastic elastomeric block copolymer.

18. The composition according to any one of clauses 10-17, wherein the aromatic repeat units comprises styrenic repeat units.

19. The composition according to any one of clauses 10-17, wherein the aromatic repeat units comprise an aliphatic backbone having a plurality of aromatic side chains.

20. The composition according to any one of clauses 10-19, wherein the aliphatic repeat units comprise one or more substituted or unsubstituted alkyl side chains having about 2 to 18 carbon atoms.

21. The composition according to any one of clauses 10-20, wherein the olefinic block copolymer is a copolymer of ethylene and the second alpha-olefin.

22. The composition according to any one of clauses 10-21, wherein the second alpha-olefin has 6 to 12 carbon atoms.

23. The composition according to any one of clauses 10-22, wherein the olefinic block copolymer has one or more blocks rich in the first alpha-olefin and one or more blocks rich in the second alpha-olefin 24. The composition according to any one of clauses 1-23, wherein the composition comprises about 5 parts by weight to about 20 parts by weight of the A-B-A block copolymer or partially hydrogenated thermoplastic elastomeric block copolymer based upon the total weight of the composition.

25. The composition according to any one of clauses 1-24, wherein the composition comprises about 5 parts by weight to about 10 parts by weight of the A-B-A block copolymer or partially hydrogenated thermoplastic elastomeric block copolymer based upon the total weight of the composition.

26. The composition according to any one of clauses 1-25, wherein the composition comprises about 5 parts by weight to about 20 parts by weight of the olefinic block copolymer by weight based upon the total weight of the composition.

27. The composition according to any one of clauses 1-26, wherein the composition comprises about 10 parts by weight to about 15 parts by weight of the olefinic block copolymer by weight based upon the total weight of the composition.

28. The composition according to any one of clauses 1-27, wherein the composition comprises about 15 parts by weight to about 35 parts by weight of the alpha-olefin linking polymer based upon the total weight of the composition.

29. The composition according to any one of clauses 1-28, wherein the composition comprises about 20 parts by weight to about 30 parts by weight of the alpha-olefin linking polymer based upon the total weight of the composition.

30. The composition according to any one of clauses 1-29, wherein the composition comprises about 20 parts by weight to about 45 parts by weight of the ethylene-vinyl acetate copolymer based upon the total weight of the composition.

31. The composition according to any one of clauses 1-30, wherein the composition comprises about 30 parts by weight to about 40 parts by weight of the ethylene-vinyl acetate copolymer based upon the total weight of the composition.

32. The composition according to any one of clauses 1-31, further comprising one or both of a free-radical initiator and a chemical blowing agent.

33. The composition according to clause 32, further comprising the free-radical initiator, and
wherein the free-radical initiator is selected from the group consisting of dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and a combination thereof.

34. The composition according to clause 32, further comprising the free-radical initiator, and
wherein the free-radical initiator is selected from the group consisting of a peroxide, a diazo compound, and a combination thereof.

The composition according to clause 32, further comprising the chemical blpowing agent,
wherein the chemical blowing agent is selected from the group consisting of a carbonate, bicarbonate, carboxylic acid, azo compound, isocyanate, persulfate, peroxide, and a combination thereof.

36. The composition according to any one of clauses 1-35, wherein a ratio I of a total parts by weight of the olefinic copolymers present in the composition to a total parts by weight of the A-B-A block copolymer or partially hydrogenated thermoplastic elastomeric block copolymers present in the composition is from about 0.65 to about 7.00.

37. The composition according to any one of clauses 1-36, wherein a ratio II of a total parts by weight of the linking polymers present in the composition to a total parts by weight of the A-B-A block copolymer or partially hydrogenated thermoplastic elastomeric block copolymers present in the composition is from about 0.40 to about 3.50.

38. The composition according to any one of clauses 1-37, wherein a ratio III of a total parts by weight of the EVA copolymers present in the composition to a total parts by weight of the A-B-A block copolymer or partially hydrogenated thermoplastic elastomeric block copolymers present in the composition is from about 1.00 to about 5.00.

39. The composition according to any one of clauses 1-38, wherein a ratio IV of a total parts by weight of the linking polymers present in the composition to a total parts by weight of the A-B-A block copolymers or partially hydrogenated thermoplastic elastomeric block copolymers present in the composition is from about 3.50 to about 5.00.

40. The composition according to any one of clauses 1-39, wherein a ratio V of a total parts by weight of the one or more EVA copolymers present in the composition to a total parts by weight of the one or more olefinic copolymers present in the composition is from about 2.00 to about 5.00.

41. The composition according to any one of clauses 1-40, wherein a ratio VI of a total parts by weight of the one or more EVA copolymers present in the composition to a total parts by weight of the one or more linking polymers present in the composition is from about 1.00 to about 2.00.

42. The composition according to any one of clauses 1-41, wherein the ratio I is from about 0.8 to about 2.00.

43. The composition according to any one of clauses 1-42, wherein the ratio II is from about 1.00 to about 3.25.

44. The composition according to any one of clauses 1-43, wherein the ratio III is from about 3.50 to about 5.00.

The composition according to any one of clauses 1-44, wherein a sum of ratio I, II, III, IV, and V is from about 1.00 to about 10.00.

46. The composition according to any one of clauses 1-45, wherein a sum of ratio I, II, III, IV, and V is from about 3.50 to about 5.00.

47. The composition according to any one of clauses 1-46, wherein a sum of ratio I, II, III, IV, V and VI is from about 1.50 to about 16.00.

48. The composition according to any one of clauses 1-47, wherein a sum of ratio I, II, III, IV, V and VI is from about 14.00 to about 16.00.

49. The composition according to any one of clauses 1-48, wherein the A-B-A block copolymer or the partially hydrogenated thermoplastic elastomeric block copolymers has an elongation at break of greater than or equal to 650% as determined using ASTM D638.

50. A partially crosslinked pre-foam composition, comprising a pre-foam composition according to any one of clauses 1-47 that has been reacted to a degree of crosslinking from about 50% to about 99%.

51. A composition comprising a crosslinked reaction product of a composition according to any one of clauses 1-49.

52. A composition made by a process comprising crosslinking and foaming a composition according to any one of clauses 1-49.

53. The composition according to clause 52, wherein the crosslinking and foaming steps occur at about the same time.

54. The composition according to clause 52 or clause 53, comprising injection molding the pre-foam composition into an injection mold and crosslinking the pre-foam composition in the injection mold.

55. The composition according to clause 54, wherein the injection mold is at a temperature from about 150° C. to about 190° C. during the crosslinking.

56. The composition according to any one of clauses 52-55, wherein the composition is compression molded to produce the foam composition.

57. The composition according to any one of clauses 50-54, wherein the process further comprises annealing the foam article and then compression molding the foam article, reducing it in size by at least 10% in at least one dimension relative to its initial foamed and molded state prior to the compression molding.

58. The composition according to any one of clauses 51-57, wherein the composition comprises a degree of crosslinking from about 50% to about 99%.

59. The composition according to any one of clauses 51-58, wherein the composition has a specific density of about 0.08 to about 0.15.

60. The composition according to any one of clauses 51-59, wherein the composition has an energy return from about 60% to about 85%.

61. The composition according to any one of clauses 51-60, wherein the composition has a split tear of about 1.6 kg/cm to about 4.0 kg/cm.

62. The composition according to any one of clauses 51-61, wherein the composition has a split tear of about 2.5 kg/cm to about 3.5 kg/cm.

63. The composition according to any one of clauses 51-62, wherein the composition has an Asker C hardness of about 40 to 60 C.

64. A method of making a component for an article of footwear, the method comprising foaming and crosslinking a composition according to any one of clauses 1-49.

65. The method according to clause 64, wherein the crosslinking and foaming steps occur at about the same time.

66. The method according to clause 64, comprising injection molding the composition into an injection mold to form a foamed composition and crosslinking the foamed composition in the injection mold.

67. The method according to clause 66, wherein the injection mold is at a temperature from about 150° C. to about 190° C. during the crosslinking.

68. The method according to clause 66, wherein the foamed composition is compression molded to produce the component.

69. The method according to clause 68, further comprising annealing the foamed composition and then compression molding the foamed composition, reducing it in size by at least 10% in at least one dimension relative to its initial foamed and molded state prior to compression molding.

70. A component for an article of footwear, the component comprising a foam composition according to any one of clauses 51-63.

71. A component for an article of footwear, the component made by a by a process comprising injection molding and crosslinking a composition according to any one of clauses 1-50

72. The component according to clause 71, wherein the process further comprises compression molding the crosslinked composition to produce the component.

73. The component according to any one of clauses 70-72, wherein the component is a midsole.

74. The component according to any one of clauses 70-73, wherein the component comprises a degree of crosslinking from about 50% to about 99%.

75. The component according to any one of clauses 70-74, wherein the component has a specific density of about 0.08 to about 0.15.

76. The component according to any one of clauses 70-75, wherein the component has an energy return from about 60% to about 85%.

77. The component according to any one of clauses 70-76, wherein the component has a split tear of about 1.6 kg/cm to about 4.0 kg/cm.

78. The component according to any one of clauses 70-77, wherein the component has a split tear of about 2.5 kg/cm to about 3.5 kg/cm.

79. The component according to any one of clauses 70-78, wherein the component has an Asker C hardness of about 40 to 60 C.

80. The component according to any one of clauses 70-79, wherein the article of footwear is a shoe.

81. The component according to clause 80, wherein the shoe is selected from the group consisting of an athletic shoe, a tennis shoe, a cross-trainer shoe, a children's shoe, a dress shoe, and a casual shoe.

82. An article of footwear comprising a component according to any one of clauses 70-81.

83. The article of footwear according to clause 82, wherein the article of footwear is a shoe,
wherein the component is a midsole, and
wherein the shoe further comprises a shoe upper and a shoe outsole.

84. A method of making an article of footwear, the method comprising affixing a component according to any one of clauses 70-81 to the article of footwear.

85. The method according to clause 84, wherein the article of footwear is a shoe.

86. The method according to clause 85, wherein the shoe is selected from the group consisting of an athletic shoe, a tennis shoe, a cross-trainer shoe, a children's shoe, a dress shoe, and a casual shoe.

87. The method according to clause 85 or clause 86, wherein the component is a midsole and the method comprises affixing the midsole to one or both of a shoe upper and a shoe outsole.

I claim:

1. An article of footwear comprising a component, wherein the component is made by a process comprising crosslinking and foaming a first composition, wherein the first composition comprises:
    a partially hydrogenated thermoplastic elastomeric block copolymer, the partially hydrogenated thermoplastic elastomeric block copolymer comprising:
        one or more A blocks comprising aromatic repeat units;
        one or more B blocks comprising aliphatic repeat units;
        one or more first ethylenically unsaturated groups present on one or both of the aromatic repeat units and the aliphatic repeat units; and
        the partially hydrogenated thermoplastic elastomeric block copolymer has an elongation at break of greater than 650 percent when measured using ASTM D638;
    an olefinic block copolymer, wherein the olefinic block copolymer is a copolymer of a first alpha-olefin and a second alpha-olefin different from the first alpha-olefin, and wherein the olefinic block copolymer comprises one or more second ethylenically unsaturated groups; and
    an ethylene-vinyl acetate copolymer;
    wherein a ratio I is from about 0.65 to about 7.00;
    wherein the ratio I is a ratio of a total parts by weight of the olefinic block copolymer present in the first composition to a total parts by weight of the partially hydrogenated thermoplastic elastomeric block copolymer present in the first composition.

2. The article of footwear according to claim 1, wherein the component is a midsole.

3. The article of footwear according to claim 1, wherein the first composition comprises about 5 parts by weight to about 20 parts by weight of the partially hydrogenated thermoplastic elastomeric block copolymer based upon an entire weight of the resin components present in the first composition, and wherein the entire weight of the resin components present in the first composition comprises about 40 parts by weight to about 86 parts by weight of the first composition.

4. The article of footwear according to claim 1, wherein the first composition comprises about 5 parts by weight to about 20 parts by weight of the olefinic block copolymer by weight based upon an entire weight of the resin components present in the first composition, and wherein the entire weight of the resin components present in the first composition comprises about 40 parts by weight to about 86 parts by weight of the first composition.

5. The article of footwear according to claim 1, wherein the first composition further comprises one or both of a free-radical initiator and a chemical blowing agent.

6. The article of footwear according to claim 1, wherein the component has an energy return of about 60 percent to about 85 percent.

7. An article of footwear comprising a component, wherein the component is made by a process comprising crosslinking and foaming a first composition, wherein the first composition comprises:
   a partially hydrogenated thermoplastic elastomeric block copolymer, the partially hydrogenated thermoplastic elastomeric block copolymer comprising:
     one or more A blocks comprising aromatic repeat units;
     one or more B blocks comprising aliphatic repeat units; and
     one or more first ethylenically unsaturated groups present on one or both of the aromatic repeat units and the aliphatic repeat units; and
   the partially hydrogenated thermoplastic elastomeric block copolymer is a $PS_q\text{-}X^1_n\text{-}X^2_m\text{-}X^3_p$ block copolymer,
     wherein PS represents polystyrene; $X^1$ is a poly-$C_2$-$C_8$-alkylene; $X^2$ is a poly-$C_2$-$C_8$-alkylene; and $X^3$ is polyether, polyester, polycarbonate, polyamide, polyketone or polysiloxane; and
     the subscripts q, n, m, and p represent mole fractions such that $1>q>0$, n is 0 to 1, m is 0 to 1, and p is 0 to 1 so long as $q+n+m+p=1$;
   an olefinic block copolymer, wherein the olefinic block copolymer is a copolymer of a first alpha-olefin and a second alpha-olefin different from the first alpha-olefin, and wherein the olefinic block copolymer comprises one or more second ethylenically unsaturated groups; and
   an ethylene-vinyl acetate copolymer;
   wherein a ratio I is from about 0.65 to about 7.00;
   wherein the ratio I is a ratio of a total parts by weight of the olefinic block copolymer present in the first composition to a total parts by weight of the partially hydrogenated thermoplastic elastomeric block copolymer present in the first composition.

8. The article of footwear according to claim 7, wherein the component is a midsole.

9. The article of footwear according to claim 7, wherein the first composition comprises about 5 parts by weight to about 20 parts by weight of the partially hydrogenated thermoplastic elastomeric block copolymer based upon an entire weight of the resin components present in the first composition, and wherein the entire weight of the resin components present in the first composition comprises about 40 parts by weight to about 86 parts by weight of the first composition.

10. The article of footwear according to claim 7, wherein the first composition comprises about 5 parts by weight to about 20 parts by weight of the olefinic block copolymer by weight based upon an entire weight of the resin components present in the first composition, and wherein the entire weight of the resin components present in the first composition comprises about 40 parts by weight to about 86 parts by weight of the first composition.

11. The article of footwear according to claim 7, wherein the first composition further comprises one or both of a free-radical initiator and a chemical blowing agent.

12. The article of footwear according to claim 7, wherein the component has an energy return of about 60 percent to about 85 percent.

13. An article of footwear comprising a component, wherein the component is made by a process comprising crosslinking and foaming a first composition, wherein the first composition comprises:
   a partially hydrogenated thermoplastic elastomeric block copolymer, the partially hydrogenated thermoplastic elastomeric block copolymer comprising:
     one or more A blocks comprising aromatic repeat units;
     one or more B blocks comprising aliphatic repeat units; and
     one or more first ethylenically unsaturated groups present on one or both of the aromatic repeat units and the aliphatic repeat units; and
   an olefinic block copolymer, wherein the olefinic block copolymer is a copolymer of ethylene and an alpha-olefin having about 6 to 12 carbon atoms; and
   an ethylene-vinyl acetate copolymer;
   wherein a ratio I is from about 0.65 to about 7.00;
   wherein the ratio I is a ratio of a total parts by weight of the olefinic block copolymer present in the first composition to a total parts by weight of the partially hydrogenated thermoplastic elastomeric block copolymer present in the first composition.

14. The article of footwear according to claim 13, wherein the component is a midsole.

15. The article of footwear according to claim 13, wherein the first composition comprises about 5 parts by weight to about 20 parts by weight of the partially hydrogenated thermoplastic elastomeric block copolymer based upon an entire weight of the resin components present in the first composition, and wherein the entire weight of the resin components present in the first composition comprises about 40 parts by weight to about 86 parts by weight of the first composition.

16. The article of footwear according to claim 13, wherein the first composition comprises about 5 parts by weight to about 20 parts by weight of the olefinic block copolymer by weight based upon an entire weight of the resin components present in the first composition, and wherein the entire weight of the resin components present in the first composition comprises about 40 parts by weight to about 86 parts by weight of the first composition.

17. The article of footwear according to claim 13, wherein the first composition further comprises one or both of a free-radical initiator and a chemical blowing agent.

18. The article of footwear according to claim 13, wherein the component has an energy return of about 60 percent to about 85 percent.

* * * * *

UNITED STATES PATENT AND TRADEMARK OFFICE
CERTIFICATE OF CORRECTION

PATENT NO. : 12,060,478 B2
APPLICATION NO. : 18/457617
DATED : August 13, 2024
INVENTOR(S) : Hossein A. Baghdadi It is certified that error appears in the above-identified patent and that said Letters Patent is hereby corrected as shown below:

On the Title Page

At Item (56) References Cites:

The line reading "ference: SPE Bicenten Reg Tech Conf, Plast in the Mid-Ohio Val," should read
--ference: SPE Bicenten RegTech Conf, Plastic in the Mid-Ohio Val,--

The line reading "private cars" Kunststoffe Plast Europe, v 92, n 3, p. 41-42+122-123," should read
--private cars" Kunststoffe Plastic Europe, v 92, n 3, p. 41-42+122-123,--

The line reading "Kuraray "Septon Hybar Thermoplastic Elastomers Technical Infor-" should read
--Kuraray "Septon Hybrar Thermoplastic Elastomers Technical Infor- --

In the Specification

Column 4:
Please remove the paragraph beginning at Line 4, through Line 20.

Column 6, Line 10:
The line reading "to 0.15 about 0.08 to 0.15, about 0.08 to 0.20, about 0.08 to" should read --to 0.15, about 0.08 to 0.15, about 0.08 to 0.20, about 0.08 to--

Column 7, Line 26:
The line reading "foams is based onASTM D 2632-92, which is a test for solid" should read --foams is based onASTM D2632-92, which is a test for solid--

Column 10, Line 4:
The line reading "olefin olefin block copolymer of the pre-foam composition," should read --olefin block copolymer of the pre-foam composition,--

Signed and Sealed this
Seventh Day of January, 2025

Derrick Brent
*Acting Director of the United States Patent and Trademark Office*

Column 11, Line 45:
The line reading "or of from 0.03 g/cm$^3$ to 0.12 g/cm$^3$, or of from g/cm$^3$ to 0.10" should read --or of from 0.03 g/cm$^3$ to 0.12 g/cm$^3$, or of from 0.04 g/cm$^3$ to 0.10--

Column 16, Line 25:
The line reading "composition (e.g, in the form of a foam preform) can be" should read --composition (e.g., in the form of a foam preform) can be--

Column 20, Line 34:
The line reading "segments; and an ethylene vinly-acetate copolymer." should read --segments; and an ethylene vinyl-acetate copolymer.--

Column 20, Line 40:
The line reading "atoms, and wherein the A-B-A-block copolymer comprises" should read --atoms, and wherein the A-B-A block copolymer comprises--

Column 23, Line 32:
The line reading "A-B-A-block copolymer includes about 10% to 50%, about" should read --A-B-A block copolymer includes about 10% to 50%, about--

Column 24, Line 10:
The line reading "A-B-A-block copolymer includes about 10% to 50%, about" should read --A-B-A block copolymer includes about 10% to 50%, about--

Column 24, Line 54:
The line reading "10, or 3 to 8 carbon atoms; and wherein the A-B-A-block" should read --10, or 3 to 8 carbon atoms; and wherein the A-B-A block--

Column 25, Line 19:
The line reading "some aspects, the composition incudes a first alpha-olefin" should read --some aspects, the composition includes a first alpha-olefin--

Column 26, Line 65:
The line reading "% to about mol % )." should read --% to about 80 mol % ).--

Column 27, Line 48:
The line reading "herein, have a weight average molecular weight (Mw) from" should read --herein, have a weight average molecular weight ($M_w$) from--

Column 27, Line 67:
The line reading "(SIS)/(SIBS); KRATON® G styrene-ethyelen-butadiene-" should read --(SIS)/(SIBS); KRATON® G styrene-ethylene-butadiene- --

Column 28, Line 4:
The line reading "grafted styrene-ethyelen-butadiene-styrene (SEBS) polymer" should read --grafted styrene-ethylene-butadiene-styrene (SEBS) polymer--

CERTIFICATE OF CORRECTION (continued)
U.S. Pat. No. 12,060,478 B2

Column 29, Line 6:
The line reading "As used herein, the stryrenic copolymer component is" should read --As used herein, the styrenic copolymer component is--

Column 30, Line 59:
The line reading "lymer includes EVLAX® 40L-03 ethylene vinyl acetate" should read --lymer includes ELVAX® 40L-03 ethylene vinyl acetate--

Column 31, Line 26:
The line reading "to about 45 phr of the EVAcomponent. The pre-foam com-" should read --to about 45 phr of the EVA component. The pre-foam com- --

Column 32, Line 58:
The line reading "about 3.50 to 5.00, about 2.50 to 5.00, or .about 2.75 to 4.50." should read --about 3.50 to 5.00, about 2.50 to 5.00, or about 2.75 to 4.50.--

Column 34, Line 12:
The line reading "acrylamide or ethylenebisacrylamide; aliphatic esters of" should read --acrylamide or methylenebisacrylamide; aliphatic esters of--

Column 34, Line 54:
The line reading "comprising blocks of $C_4$ -$C_{100}$ unsaturated-olefin olefin. The" should read --comprising blocks of $C_4$ -$C_{100}$ unsaturated-olefin. The--

Column 36, Line 52:
The line reading "x', less than y', and 'less than z'. Likewise, the phrase 'about" should read --x', 'less than y', and 'less than z'. Likewise, the phrase 'about--

Column 36, Line 55:
The line reading "as the ranges of 'greater than x', greater than y', and'greater" should read --as the ranges of 'greater than x', 'greater than y', and 'greater--

Column 37, Line 24:
The line reading "poplyethylene; "units of polypropylene" refers to block units" should read --polyethylene; "units of polypropylene" refers to block units--

Column 38, Line 21:
The line reading ":from KRATON Polymers (KRATON® G1651 E) has a" should read --from KRATON Polymers (KRATON® G1651E) has a--

Column 40, Table 2-continued:
The line reading "concentration in formulation" should read --*: concentration in formulation--
The line reading " See Table 2 and 3" should read --: See Table 2 and 3--

Column 43, Line 10:
The line reading "of polymer and unsaturated olefin The particle size of the" should read --of polymer and unsaturated olefin. The particle size of the--

Column 50, Line 8:
The line reading "ASTM D 2632 92, which uses a vertical rebound apparatus." should read --ASTM D2632-92, which uses a vertical rebound apparatus.--

Column 53, Line 48:
The line reading "first olefinic segments;" should read --first olefinic segments; and--

Column 53, Line 49:
The line reading "and one or more linking polymers, each linking polymer" should read --one or more linking polymers, each linking polymer--

Column 53, Line 55:
The line reading "3 to 8 carbon atoms, and wherein the A-B-A-block" should read --3 to 8 carbon atoms, and wherein the A-B-A block--

Column 56, Line 57:
The line reading "rich in the second alpha-olefin" should read --rich in the second alpha-olefin.--

Column 57, Lines 44-45:
The lines reading "The composition according to clause 32, further comprising the chemical blpowing agent," should read --35. The composition according to clause 32, further comprising the chemical blowing agent,--

Column 59, Line 47:
The line reading "1-50" should read --1-50.--